(12) United States Patent
Sharpless et al.

(10) Patent No.: US 10,717,820 B2
(45) Date of Patent: Jul. 21, 2020

(54) POLYMERIZATION OF SILYL- AND FLUORO-CONTAINING MONOMERS

(71) Applicant: The Scripps Research Institute, La Jolla, CA (US)

(72) Inventors: K. Barry Sharpless, La Jolla, CA (US); Jiajia Dong, Shanghai (CN); Bing Gao, San Diego, CA (US); Peng Wu, San Diego, CA (US); Hua Wang, San Diego, CA (US)

(73) Assignee: THE SCRIPPS RESEARCH INSTITUTE, La Jolla, CA (US)

( * ) Notice: Subject to any disclaimer, the term of this patent is extended or adjusted under 35 U.S.C. 154(b) by 88 days.

(21) Appl. No.: 15/738,831

(22) PCT Filed: Jun. 22, 2016

(86) PCT No.: PCT/US2016/038701
§ 371 (c)(1),
(2) Date: Dec. 21, 2017

(87) PCT Pub. No.: WO2016/209920
PCT Pub. Date: Dec. 29, 2016

(65) Prior Publication Data
US 2018/0194901 A1 Jul. 12, 2018

Related U.S. Application Data

(60) Provisional application No. 62/182,755, filed on Jun. 22, 2015.

(51) Int. Cl.
*C08G 77/08* (2006.01)
*C08G 75/24* (2006.01)
(Continued)

(52) U.S. Cl.
CPC .......... *C08G 77/08* (2013.01); *B01J 31/0218* (2013.01); *B01J 31/0239* (2013.01);
(Continued)

(58) Field of Classification Search
None
See application file for complete search history.

(56) References Cited

U.S. PATENT DOCUMENTS 3,733,304 A * 5/1973 Firth, Jr. ................ C08G 75/00
528/175
4,474,932 A * 10/1984 Bier .................... C08G 65/4087
528/25

(Continued)

FOREIGN PATENT DOCUMENTS

CN 104059228 A 9/2014
EP 0121439 A1 * 10/1984 ................ C08F 4/00

(Continued)

OTHER PUBLICATIONS

The Scripps Research Institute, Communication from European Patent Office dated Jul. 31, 2019, Extended European Search Report (EESR), Application No. 16815195.9, pp. 1-10.

(Continued)

*Primary Examiner* — Peter A Salamon
(74) *Attorney, Agent, or Firm* — Olson & Cepuritis, Ltd.

(57) ABSTRACT

Condensation of fluoro-substituted and silyl-substituted monomers provides polymers suitable for use, e.g., as engineering polymers. A monomer composition is condensed in the presence of a bifluoride or poly(hydrogen fluoride) fluoride salt. The monomer composition contains a compound of formula F-X-F and a compound of formula $(R^1)_3$Si—Z—Si$(R^1)_3$, and forms an alternating X-Z polymer chain and a silyl fluoride byproduct. X has the formula -A(-$R^2$-A)n-; each A is $SO_2$, C(=O), or Het; $R^2$ is an organic (Continued)

moiety; n is 0 or 1; Het is an aromatic nitrogen heterocycle; Z has the formula -L-$R^3$-L-; each L is O, S, or N($R^4$); and each $R^3$ is an organic moiety, and $R^4$ comprises H or an organic moiety.

36 Claims, 8 Drawing Sheets

(51) Int. Cl.
  *C08G 77/24* (2006.01)
  *C07F 9/54* (2006.01)
  *B01J 31/02* (2006.01)
(52) U.S. Cl.
  CPC ......... *B01J 31/0268* (2013.01); *C07F 9/5407* (2013.01); *C07F 9/5463* (2013.01); *C08G 75/24* (2013.01); *C08G 77/24* (2013.01)

(56) References Cited

U.S. PATENT DOCUMENTS

| | | | |
|---|---|---|---|
| 2015/0315340 A1* | 11/2015 | Dong | C08J 5/18 528/14 |
| 2017/0218127 A1* | 8/2017 | Dong | C08G 64/24 |
| 2018/0194901 A1* | 7/2018 | Sharpless | C07F 9/5407 |

FOREIGN PATENT DOCUMENTS

| | | | |
|---|---|---|---|
| EP | 0121439 A1 | 10/1984 | |
| WO | 2014089078 A1 | 6/2014 | |
| WO | WO-2014089078 A1 * | 6/2014 | ............. C08G 75/00 |
| WO | 2015188120 A1 | 12/2015 | |
| WO | WO-2015188120 A1 * | 12/2015 | ............. A61K 31/47 |
| WO | 2016209920 A1 | 12/2016 | |
| WO | WO-2016209920 A1 * | 12/2016 | ............. C07F 9/5407 |

OTHER PUBLICATIONS

Gao, B. et al., Bifluoride-Catalysed Sulfur (VI) Fluoride Exchange Reaction for the Synthesis of Polysulfates and Polysulfonates, Nature Chemistry 9, 1083-1088 (2017).

Liu, S-H et al., A Polyethersulfone-Bisphenol Sulfuric Acid Hollow Fiber Ultrafiltration Membrane Fabricated by a Reverse Thermally Induced Phase Separation Process, Royal Society of Chemistry, RSC Advances 8, 7800-7809 (2018).

Wang, H. et al., SuFEx-Based Polysulfonate Formation From Ethenesulfonyl Fluoride-Amine Adducts, Angew. Communications Int. Ed. 56 (11203-11208 (2017).

* cited by examiner

POLYMERIZATION OF SILYL- AND FLUORO-CONTAINING MONOMERS

CROSS-REFERENCE TO RELATED APPLICATIONS

This application is a U.S. National Stage of PCT/US2016/038701, filed on Jun. 22, 2016, and claims the benefit of U.S. Provisional Application Ser. No. 62/182,755, filed on Jun. 22, 2015, each of which is incorporated herein by reference in its entirety.

FIELD OF THE INVENTION

The present invention relates to polymers and methods of producing polymers. More particularly, the invention relates to methods of producing polymers via catalyzed condensation of fluorinated and silylated monomers.

BACKGROUND

Polymeric materials play an important role in modern materials science. Synthetic condensation polymers (e.g., materials having organosulfone, organosulfate, organocarbonate, organocarbamate, organourea, or organic ester-type polymeric backbones) are utilized in a variety of products and industries, including, for example, packaging, high performance engineering materials, medical prostheses and implants, optics, and consumer plastic goods. There is an ongoing need for new methods of preparing polymeric materials, particularly solid polymers (e.g., plastics), including materials for high value, specialty applications (e.g., medical prostheses and implants, engineering materials, or optics). The polymerization methods and polymers described herein address these needs.

Co-pending and co-owned International Application No. PCT/US2013/072871 to Dong et al. (published as WO 2014/089078), filed on Dec. 3, 2013, which is incorporated herein by reference in its entirety, describes a method for polymerizing silyl and fluoro-containing monomers catalyzed by basic catalysts, such as 1,8-diazabicyclo[5.4.0]undec-7-ene (DBU), 2-tert-butylimino-2-diethylamino-1,3-dimethylperhydro-1,3,2-diazaphosphorine (BEMP). This method, while providing a variety of useful polymers, but the level of catalyst needed for the polymerization generally requires a purification process, such as an extraction or washing step, to remove the catalyst from the polymer product.

There is an ongoing need for new polymerization methods that are versatile and capable of producing a wide variety of polymer structures, including materials formally considered to be condensation polymers, under relatively mild and scalable conditions, and which do not require a purification step to remove the polymerization catalyst. The methods described herein address this need.

SUMMARY

Polymerization methods described herein provide a straightforward synthesis of relatively high molecular weight polymers by catalyzed polymerization of activated fluoro-substituted and silyl-substituted monomers under mild reaction conditions utilizing a catalytically effective concentration of an acidic hydrogen fluoride-fluoride catalyst, such as bifluoride (FHF$^-$) salt or poly(hydrogen fluoride)-fluoride salt (a "polyHF fluoride" salt), i.e., a salt comprising the anion F(HF)$_w^-$, in which w is 1 or greater (also referred to herein as HF-fluoride catalysts). Polymers are achieved at unexpectedly low catalyst loadings, such that the catalyst can be left in the resulting polymer product without need for a purification step to remove the catalyst. Fluorosulfate, fluorosulfonate, carbonyl fluoride, and certain heterocyclic fluoride monomers can be reacted with silyl ether, silyl amine (particularly with C(=O)F monomers), and silyl sulfide monomers under mild conditions to form a wide variety of polymeric materials, including, e.g., polysulfates, polycarbonates, polysulfonates and related materials.

The polymers described herein, such as the polysulfate polymers, typically are thermoplastic materials that are readily moldable and thermoformable into a wide variety of mechanical parts and structural components. The polysulfate polymers, and poly(bisphenol A sulfate) polymers, in particular, are resistant to hydrolysis and aminolysis, in contrast to bisphenolA polycarbonate, which readily hydrolyzes and readily degrades in the presence of ammonia (aminolysis). The polysulfate polymers have relatively high dielectric constant, good impact resistance, as well as tensile strength, modulus of elasticity, and elongation similar to polycarbonates. Such polymers can be fabricated into sheets and films for use in packaging materials, construction materials, and the like, and can be used in applications such as automotive and aircraft components (e.g., windscreens and the like), medical prostheses, safety goggles, and containers (e.g., cups, bottles, and the like).

The polymerization methods described herein are particularly useful for preparing aryl polysulfates, such as bisphenol polysulfates, under mild, high yielding conditions, to afford polymers with molecular weights and physical properties suitable for, e.g., materials applications such as engineering materials, packaging materials, and the like. One surprising advantage of the HF-fluoride catalyzed polymerization is that the catalyst can be used at levels low enough to allow the catalyst to remain in the polymer product without need for expensive purification steps. This is in contrast to the basic catalysts of the prior art, which typically require a washing or extraction step to remove the catalyst. Additionally, HF-fluoride catalysts such as tris(dialkylamino)sulfonium bifluoride salts, surprisingly are one or more orders of magnitude more efficient than the basic catalysts such as DBU and BEMP of the previously described polymerization methods of Dong et al. referred to above, as evidenced by the rapidity with which the monomers react to form a solid polymer product.

In one preferred embodiment, polysulfate polymers are prepared from aryl bis-fluorosulfates and aryl bis-silyl ethers under mild reactions conditions, which are amenable to bulk (i.e., solvent-free) polymerization. The polymer can be substantially linear or in some embodiments can include or consist of cyclic polymer chains in which the end groups of a single polymer chain have bonded together to form a large ring. Unlike the previously described polymerization using basic catalysts, the methods described herein surprisingly achieve efficient polymerization using mildly acidic bifluoride and polyHF fluoride catalysts, which can be utilized at low enough loadings to be left in the resulting polymer without adverse effects on the polymer properties.

In the methods described herein, the catalyst is added to a monomer composition containing fluoro-substituted and silyl-substituted monomers, which results in condensation to form a polymer chain and a silyl fluoride byproduct that is readily separable from the polymer product. The monomer composition comprises at least one compound of formula F-X-F and at least one compound of formula (R$^1$)$_3$Si—Z—

Si(R$^1$)$_3$. Each R$^1$ independently is a hydrocarbyl group; X has the formula -A(-R$^2$-A)n-; each A independently is SO$_2$, C(=O), or Het, preferably SO$_2$; R$^2$ comprises a first organic moiety; n is 0 or 1; Het is an aromatic heterocycle comprising at least two carbon atoms and at least one nitrogen atom in a heteroaromatic ring thereof (preferably 1,3,5-triazine), and when A is Het, the F substituent is attached to a carbon atom of the heteroaromatic ring thereof; Z has the formula -L-R$^3$-L-; each L independently is O, S, or N(R$^4$), preferably O; R$^3$ comprises a second organic moiety, and R$^3$ preferably comprises at least one aryl or heteroaryl moiety; each L group preferably is directly bonded to an aryl or heteroaryl moiety of R$^3$; and each R$^4$ independently is H or a third organic moiety. Alternatively, the monomer composition can comprise at least one compound of formula F-X-Z—Si(R$^1$)$_3$ in addition to, or in place of, the combination of F-X-F and (R$^1$)$_3$Si—Z—Si(R$^1$)$_3$. The monomers can be prepared, e.g., as described in WO 2014/089078 to Dong et al., referred to above.

During polymerization, the respective A and L groups of the monomers together form an X-Z polymer chain, and the F and (R$^1$)$_3$Si substituents form a silyl fluoride byproduct of formula (R$^1$)$_3$Si—F, which is ready separable from the polymer product and can be recycled. In preferred embodiments, the polymers include relatively stable fluoro-substituted end groups, which can be modified under selective reaction conditions, if desired.

The catalyst comprises an HF-fluoride salt of formula (R$^+$)(F(HF)$_w^-$), wherein R$^+$ is an organic cation or a chelated metal cation, and w is 1 or greater. As used herein, "organic cation" refers to cationic species comprising one of more organic (carbon-hydrogen-based) moiety bound to a positively charged heteroatom, such as S, N, or P, and includes various onium cations such as quaternary ammonium cations, organosulfonium cations (e.g., sulfonium cations comprising three groups, such as akyl, aryl aminoalkyl, and/or aminoaryl groups, bound to a positively charged S, such as tris(dialkylamino)sulfonium), organophosphonium cations (e.g., phosphonum cations comprising four groups, such as alkyl, aryl, aminoalkyl, aminoaryl and/or other substituent groups bound to a positively charged P), quaternized nitrogen heterocyclic cations (e.g., nitrogen heteroaromatic compounds comprising at least one positively charged nitrogen in the heteroaromatic ring, such as imidazolium cations in which both nitrogen atoms in an imidazole ring are alkylated), as well as cationic polymers, including both insoluble and soluble polymers (e.g., cationic polystyrene beads with appended quaternary ammonium groups). Chelated metal cations preferably comprise a monovalent metal ion (e.g., an alkali metal such as potassium and the like, or a monovalent transition metal, etc.) complexed with a chelating ligand, preferably a neutral (non-charged) ligand such as a crown ether (e.g., 18-crown-6, 12-crown-4, 15-crown-5, dibenzo-18-crown-6, and the like) and/or an azacrown ether (e.g., diaza-18-crown-6, and the like).

As used herein, "HF-fluoride" refers to anions comprising a fluoride anion bound to one of more hydrogen fluoride molecules, e.g., in a chain such as bifluoride ion (FHF$^-$), and having the general formula F(HF)$_w^-$, where n is 1 or greater, with w generally being in the range of 1 to 10 (e.g., w is in the range of 1 to 2, 1 to 3, 1 to 4, 1, to 5, 1 to 6, etc.). When w is 1, the HF-fluoride ion is bifluoride, when w is greater than 1, the HF-fluoride is a polyHF fluoride.

In some embodiments, the HF-fluoride catalyst comprises an organosulfonium bifluoride or polyHF fluoride such as tris(dialkylamino)sulfonium bifluoride salt of formula: (R$^a_2$N)$_3$S$^+$(FHF)$^-$ wherein each R$^a$ independently is an alkyl group comprising 1 to 20 carbon atoms, or two R$^a$ groups together comprise a 4 or 5 carbon alkylidene group (e.g., —CH$_2$—CR$^x_2$—CH$_2$—, or —CH$_2$CR$^x_2$CR$^x_2$CH$_2$— wherein each R$^x$ independently is H or alkyl) thereby forming a 5 or 6 membered ring with the N atom attached thereto; each R$^a$ alkyl or alkylidene group includes at least two hydrogen atoms on a carbon atom adjacent to the sulfur atom thereof, and each R$^a$ independently can be linear or branched; or a polyHF fluoride analog thereof. The tris (dialkylamino)sulfonium bifluoride salt can be prepared, e.g., by the methods described in U.S. Pat. No. 4,598,161 to Farnham et al., which is incorporated herein by reference in its entirety.

Tris(dialkylamino)sulfonium bifluoride salts have been reported to catalyze a living addition polymerization of olefinic monomers, such as methyl methacrylate, but heretofore have not been described as catalysts for condensation-type polymerizations (i.e., polymerizations in which a neutral molecule is produced from end groups of the monomers during formation of the polymer chain), particularly silyl and fluoro containing monomers, as in the methods described herein.

In other embodiments, the catalyst can be an organophosphonium bifluoride or polyHF fluoride, such as tetrabutylphosphonium bifluoride or polyHF fluoride, (Ph$_3$P—N=PPh$_3^+$) bifluoride or polyHF fluoride, and the like.

In other embodiments, the catalyst can be a quaternary ammonium bifluoride or polyHF fluoride, such as tetrabutylammonium bifluoride or polyHF fluoride, tetraethylammonium bifluoride or polyHF fluoride, and the like.

In other embodiments, the catalyst can be a quaternized heteroaromatic bifluoride or polyHF fluoride, such as an imidazolium bifluoride or polyHF fluoride (e.g., N,N-dimethylimidazolium bifluoride, N,N-di(isopropyl)imidazolium bifluoride, and the like).

In some other embodiments, the catalyst can be a polymer supported bifluoride or polyHF fluoride, such as a quaternary amino-substituted polystyrene bifluoride or polyHF fluoride.

In yet other embodiments, the catalyst can be a chelated metal bifluoride or polyHF fluoride, such as potassium 18-crown-6, and the like.

Bifluoride salts can be prepared by reaction of corresponding onium halide salts (e.g., Cl or Br) with silver(I) bifluoride (AgHF$_2$); see, Vergote et al., *Chem. Eur. J* 2012, 18, p. 793-798). Alternatively, the catalysts can be prepared by the reaction of corresponding onium halide salts (e.g., Cl or Br) with anhydrous HF; see, (1) Matsumoto et al., *Solid State Sci.* 2002, 4, 23-26; (2) Hagiwara et al., *J. Fluorine Chem.* 1999, p. 1-3.

The poly-HF bonded onium catalysts can be obtained via the reaction of corresponding onium halide salts with anhydrous HF, as well; for selected examples, see, (1) Momota et al., *Electrochim Acta.* 1993, 38, p. 619-624; (2) Rozhkov et al. *Tetrahedron* 1975, 31, p. 977-981; (3) Ballinger et al., *Electrochim Acta.* 1985, 30, 1075-1077; and references therein.

Polymer-supported F(HF)$_w^-$ also has been described; see, Cousseau et al., *B. Soc. Chim. Fr.* 1986, p. 910-915.

The silyl fluoride byproduct of the polymerization can be recycled by reaction with a salt (e.g., a sodium or potassium salt) of a phenolic monomer precursor (e.g., bisphenol A) to form a useful bis-silylated monomer (e.g., a bis-silyl bisphenol A) and a fluoride salt (e.g., sodium fluoride). The bis-silylated monomer can be utilized in another polymerization reaction.

One embodiment of the polymerization method described herein involves reacting a bis-fluorinated first monomer with a bis-silylated second monomer in the presence of an HF-fluoride catalyst, such as a tris(dialkylamino)sulfonium bifluoride salt (e.g., tris(dimethylamino)sulfonium bifluoride; $TASHF_2$), an organophosphonum bifluoride, a quaternary ammonium bifluoride, a, polymer-supported bifluoride, a chelated metal bifluoride, and the like, to form a polymer chain and a silyl fluoride byproduct. The fluoro substituents of the first monomer are attached to an electron deficient group such as a sulfonyl, carbonyl or heteroaryl activating group (preferably sulfonyl), and the silyl substituents of the second monomer are linked to an organic core moiety via an oxygen, sulfur, or nitrogen atom (preferably an oxygen atom). When the first and second monomers are combined with the bifluoride salt, the fluoride substituents of the first monomer react with the silyl substituents of the second monomer to form a silyl fluoride, and the electron deficient activating groups of the first monomer condense with the linking atoms of the second monomer to form a polymer chain. The first monomer optionally can include an organic core group, as well.

In some embodiments, the method comprises the step of reacting a first monomer composition comprising at least one compound of formula F-X-F (preferably $FSO_2F$) with a second monomer composition comprising at least one compound of formula $(R^1)_3Si$—Z—$Si(R^1)_3$, in the presence of a tris(dialkylamino)sulfonium bifluoride salt, to form an alternating X-Z polymer chain and a silyl fluoride byproduct of formula $(R^1)_3Si$—F. The X portion of the first monomer has the formula $-A(-R^2-A)n-$, wherein each A independently is $SO_2$, $C(=O)$, or Het, preferably $SO_2$; $R^2$ comprises a first organic moiety; n is 0 or 1; and Het is an aromatic heterocycle comprising at least two carbon atoms and at least one nitrogen atom in a heteroaromatic ring thereof (preferably a 1,3,5-triazine), in which each F is attached to a carbon atom of the heteroaromatic ring. Each $R^1$ of the second monomer independently is a hydrocarbyl group (e.g., linear or branched alkyl, phenyl, and the like); Z has the formula $-L-R^3-L-$, wherein each L independently is O, S, or $N(R^4)$, preferably O; $R^3$ comprises a second organic moiety and $R^3$ preferably comprises at least one aryl or heteroaryl moiety; each L group preferably is directly bonded to an aryl or heteroaryl moiety of $R^3$; and $R^4$ is H or a third organic moiety. During polymerization, the respective F and $(R^1)_3Si$ substituents of the first and second monomers form the silyl fluoride, while the respective A and L groups of the first and second monomers alternately condense to form the alternating X-Z polymer chain. When n is 0, each F substituent of the first monomer is attached to the same A group.

Preferably, the first and second monomers are reacted in approximately equimolar amounts or with an excess (e.g., 0.01 up to about 10 mol % excess) of the first (i.e., fluorinated) monomer. The first and second monomers can be contacted with one another in neat (solventless or bulk) form, or in a solvent (e.g., a halogenated hydrocarbon, acetonitrile ($CH_3CN$), pyridine, N,N-dimethylformamide (DMF), N-methylpyrrolidone (NMP), dimethylsulfoxide (DMSO) and the like), a combination of solvents (e.g., together or sequentially added), or a combination of solventless and solvent conditions (e.g., sequentially). Some preferred solvents are polar aprotic solvents, such as, e.g., acetonitrile, DMF, NMP, and DMSO. Typically, the polymerization is performed at a temperature in the range of about 20 to about 250° C. for about 0.01 to about 48 hours, e.g., about 1 to about 24 hours, or about 0.25 to about 10 hours. In some preferred embodiments the polymerization is carried out at a temperature in the range of about 180 to 200° C. The polymerization reaction is surprisingly facile, and typically exhibits a relatively modest heat of reaction.

The first monomer can be a single compound conforming to the formula F-X-F or a mixture of compounds having different X groups. Similarly, the second monomer may be a single compound conforming to the formula $(R^1)_3Si$—Z—$Si(R^1)_3$ or a mixture of compounds having different $R^1$ groups, Z groups, or both. Such mixtures of monomers can be formulated in any desired proportion and with any desired X and Z groups to impart desired properties to the resulting polymer, such as a desired molecular weight, a desired molecular weight distribution, desirable physical or mechanical properties (e.g., glass transition temperature, hydrolytic stability, tensile strength, impact resistance, ductility, resilience, plasticity, and the like), or biodegradability, for example.

In one embodiment, the first monomer has the formula F-A-F. In this embodiment, the first monomer can be, for example, $FSO_2F$, $FC(O)F$, or F-Het-F (preferably $FSO_2F$). As described herein, Het is an aromatic heterocycle comprising at least two carbon atoms and at least one nitrogen atom in a heteroaromatic ring thereof, in which each F is attached to a carbon atom of the heteroaromatic ring. An exemplary heterocycle is 1,3,5-triazine, and the F substituents are covalently bonded to a carbon atom at two or more of positions 2, 4, and 6. When a gaseous monomer such as $FSO_2F$ is utilized, the reaction can be performed in a reactor capable of operating at pressures greater that one atmosphere, if desired.

In other embodiments, the first monomer is a material of formula $F-A-R^2-A-F$. $R^2$ is a first organic moiety, which can comprise or consist of an organic core material, such as a hydrocarbon, a heterocycle, a carbohydrate, an amino acid, a polypeptide, a peptide analog, and the like, or any combination of two or more thereof, while the A groups are selected from sulfonyl, carbonyl, or heteroaryl (Het), preferably $SO_2$, as described above. In some embodiments, $R^2$ can be represented by the formula $-L^1-R^5-L^1-$, in which each $L^1$ independently is selected from the group consisting of O, S, and $N(R^4)$, preferably O; each $R^5$ independently comprises the first organic moiety: and each $R^4$ independently comprises H or a third organic moiety. Alternatively, or in addition, $R^2$ can be represented by the formula $-L^1-R^5-$, in which each $L^1$ and $R^5$ are as defined above.

A polymer produced by the present methods comprises a polymer chain that can be represented by Formula (I): $(-A(-R^2-A)n-L-R^3-L)x-$, in which each A independently is $SO_2$, $C(=O)$, or Het, preferably $SO_2$; each $R^2$ independently comprises the first organic moiety; each n independently is 0 or 1; each Het independently is an aromatic heterocycle comprising at least two carbon atoms and at least one nitrogen atom in a heteroaromatic ring thereof; each L independently is O, S, or $N(R^4)$, preferably O; each $R^3$ comprises a second organic moiety and $R^3$ preferably comprises at least one aryl or heteroaryl moiety; each L group preferably is directly bonded to an aryl or heteroaryl moiety of $R^3$; each $R^4$ independently is H or a third organic moiety; and x is the average number of repeating units in the polymer and has a value of at least 10 (e.g., 10 to 100,000 or more). The polymer chain includes at least one end group that is derived from the first monomer, i.e., an end group including a moiety of formula E-A-, such as $E-A(-R^2-A)n-$, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety. When A is Het, each L group is attached to a carbon atom of the heteroaromatic ring thereof.

Alternatively, or in addition, the polymer includes a polymer chain that can be represented by Formula (II): $(-A-R^2-A-L-R^3-L)y-$, wherein each A independently is $SO_2$, $C(=O)$, or Het, preferably $SO_2$; each $R^2$ independently comprises the first organic moiety; each Het independently is an aromatic heterocycle comprising at least two carbon atoms and at least one nitrogen atom in a heteroaromatic ring thereof (preferably 1,3,5-triazine); each L independently is O, S, or $N(R^4)$, preferably O; each $R^3$ comprises a second organic moiety and $R^3$ preferably comprises at least one aryl or heteroaryl moiety; each L group preferably is directly bonded to an aryl or heteroaryl moiety of $R^3$; each $R^4$ independently is H or a third organic moiety; and y is the average number of repeating units in the polymer and has a value of at least 10 (e.g., 10 to 100,000 or more). The polymer chain includes at least one end group that is derived from the first monomer, i.e., an end group including a moiety of formula E-A-, such as E-A-$R^2$-A-, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety. When A is Het, each L group is attached to a carbon atom of the heteroaromatic ring thereof.

In some other embodiments, the polymer includes a polymer chain that can be represented by Formula (III): $(-A-L^1-R^5-L^1-A-L-R^3-L)z-$, wherein each A independently is $SO_2$, $C(=O)$, or Het, preferably $SO_2$; each $R^5$ independently comprises the first organic moiety; each Het independently is an aromatic heterocycle comprising at least two carbon atoms and at least one nitrogen atom in a heteroaromatic ring thereof, preferably 1,3,5-triazine; each L and $L^1$ independently is O, S, or $N(R^4)$, preferably O; each $R^3$ comprises a second organic moiety and $R^3$ preferably comprises at least one aryl or heteroaryl moiety; each L group preferably is directly bonded to an aryl or heteroaryl moiety of $R^3$; each $R^4$ independently is H or a third organic moiety; and z is the average number of repeating units in the polymer and has a value of at least 10 (e.g., 10 to 100,000 or more). The polymer chain includes at least one end group that is derived from the first monomer, i.e., an end group including a moiety of formula E-A-, such as E-A-$L^1$-$R^5$-$L^1$-A-, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety. When A is Het, each L and $L^1$ group is attached to a carbon atom of the heteroaromatic ring thereof.

In yet other embodiments, the polymer includes a polymer chain that can be represented by Formula (IV): $(-A-L^1-R^5-A-L-R^3-L)m-$, wherein each A independently is $SO_2$, $C(=O)$, or Het, preferably $SO_2$; each $R^5$ independently comprises a first organic moiety; each Het independently is an aromatic heterocycle comprising at least two carbon atoms and at least one nitrogen atom in a heteroaromatic ring thereof; each L and $L^1$ independently is O, S, or $N(R^4)$, preferably O; each $R^3$ comprises a second organic moiety and $R^3$ preferably comprises at least one aryl or heteroaryl moiety; each L group preferably is directly bonded to an aryl or heteroaryl moiety of $R^3$; each $R^4$ independently is H or a third organic moiety; and m is the average number of repeating units in the polymer and has a value of at least 10 (e.g., 10 to 100,000 or more). The polymer chain includes at least one end group that is derived from the first monomer, i.e., an end group including a moiety of formula E-A-, such as E-A-$L^1$-$R^5$-A-, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety. When A is Het (e.g., 1,3,5-triazine), each L and $L^1$ group is attached to a carbon atom of the heteroaromatic ring thereof.

In some other embodiments, the polymer includes a polymer chain that can be represented by Formula (V): $(-A-L-R^3-L)p-$, wherein each A independently is $SO_2$, $C(=O)$, or Het, preferably $SO_2$; each Het independently is an aromatic heterocycle comprising at least two carbon atoms and at least one nitrogen atom in a heteroaromatic ring thereof; each L independently is O, S, or $N(R^4)$, preferably O; each $R^3$ comprises a second organic moiety and $R^3$ preferably comprises at least one aryl or heteroaryl moiety; each L group preferably is directly bonded to an aryl or heteroaryl moiety of $R^3$; each $R^4$ is H or another organic moiety; and p is the average number of repeating units in the polymer and has a value of at least 10 (e.g., 10 to 100,000). The polymer chain includes at least one end group that is derived from the first monomer, i.e., an end group including a moiety of formula E-A-, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety. When A is Het (e.g., 1,3,5-triazine), each L group is attached to a carbon atom of the heteroaromatic ring thereof.

In yet other embodiments, the polymer can be represented by the Formula (VI): $(-A-R^2-A-L-R^3-L)a-(-A-L^1-R^5-L^1-A-L-R^3-L)b-(A-L^1-R^5-A-L-R^3-L)c-(-A-L-R^3-L)d-$, wherein a, b, c, and d represent the average number of the respective repeating units in the polymer, and any of a, b, c, and d can be 0 or greater, so long as the sum of a, b, c, and d has a value of at least 10 (e.g., 10 to 100,000 or more), and the polymer includes at least one end group that is derived from the first monomer, i.e., an end group of formula E-A-, E-A-$L^1$-$R^5$-A-, E-A-$L^1$-$R^5$-$L^1$-A-, E-A-$R^2$-A-, or E-A(-$R^2$-A)n-, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety. Each of A, L, $L^1$, $R^2$, $R^3$, and $R^5$ independently are defined as they are for the other polymer and monomer embodiments described herein.

In some embodiments, at least a portion of the first monomer includes a branching monomer of the formula F-X-F in which X includes an additional F substituent on a sulfonyl, carbonyl or heteroaryl activating group, such that the additional F substituent also reacts with a silyl substituent on an oxygen, sulfur or nitrogen atom linking group of the second monomer to form the silyl fluoride, and the activating group of the first monomer condenses with the linking group of the second monomer to introduce at least one branch point in the polymer. Alternatively, or in addition, the second monomer can include a branching monomer in which Z includes an additional silyl substituent attached to an oxygen, sulfur or nitrogen atom linking group, such that the additional silyl substituent reacts with a fluoro substituent on a sulfonyl, carbonyl, or heteroaryl activating group of the first monomer to form the silyl fluoride, and the linking group of the second monomer condenses with the activating group of the first monomer to introduce at least one branch point into the polymer.

In any of the polymerization methods and polymers described herein, each of the organic moieties of the monomers, e.g., $R^1$, $R^2$, $R^3$, $R^4$, $R^5$, and $R^8$ independently can be selected from the group consisting of consisting of a hydrocarbon, a heterocycle, a carbohydrate, an amino acid, a polypeptide, a peptide analog, and a combination of two or more thereof. In some embodiments, $R^2$, $R^3$, $R^4$, $R^5$, and $R^8$ can include one of more substituent, e.g., hydroxyl, halogen, nitro, —C(O)$R^6$, —C(O)O$R^6$, —C(O)N($R^6$)$_2$, —CN, —SO$_v$$R^6$, —SO$_v$N($R^6$)$_2$, $R^6$SO$_v$N($R^6$)—, —N($R^6$)SO$_v$$R^6$, —SO$_3$$R^6$, —N($R^6$)$_2$, —N($R^6$)O$R^6$, —N($R^6$)C(O)$R^6$, —N($R^6$)C(O)O$R^6$, —N($R^6$)C(O)N($R^6$)$_2$, —OC(O)N($R^6$)$_2$, —OC(O)O$R^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each $R^6$ independently is H, alkyl, or aryl, and v is 0, 1, or 2.

The present invention also provides polymers prepared by the methods described herein. The polymers comprise a polymeric chain having a formula selected from the group consisting of:

(-A(-$R^2$-A)n-L-$R^3$-L)x-;  Formula (I):

(-A-$R^2$-A-L-$R^3$-L)y-;  Formula (II):

(-A-$L^1$-$R^5$-$L^1$-A-L-$R^3$-L)z-;  Formula (III):

(-A-$L^1$-$R^5$-A-L-$R^3$-L)m-;  Formula (IV):

(-A-L-$R^3$-L)p-; and  Formula (V):

(-A-$R^2$-A-L-$R^3$-L)a-(-A-$L^1$-$R^5$-$L^1$-A-L-$R^3$-L)b-(A-$L^1$-$R^5$-A-L-$R^3$-L)c-(-A-L-$R^3$-L)d-,  Formula (VI):

and at least one end group derived from the first monomer, as described above, i.e., including at least one functional group "E-A-" in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, O$R^8$, NH$R^8$, N($R^8$)$_2$, azido, CN, or S$R^8$, and each $R^8$ independently is an organic moiety.

In the forgoing Formulas (I), (II), (III), (IV), (V), and (VI), each A independently is SO$_2$, C(=O), or Het, preferably SO$_2$; each $R^2$ and $R^5$ independently comprises a first organic moiety; each Het independently is an aromatic heterocycle comprising at least two carbon atoms and at least nitrogen atom in a heteroaromatic ring thereof (preferably 1,3,5-triazine); each L and $L^1$ independently is O, S, or N($R^4$), preferably O; each $R^3$ and $R^5$ independently comprises a second organic moiety; each $R^4$ independently is a third organic moiety; each of x, y, z, m, a, b, c, and d is the average number of respective repeating units in the polymer chain; each of x, y, z, m, and p has a value of at least 10 (e.g., 10 to 100,000 or more); and each of and a, b, c, and d can be 0 or greater, so long as the sum of a, b, c, and d has a value of at least 10 (e.g., 10 to 100,000 or more). Each of A, L, $L^1$, $R^2$, $R^3$, and $R^5$ independently are defined as described above for the monomer formulas.

In any of the polymers described herein each of the organic moieties, e.g., $R^2$, $R^3$, $R^4$, $R^5$, and $R^8$, independently can be selected from the group consisting of consisting of a hydrocarbon, a heterocycle, a carbohydrate, an amino acid, a polypeptide, a peptide analog, and a combination of two or more thereof. Additionally, $R^2$, $R^3$, $R^4$, $R^5$, and $R^8$ can be substituted with one or more functional group. Non-limiting examples of such functional groups include e.g., hydroxyl, halogen, nitro, —C(O)$R^6$, —C(O)O$R^6$, —C(O)N($R^6$)$_2$, —CN, —SO$_v$$R^6$, —SO$_v$N($R^6$)$_2$, $R^6$SO$_v$N($R^6$)—, —N($R^6$) SO$_v$$R^6$, —SO$_3$$R^6$, —N($R^6$)$_2$, —N($R^6$)O$R^6$, —N($R^6$)C(O) $R^6$, —N($R^6$)C(O)O$R^6$, —N($R^6$)C(O)N($R^6$)$_2$, —OC(O)N ($R^6$)$_2$, —OC(O)O$R^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, a polypeptide; wherein each $R^6$ independently is H, alkyl, or aryl, and v is 0, 1, or 2.

In some embodiments, preferred monomers include bisphenol fluorosulfates (e.g., bisphenol A fluorosulfate, bisphenol AF fluorosulfate, bisphenol S fluorosulfate, and related monomers with two phenolic groups tethered together) and bisphenol silyl ethers (e.g., bisphenol A silyl ether, bisphenol AF silyl ether, bisphenol S silyl ether, and related monomers with two phenolic groups tethered together).

Optionally, an end-capping monosilyloxy compound or monofluorosulfonyloxy compound can be included in the monomer mixture to limit or control the molecular weight of the resulting polymer by stopping chain growth at the fluoro or silyl end, respectively, of a polymer chain.

Certain non-limiting embodiments of the methods and materials described herein are illustrated below.

Embodiment 1 is a polymerization method comprising the step of combining a liquid monomer composition and a catalyst comprising an HF-fluoride salt of formula ($R^+$)(F (HF)$_w^-$), wherein $R^+$ is an organic cation or a chelated metal cation, and w is 1 or greater;

wherein the monomer composition comprises at least one compound of formula F-X-F and at least one compound of formula ($R^1$)$_3$Si—Z—Si($R^1$)$_3$;

each $R^1$ independently is a hydrocarbyl group;

X has the formula -A(-$R^2$-A)n-;

each A independently is SO$_2$, C(=O), or Het;

$R^2$ comprises a first organic moiety;

n is 0 or 1;

Het is an aromatic heterocycle comprising at least two carbon atoms and at least one nitrogen atom in a heteroaromatic ring thereof, and when A is Het, the F substituent is attached to a carbon atom of the heteroaromatic ring thereof;

Z has the formula -L-$R^3$-L-;

each L independently is O, S, or N($R^4$);

$R^3$ comprises a second organic moiety;

each $R^4$ independently is H or a third organic moiety; and wherein the F and ($R^1$)$_3$Si substituents form a silyl fluoride byproduct of formula ($R^1$)$_3$Si—F as the respective A and L groups of the monomers condense to form an X-Z polymer chain.

Embodiment 2 is the method of Embodiment 1, wherein $R^+$ is selected from an organosulfonium ion, an organophosphonium ion, a quaternary ammonium ion, a quaternized nitrogen heteroaromatic ion, a cationic polymer, and a chelated metal ion.

Embodiment 3 is the method of Embodiment 1 or Embodiment 2, wherein R+ comprises an organophosphonium ion.

Embodiment 4 is the method of any one of Embodiments 1 to 3, wherein R+ comprises a quaternary ammonium ion.

Embodiment 5 is the method of any one of Embodiments 1 to 4, wherein R+ comprises a quaternized heteroaromatic ion.

Embodiment 6 is the method of any one of Embodiments 1 to 5, wherein R+ comprises an organosulfonium ion.

Embodiment 7 is the method of any one of Embodiments 1 to 6, wherein:
each $R^1$ independently is an alkyl or aryl group;
X has the formula $-A(-R^2-A)n-$;
each A is $SO_2$;
$R^2$ comprises a first organic moiety;
n is 0 or 1;
Z has the formula $-L-R^3-L-$;
each L independently is O; and
$R^3$ comprises a second organic moiety comprising at least one aryl or heteroaryl group directly bonded to each L.

Embodiment 8 is the method of any one of Embodiments 1 to 7, wherein the n is 0.

Embodiment 9 is the method of any one of Embodiments 1 to 8, wherein Het is a 1,3,5-triazine.

Embodiment 10 is the method of any one of Embodiments 1 to 9, wherein the monomer composition includes a compound in which X includes an additional F substituent on a sulfonyl, carbonyl, or heteroaryl activating group, A, such that the additional F substituent also reacts with a $(R^1)_3Si$ substituent on an oxygen, sulfur or nitrogen atom linking group, L, to form a silyl fluoride, and the activating group condenses with the linking group to introduce a branch point in the polymer.

Embodiment 11 is the method of any one of Embodiments 1 to 10, wherein the monomer composition includes a compound in which Z includes an additional silyl substituent, $(R^1)_3Si$, on an oxygen, sulfur or nitrogen atom linking group, L, such that the additional silyl substituent also reacts with a F substituent on a sulfonyl, carbonyl, or heteroaryl activating group, A, to form a silyl fluoride and the linking group condenses with the activating group to introduce a branch point in the polymer.

Embodiment 12 is the method of any one of Embodiments 1 to 11, wherein n is 1; $R^2$ is $-L^1-R^5-L^1-$; each $L^1$ independently is selected from the group consisting of O, S, and $N(R^4)$; and each $R^4$ independently is H or the third organic moiety, and $R^5$ comprises an organic moiety.

Embodiment 13 is the method of any one of Embodiments 1 to 12, wherein n is 1; $R^2$ is $-L^1-R^5-$; $L^1$ is selected from the group consisting of O, S, and $N(R^4)$; $R^4$ s H or the third organic moiety; and $R^5$ is an organic moiety.

Embodiment 14 is the method of any one of Embodiments 1 to 13, wherein the catalyst comprises tris(dimethylamino)sulfonium bifluoride.

Embodiment 15 is the method of any one of Embodiments 1 to 14, wherein each A is $SO_2$.

Embodiment 16 is the method of any one of Embodiments 1 to 15, wherein each $R^2$ comprises an aryl or heteroaryl moiety either directly bonded to an A group or bonded to A via an oxygen atom attached to the aryl or heteroaryl moiety.

Embodiment 17 is the method of any one of Embodiments 1 to 16, wherein the polymer comprises a polymeric chain represented by a formula selected from the group consisting of:

| | |
|---|---|
| $(-A(-R^2-A)n-L-R^3-L)x-$; | Formula (I): |
| $(-A-R^2-A-L-R^3-L)y-$; | Formula (II): |
| $(-A-L^1-R^5-L^1-A-L-R^3-L)z-$; | Formula (III): |
| $(-A-L^1-R^5-A-L-R^3-L)m-$; | Formula (IV): |
| $(-A-L-R^3-L)p-$; and | Formula (V): |
| $(-A-R^2-A-L-R^3-L)a-(-A-L^1-R^5-L^1-A-L-R^3-L)b-(A-L^1-R^5-A-L-R^3-L)c-(-A-L-R^3-L)d-$; | Formula (VI): | wherein:
each A independently is $SO_2$, C(=O), or Het;
each L and $L^1$ independently is O, S, or $N(R^4)$;
each $R^2$ and $R^5$ independently comprises a first organic moiety;
each $R^3$ comprises a second organic moiety;
each $R^4$ independently is H or a third organic moiety;
each n independently is 0 or 1;
each Het independently is an aromatic heterocycle comprising at least two carbon atoms and at least one nitrogen atom in a heteroaromatic ring thereof, and when A is Het, the F substituent is attached to a carbon atom of the heteroaromatic ring thereof;
each of x, y, z, m, and p is the average number of repeating units in the polymer and has a value of at least 10; and
each of a, b, c, and d is the average number of respective repeating units, and independently can be 0 or greater, provided the sum of a, b, c, and d is at least 10.

Embodiment 18 is the method of any one of Embodiments 1 to 17, wherein one or more of the $R^2$, $R^3$, $R^4$, and $R^5$, comprises a moiety selected from the group consisting of a hydrocarbon, a heterocycle, a carbohydrate, an amino acid, a polypeptide, a peptide analog, and a combination of two or more thereof.

Embodiment 19 is the method of any one of Embodiments 1 to 18, wherein one or more of $R^1$, $R^3$, R, R and $R^5$ is substituted by at least one substituent selected from the group consisting of hydroxyl, halogen, nitro, $-C(O)R^6$, $-C(O)OR^6$, $-C(O)N(R^6)_2$, $-CN$, $-SO_vR^6$, $-SO_vN(R^6)_2$, $R^6SO_vN(R^6)-$, $-N(R^6)SO_vR^6$, $-SO_3R^6$, $-N(R^6)_2$, $-N(R^6)OR^6$, $-N(R^6)C(O)R^6$, $-N(R^6)C(O)OR^6$, $-N(R^6)C(O)N(R^6)_2$, $-OC(O)N(R^6)_2$, $-OC(O)OR^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each R independently is H, alkyl, or aryl, and v is 0, 1, or 2.

Embodiment 20 is the method of any one of Embodiments 1 to 19, wherein the monomer composition comprises (a) two or more different compounds of formula F-X-F, (b) two or more different compounds of formula $(R^1)_3Si-Z-Si(R^1)_3$, or (c) c combination of both (a) and (b).

Embodiment 21 is the method of Embodiment 20, wherein the two or more different compounds of formula $(R^1)_3Si-Z-Si(R^1)_3$ differ by the selection of $R^1$, Z, or both $R^1$ and Z.

Embodiment 22 is the method of any one of Embodiments 1 to 21, wherein the monomer composition comprises at least one compound of Formula VII and at least one compound of Formula VIII:

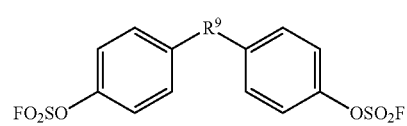

VII

-continued

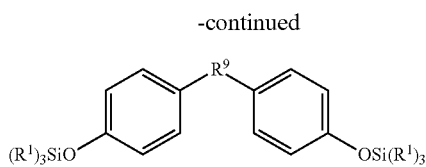

VIII wherein each $R^1$ independently is an alkyl or aryl group, and each $R^9$ independently is a covalent bond, $C(CH_3)_2$, $C(CF_3)_2$, or $SO_2$.

Embodiment 23 is the method of any one of Embodiments 1 to 22, wherein the liquid monomer mixture comprises a melted mixture of the monomers.

Embodiment 24 is the method of any one of Embodiments 1 to 22, wherein the liquid monomer mixture comprises a solution of the monomers in a solvent.

Embodiment 25 is the method of Embodiment 23, wherein the solvent is a polar aprotic solvent.

Embodiment 26 is the method of any one of Embodiments 1 to 25, wherein the F-X-F monomer comprises sulfuryl fluoride ($FSO_2F$).

Embodiment 27 is the method of any one of Embodiments 1 to 26, wherein the F-X-F monomer comprises a bisfluorosulfonyl monomer of formula F—$SO_2$—$CH_2CH_2$—N($R^{11}$)—$CH_2CH_2$—$SO_2$—F, wherein $R^{11}$ comprises an organic moiety.

Embodiment 28 is the method of Embodiment 27, wherein $R^{11}$ comprises a moiety selected from the group consisting of a hydrocarbon, a heterocycle, a carbohydrate, an amino acid, a polypeptide, a peptide analog, and a combination of two or more thereof.

Embodiment 29 is the method of Embodiment 27 or Embodiment 28, wherein $R^{11}$ is substituted by at least one substituent selected from the group consisting of hydroxyl, halogen, nitro, —$C(O)R^6$, —$C(O)OR^6$, —$C(O)N(R^6)_2$, —CN, —$SO_vR^6$, —$SO_vN(R^6)_2$, $R^6SO_vN(R^6)$—, —$N(R^6)SO_vR^6$, —$SO_3R^6$, —$N(R^6)_2$, —$N(R^6)OR^6$, —$N(R^6)C(O)R^6$, —$N(R^6)C(O)OR^6$, —$N(R^6)C(O)N(R^6)_2$, —$OC(O)N(R^6)_2$, —$OC(O)OR^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each $R^6$ independently is H, alkyl, or aryl, and v is 0, 1, or 2.

Embodiment 30 is the method of any one of Embodiments 1 to 29 wherein the polymer product is isolated without purification such that the catalyst remains in the polymer.

Embodiment 31 is the method of any one of Embodiments 1 to 30 wherein the catalyst is included at a concentration in the range of about 0.001 mol % to about 1 mol % based on the total moles of monomers.

Embodiment 32 is the method of any one of Embodiments 1 to 31, wherein an end-capping monosilyloxy compound or monofluorosulfonyloxy compound is included in the monomer mixture to limit or control the molecular weight of the resulting polymer by stopping chain growth at the fluoro or silyl end, respectively, of a polymer chain.

Embodiment 33 is the method of any one of Embodiments 1 to 32, wherein the catalyst is generated in situ from a precursor compound.

Embodiment 34 is the method of any one of Embodiments 1 to 33, wherein the method is performed at a temperature in the range of about 20 to about 250° C.

In any of the embodiments described herein, one or more of the A groups (i.e., $SO_2$, C(=O), or Het) of the fluorinated monomer, F-X-F, can be replaced with a group of formula S(=O)(=$NR^{12}$), i.e., to form a monomer with a —S(=O)(=$NR^{12}$)F functional group in place of an $SO_2F$, C(=O)F, or Het-F group. Optionally, the catalyst can be generated in situ from a precursor compound, e.g., generation of $TASHF_2$ from TASF and water.

BRIEF DESCRIPTION OF THE DRAWINGS

Figure 5:
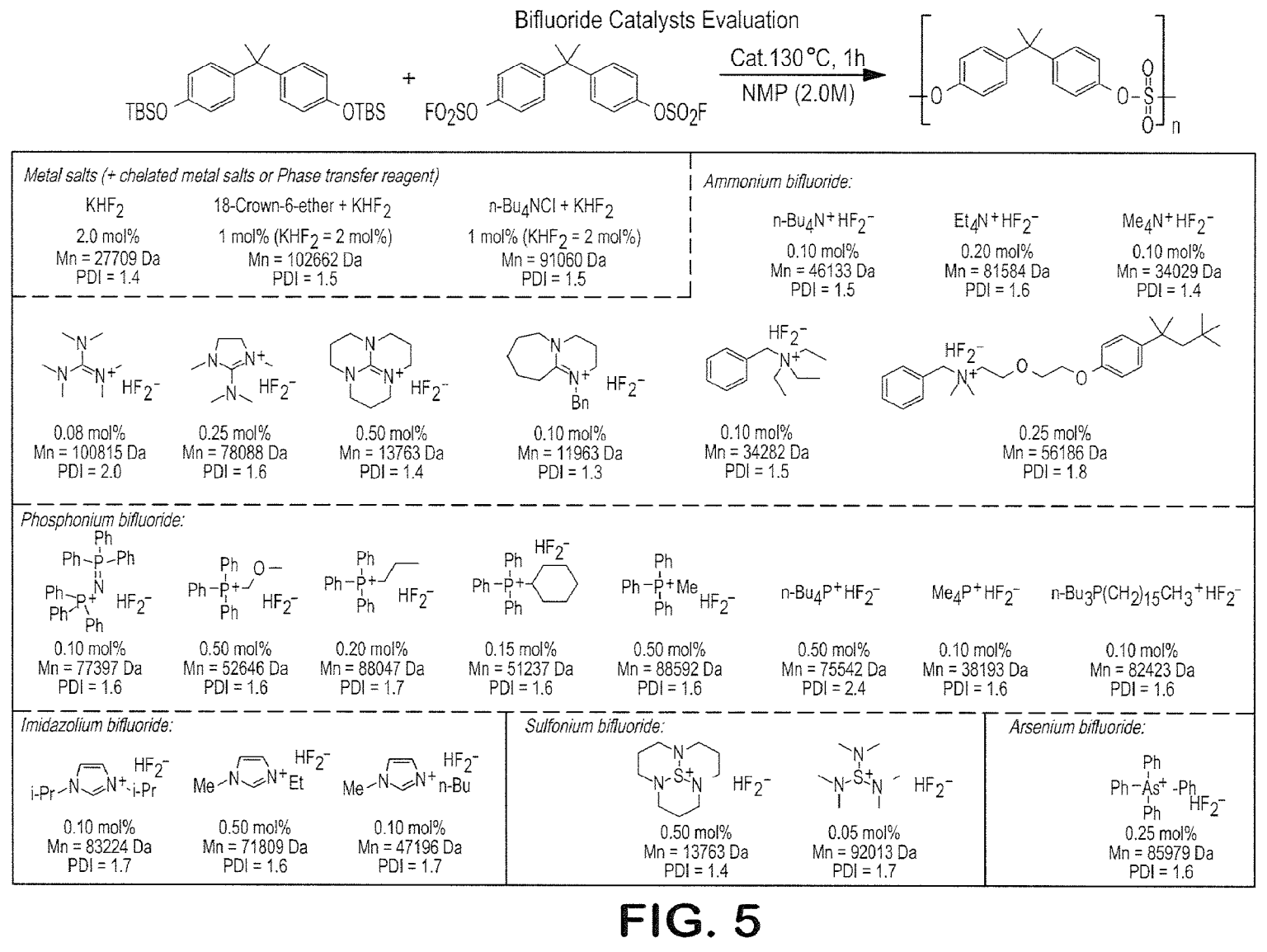

FIG. 5 illustrates effects of various catalyst and solvent combinations on the polymerization process.

DETAILED DESCRIPTION

Figure 1:
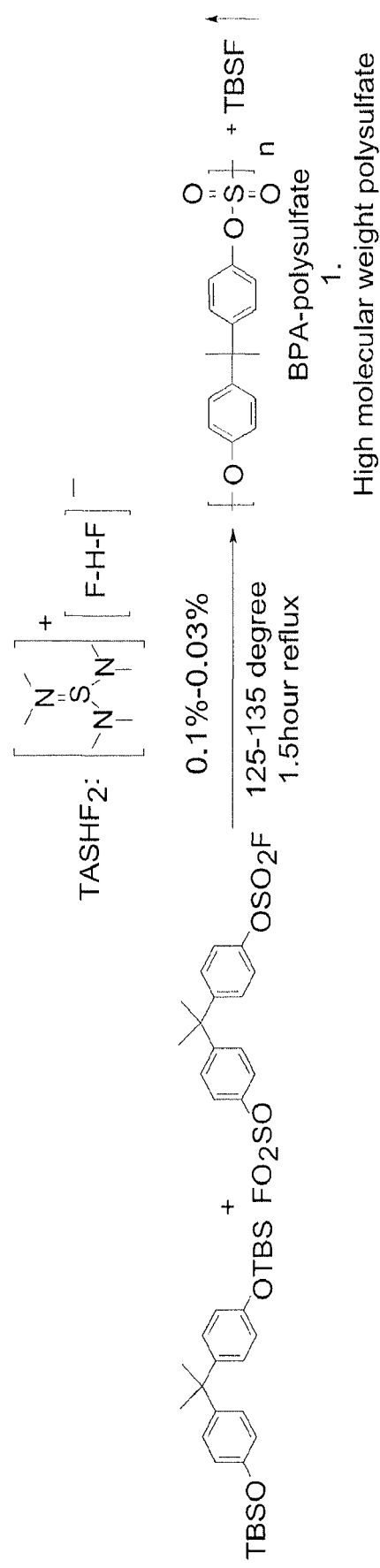
FIG. 1 illustrates a typical reaction scheme for preparing a polysulfate polymer according to the methods described herein.

The present polymerization method can provide a wide variety of monomer structures, functional substituents, and monomer-to-monomer linkages. In some embodiments, the polymerization method comprises, consists essentially of, or consists of contacting at least one bis-fluorinated first monomer, F-X-F, with at least one bis-silylated second monomer, $(R^1)_3Si$—Z—$Si(R^1)_3$, in the presence of a bifluoride or polyHF fluoride catalyst of formula $(R^+)(F(HF)_w^-)$, wherein $R^+$ is an organic cation or a chelated metal cation, and w is 1 or greater. The fluoro substituents of the first monomer are attached to a sulfonyl, carbonyl, or heteroaryl portion of X, and the silyl groups of the second monomer are attached to an oxygen, sulfur or nitrogen atom of Z. In the presence of the catalyst, a fluoro substituent of the first monomer reacts with a silyl substituent of the second monomer to form a silyl fluoride compound. At the same time, a sulfonyl, carbonyl, or heteroaryl group of the first monomer condenses with an oxygen, sulfur or nitrogen atom of the second monomer to which the silyl groups was attached, to thereby form a linear alternating polymer chain with X-Z repeating units.

The cation of the HF-fluoride catalyst can be an onium cation such as a quaternary ammonium cation, an organosulfonium cation, an organophosphonium cation, a quaternary ammonium cation, a quaternized nitrogen heteroaromatic cation, as well as a cationic polymer, including both an insoluble and a soluble polymer (e.g., cationic polystyrene beads with appended quaternary ammonium groups). The cation also can be a chelated metal cation, preferably comprising a monovalent metal ion (e.g., an alkali metal such as potassium and the like) complexed with a chelating ligand, e.g., a neutral (non-charged) ligand such as a crown ether (e.g., 18-crown-6 and the like).

In some embodiments, the HF-fluoride catalyst comprises a tris(dialkylamino)sulfonium bifluoride salt of formula: $(R^a{}_2N)_3S^+(FHF)^-$ wherein each $R^a$ independently is an alkyl group comprising 1 to 20 carbon atoms, or two $R^a$ groups together comprise a 4 or 5 carbon alkylidene group (e.g., —$CH_2$—$CR^x{}_2$—$CH_2$—, or —$CH_2CR^x{}_2CR^x{}_2CH_2$— wherein each $R^x$ independently is H or alkyl) thereby forming a 5 or 6 membered ring with the N atom attached thereto; each $R^a$ alkyl or alkylidene group includes at least two hydrogen atoms on a carbon atom adjacent to the sulfur atom thereof, and each $R^a$ independently can be linear or branched; or a polyHF fluoride analog thereof. The tris (dialkylamino)sulfonium bifluoride salt can be prepared, e.g., by the methods described in U.S. Pat. No. 4,598,161 to Farnham et al., which is incorporated herein by reference in its entirety, e.g., hydrolysis, methanolysis, or pyrolysis of a tris(dialkylamino)sulfonium difluorotrimethyl silicate. Tris (dialkylamino)sulfonium difluortrimethylsilicates are well known in the art, and can be prepared according to the methods described in U.S. Pat. No. 3,940,402 to Middleton, which is incorporated herein by reference in its entirety.

The catalysts can be utilized at any catalyst loading that produces a polymer product; e.g., typically at a catalyst loading in the range of about 0.0001 mol % to about 10 mol % based on the total moles of monomers, depending on the monomers being polymerized and the particular bifluoride catalyst selected. In some embodiments the catalyst is utilized at a concentration in the range of about in the range of about 0.001 mol % to about 1 mol % (e.g., 0.01 to about 0.1 mol %) based on the total moles of monomers.

Non-limiting examples of tris(dialkylamino)sulfonium bifluoride salts useful as catalysts in the bifluoride catalyzed polymerization methods described herein include, e.g., tris (dimethylamino)sulfonium bifluoride, tris(diethylamino) sulfonium bifluoride, tris(methylethylamino)sulfonium bifluoride, tris(n-propylamino)sulfonium bifluoride, tris(di-n-propylamino)sulfonium bifluoride, bis(di-n-propylamino) (dimethylamino)sulfonium bifluoride, bis(dimethylamino) (N-octadecyl-N-methylamino)sulfonium bifluoride, tris (piperidino)sulfonium bifluoride, tris(pyrrolidino)sulfonium bifluoride, bis(dimethylamino)pyrrolidinosulfonium bifluoride, bis(pyrrolidino)(dimethylamino)sulfonium bifluoride, tris(N-methyl-N-octadecylamino)sulfonium bifluoride, tris (4-methylpiperidino)sulfonium bifluoride, and bis(dimethylamino)(diethylamino)sulfonium bifluoride.

Optionally, the HF-fluoride catalysts can be utilized in combination with the basic catalysts described in PCT/US2013/072871 to Dong et al. (published as WO 2014/089078), such as 1,8-diazabicyclo[5.4.0]undec-7-ene (DBU), 2-tert-butylimino-2-diethylamino-1,3-dimethylperhydro-1,3,2-diazaphosphorine (BEMP). Such combinations can be useful to ameliorate the high reactivity of the HF-fluoride catalysts, e.g., to moderate the polymerization rate, control the molecular weight of the polymer, and the like. For example, an amount (e.g., less than 90, 80, 70, 60, 50, 40, 30, 20, 10, 5, 3, or 1 mol % based on total moles of catalyst) of the basic catalyst can be combined with the HF-fluoride catalyst, or can be added separately to the monomer mixture, before or during the polymerization, and/or to curtail the polymerization after it has proceeded to a desired degree of polymerization.

As described in detail herein, the first monomer can be represented by the formula F-A(-$R^2$-A)n-F, wherein each A independently is $SO_2$, C(=O), or Het; $R^2$ comprises a first organic moiety; n is 0 or 1; and Het is an aromatic heterocycle comprising at least two carbon atoms (e.g., 2 to 4) and at least one (e.g., 1 to 4) nitrogen atoms in a heteroaromatic ring thereof. When A is Het, each F is attached to a carbon atom of the heteroaromatic ring. A particularly preferred A group is $SO_2$. When n is 0, the first monomer can be represented by the formula F-A-F (i.e., $FSO_2F$, FC(O)F, and F-Het-F). When n is 1, the first monomer can be represented by the formula F-A-$R^2$-A-F. In some embodiments, first organic moiety, $R^2$, can be represented by the formula -$L^1$-$R^5$-$L^1$-, in which in which each $L^1$ independently is selected from the group consisting of O, S, and $N(R^4)$; $R^5$ comprises a first organic moiety, and $R^4$ is H or a third organic moiety. In some other embodiments, the first organic moiety, $R^2$, can be represented by the formula -$L^1$-$R^5$—, in which in which $L^1$ independently is selected from the group consisting of O, S, and $N(R^4)$; $R^5$ comprises a first organic moiety, and $R^4$ is H or a third organic moiety.

The second monomer, $(R^1)_3Si$—Z—$Si(R^1)_3$, can be represented by the formula $(R^1)_3Si$-L-$R^3$-L-$Si(R^1)_3$, in which each L independently is O, S, or $N(R^4)$; $R^3$ comprises a second organic moiety; and $R^4$ is H or a third organic moiety.

Figure 2:
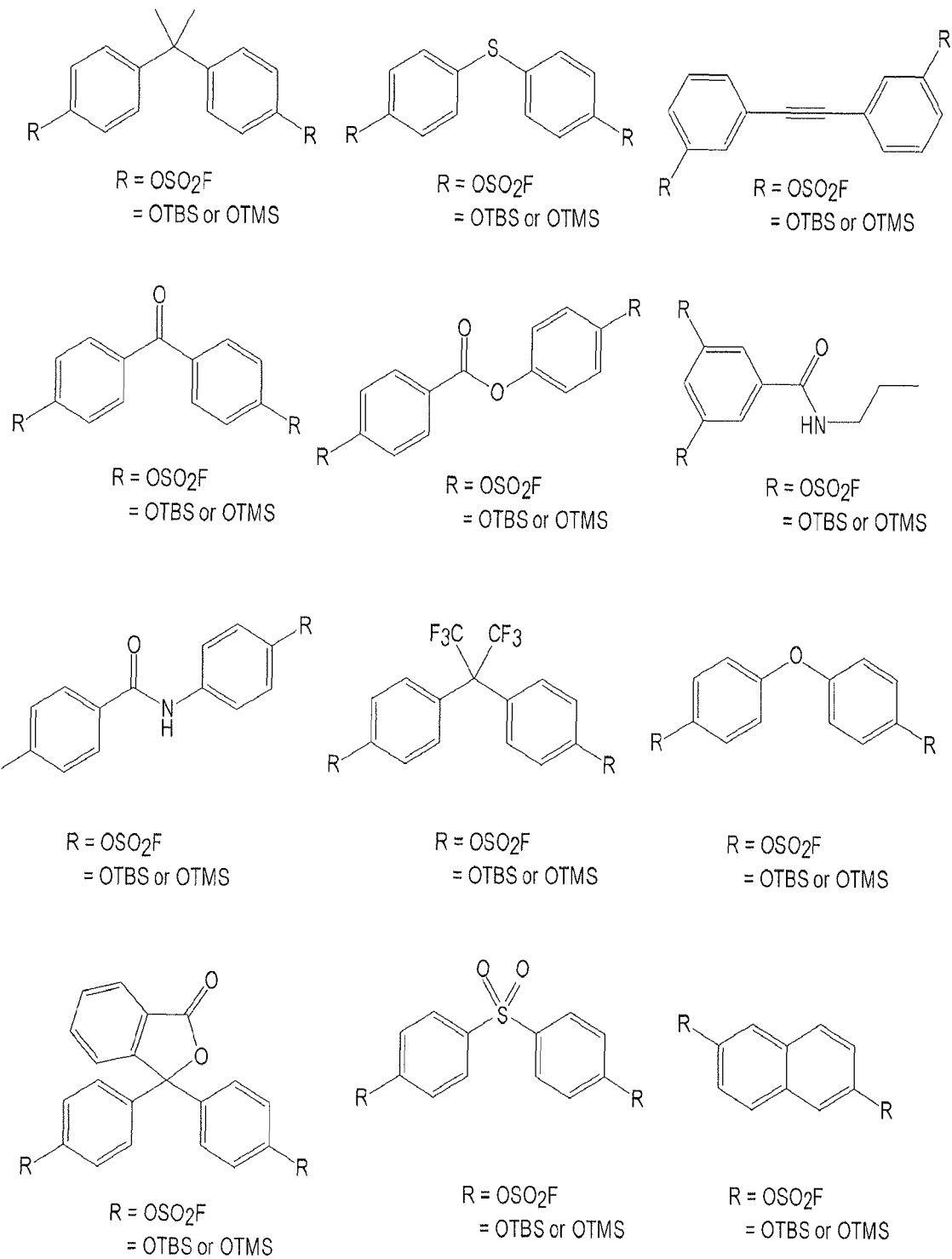
FIG. 2 illustrates non-limiting examples of fluorosulfate and silylated monomers, which can be utilized in the polymerization methods described herein.

FIG. 1 illustrates the reaction of silyl and fluoro monomers in the presence of and HF-fluoride catalyst, such as a tris(dialkylamino)sulfonium bifluoride salt to form a polysulfate polymer. Non-limiting examples of some bis-fluorosulfate and bis-silylated monomers that can be utilized in the methods described herein, are shown in FIG. 2. Other non-limiting examples of fluorinated and silylated monomers that can be utilized in the bifluoride catalyzed polymerization processes described herein include any of the specific monomer compounds disclosed in WO 2014/089078 to Dong et al.

The X and Z portions of the polymer chain are connected to each other through a linkage such as —$SO_2$-L-, —C(=O)-L-, -Het-L-, -$L^1$-$SO_2$-L-, -$L^1$-C(=O)-L-, or -$L^1$-Het-L-, in which each L and $L^1$ independently is selected from the group consisting of O, S, and $N(R^4)$; and each $R^4$ independently comprises H or an organic moiety. As described herein, Z comprises an organic moiety bearing the oxygen, sulfur or nitrogen atoms, and X can be the sulfonyl, carbonyl, or heteroaryl activating group, or alternatively, X can comprise an organic core group bearing the sulfonyl, carbonyl, or heteroaryl activating groups. In some polymer embodiments, the sulfonyl, carbonyl, and heteroaryl activating groups of X are attached directly to a carbon atom of the first organic moiety (if present) in X. Alternatively, or in addition, the sulfonyl, carbonyl, and heteroaryl groups of X can be attached to the organic moiety thereof through a sulfur, oxygen, or nitrogen atom.

The heteroaryl groups (also referred to herein as heteroaromatic groups, or "Het") to which the fluoro substituents of the first monomer can be attached include any heterocyclic moiety that comprises at least one nitrogen atom (e.g., 1 to 4 nitrogen atoms), and at least two carbon atoms (e.g., 2 to 4 carbon atoms) in an aromatic ring (e.g., a 5-membered aromatic ring or 6-membered aromatic ring), and the fluoro substituents are attached to carbon atoms in the aromatic ring.

Non-limiting examples of suitable heteroaryl groups, Het, comprising a 6-membered heteroaromatic ring include azabenzene heterocyclic groups such as a pyridine, a diazine (e.g., a 1,2-diazine, a 1,3-diazine or a 1,4-diazine), and a triazine (e.g., a 1,3,5-triazine); azanaphthalene groups such as a 1-azanaphthalene (also known as a quinoline), a 2-azanaphthalene (also known as an isoquinoline), a 1,2- diazanaphthalene (also known as a cinnoline), a 2,3-diazanaphthalene (also known as a phthalazine), a 1,3-diazanaphthalene (also known as a quinazoline), a 1,4-diazanaphthalene (also known as a quinoxaline), a 1,5-diazanaphthalene, a 1,6-diazanaphthalene, a 1,7-diazanaphthalene, a 1,8-diazanaphthalene, a 1,3,5-triazanaphthaline, a 1,3,8-triazanaphthalene, and a 1,3,5,8-tetraazanaphthaline (also known as a pteridine), azaphenanthroline groups such as a 1,10-diazaphenanthroline; and the like. Non-limiting examples of suitable heteroaryl groups, Het, comprising a 5-membered heteroaromatic ring include a pyrrole, an imidazole, an oxazole, a thiazole, a pyrazole, an isoxazole, an isothiazole, as well as condensed 5- and 6-membered heterocycles such as an indole, an isoindole, a benzothiazole, a benzoxazole, a purine, and the like.

As described herein, the Z portion of the second monomer, and optionally, the X portion of the first monomer can comprise any organic moiety (e.g., $R^2$, $R^3$, $R^4$ and $R^5$) groups in the formulas described herein, since the reactivity of the monomers toward polymerization primarily is controlled by the bifluoride salt catalyst, and the combination of the activating sulfonyl, carbonyl, and heteroaryl groups of the first monomer, the oxygen, sulfur and nitrogen atoms in the second monomer, and the formation of the thermodynamically stable silyl fluoride byproduct from the respective fluoro and silyl substituents of the first and second monomers.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

As used herein, the term "organic" and grammatical variations thereof, in reference to a group or moiety, refer to a material comprising carbon, typically in combination with at least some hydrogen, and optionally including one or more other element, such as oxygen, sulfur, nitrogen, phosphorous, a halogen, or another non-metal or metalloid element from groups II-A (e.g., B), IV-A (e.g., Si), V-A (e.g., As), VI-A (e.g., Se) of the periodic table. The term "organic" also refers to materials traditionally described as organometallic materials (e.g., comprising one or more main group of or transition metal atoms covalently bound to a carbon atom), as well as materials that include metallic elements in a complex or as a salt with an organic moiety. Non-limiting examples of organic moieties or groups include, hydrocarbons, heterocycles (including materials comprising at least one saturated, unsaturated and/or aromatic ring comprising at least one carbon atom, and one or more other elements), carbohydrates (including sugars and polysaccharides), amino acids, polypeptides (including proteins and other materials comprising at least two amino acid groups bound together via a peptide bond), peptide analogs (including materials comprising two or more amino acids linked by a bond other than a peptide bond, e.g., ester bonds), and a combination of two or more thereof.

Additionally, the organic moieties $R^2$, $R^3$, $R^4$, $R^5$ and $R^8$ can be substituted with one or more functional group. Non-limiting examples of such functional groups include e.g., hydroxyl, halogen, nitro, —C(O)$R^6$, —C(O)O$R^6$, —C(O)N($R^6$)$_2$, —CN, —SO$_v$$R^6$, —SO$_v$N($R^6$)$_2$, $R^6$SO$_v$N ($R^6$)—, —N($R^6$)SO$_v$$R^6$, —SO$_3$$R^6$, —N($R^6$)$_2$, —N($R^6$)O$R^6$, —N($R^6$)C(O)$R^6$, —N($R^6$)C(O)O$R^6$, —N($R^6$)C(O)N($R^6$)$_2$, —OC(O)N($R^6$)$_2$, —OC(O)O$R^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, a polypeptide; wherein each $R^6$ independently is H, alkyl, or aryl, and v is 0, 1, or 2.

The term "hydrocarbon" and grammatical variations thereof is well known in the art and refers to an organic compound consisting entirely of hydrogen and carbon. Hydrocarbons can be saturated (contain no multiple bonds), unsaturated (containing at least one double or triple bond, or aromatic (containing an aromatic ring system such as a benzene ring, or a condensed aromatic ring system such as a naphthalene, anthracene, and similar systems). Hydrocarbons can include of linear chains of carbons atoms, branched chains of carbon atoms, rings of carbon atoms, or any combination thereof. Non-limiting examples of hydrocarbons include alkanes, alkenes, alkynes, cycloalkanes and alkyne-based compounds.

The term "hydrocarbyl" and grammatical variations thereof refers to univalent groups formed by removing a hydrogen atom from a hydrocarbon, e.g. ethyl, phenyl.

The term "carbohydrate" and grammatical variations thereof is well known in the art refers to, for example, polyhydroxylated compounds that formally have an empirical elemental formula (CH$_2$O)x in which x is >1. Non-limiting examples of carbohydrates include sugars (e.g., glucose, maltose), polysaccharides (e.g., starches, cellulose), and modified versions of sugars and polysaccharides (e.g., comprising one or more functional group in place of or in addition to hydroxyl groups, such as amino, ethers, esters), as well as deoxy sugars and deoxy polysaccharides (i.e., sugars and polysaccharides in which an OH has been replaced by an H), and the like. The carbohydrates can be naturally occurring materials, synthetic materials, or a combination thereof.

The term "amino acid" and grammatical variations thereof is well known in the art and refers to, for example, organic compounds comprising at least one amino group, and at least one carboxylic acid group. Examples of amino acids include natural or synthetic alpha-amino acids (e.g., the common proteogenic amino acids, as well as non-proteogenic amino acids such as ornithine, which can be chiral materials, e.g., levo or dextro stereoisomers, or mixtures thereof, or achiral materials, depending on the structure), as well as compounds in which the amino group and carboxylic acid group are separated by more than one carbon.

The term "polypeptide" and grammatical variations thereof is well known in the art and refers to, e.g., materials including two or more amino acids (generally alpha-amino acids) joined together by peptide (amide) bonds between the carboxylic acid group (typically an alpha-carboxylic acid group) of one amino acid and the amino group (typically the alpha-amino group) of another amino acid. As used herein, the term polypeptide also encompasses proteins, as well as materials having a polypeptide core structure with additional functional or protecting groups appended to the polypeptide backbone. The term "peptide analog" and grammatical variations thereof refers to polypeptide-like materials in which one or more peptide bond is replaced by a non-peptide linkage, such as an ester, an ether, and the like.

Molecular weight values such as number average molecular weight ($M_n$) and weight average molecular weight ($M_w$), as well as polydispersity index values ("PDI", i.e., $M_w/M_n$) used herein are based on either gel permeation chromatography (GPC) versus polystyrene standards, unless otherwise specified. Molecular weight parameters for which there is no explicit description or contextual implication of being GPC values should be interpreted as GPC-derived values. The molecular weight values are reported in units of g/mol (also referred to as Daltons, "Da") or Kg/mol (also referred to as kDa).

Surprisingly, the polymerization methods described herein can be performed under a variety of relatively mild reaction conditions. The reaction routinely can be run at temperatures ranging from ambient room temperature (e.g., about 20 to 25° C.) to about 200° C. When the polymerizations are performed without solvent (neat), a temperature sufficient to melt the monomers may be desired. Preferably, the first and second monomers are reacted in approximately equimolar amounts (based on the moles of F and silyl substituents present) or with an excess (e.g., 0.01 up to about 10 mol % excess) of the fluorinated first monomer.

As described herein, the first and second monomers can be contacted with one another neat or in a solvent. Non-limiting examples of suitable solvents include a halogenated hydrocarbons (e.g., dichloromethane, chloroform, carbon tetrachloride, perchloroethane, chlorofluorocarbons, fluorocarbons, and the like), ethers (e.g., diethyl ether, tetrahydrofuran, dimethoxyethane, and the like), esters (e.g., ethyl acetate), nitriles (e.g., acetonitrile, and the like), ketones (e.g., acetone, methylethylketone), pyridines (e.g., pyridine, picolines, and the like), amides (e.g., NMP, DMF, acetamide, dimethylacetamide, and the like), sulfoxides (e.g., DMSO, and the like), and sulfones (e.g., sulfolane, dimethylsulfone, and the like). Preferably, the solvent is non-aqueous and aprotic. For example, the solvent can be a polar aprotic solvent such as, e.g., an amide, a nitrile, a sulfoxide, a sulfone, and the like. If desired, mixed solvent systems can be used, or the polymerization reaction can be performed sequentially in different solvents or in a combination of solventless and solution conditions (e.g., beginning in one solvent (or solventless) and completing the polymerization in another solvent). In some preferred embodiments the monomers are reacted neat in a melt phase.

The silyl fluoride byproduct of the polymerization is readily separable from the polymer product by any of a number of methods that are well-known to those of ordinary skill in the chemical arts. For example, the silyl fluoride can be removed by distillation or evaporation either at ambient atmospheric pressure or reduced pressure, depending of the boiling point of the silyl fluoride. Alternatively, or in addition, silyl fluoride byproducts, which tend to be relatively nonpolar, can be removed from the polymer product by washing with a solvent that will dissolve the silyl fluoride but not the polymer product (e.g., a hydrocarbon solvent). The silyl fluoride byproduct also can be recycled by reaction with a salt of a bis-phenolic monomer precursor (e.g., bisphenol A) to form a bis-silyl ether-type monomer.

The polymeric materials obtained from the methods described herein preferably have a degree of polymerization (i.e., average number of monomer units) of at least about 10 and more preferably greater than 10 (e.g., 10 up to about 100, 200, 300, 400, 500, 1,000, 10,000, 100,000 or greater).

In the methods described herein, the first and second monomers can each comprise a single monomeric material, or a combination to two or more monomeric materials, either as a mixture or added sequentially to the polymerization reactions. For example, the first monomer, F-X-F, can comprise a combination of two or more monomeric materials with different X groups. Similarly, the second monomer, $(R^1)_3Si$—Z—$Si(R^1)_3$, can comprise a combination of two or more monomeric materials having different $R^1$ groups, different Z groups, or both. Such combinations of monomers can be formulated in any desired proportion, as described herein, or can be separately added to the polymerization mixture. The polymers resulting from such combinations of monomeric materials can include randomly distributed repeating units or can include blocks of repeating monomer units of the same structure, or both random and block segments, depending on the relative reactivity of the various monomers, as well as on whether the different monomeric materials were mixed together initially, or were contacted in a serial fashion, or some combination of mixed and serial addition.

As a non-limiting example, a mixture of first monomers can include 90 mole percent (mol %) of F—$SO_2$—F and 10 mol % of F—$SO_2$—$CH_2$-Ph-$SO_2$—F. Reaction of this mixture of first monomers with a second monomer of formula $Me_3Si$—O-Ph-$CMe_2$-Ph-O—$SiMe_3$, would then provide a polymer of empirical formula: —($SO_2$—O-Ph-$CMe_2$-Ph-O-)e-($SO_2$—$CH_2$-Ph-$SO_2$—O-Ph-$CMe_2$-Ph-O-)f-, and having an approximate ratio of e:f of about 9:1 with the $SO_2$—O-Ph-$CMe_2$-Ph-O and $SO_2$—$CH_2$-Ph-$SO_2$—O-Ph-$CMe_2$-Ph-O repeating units likely distributed in a random manner throughout the polymer chain. Alternatively, block copolymers can be formed by contacting an amount (e.g., 9 moles) of a single first monomer composition, F—$SO_2$—F, and a greater molar amount (e.g., 10 moles) of single second monomer composition, $Me_3Si$—O-Ph-$CMe_2$-Ph-O—$SiMe_3$, to form a first uniform polymer chain segment, —($SO_2$—O-Ph-$CMe_2$-Ph-O-)e, and then an amount (e.g., 1 mole) of a different first monomer, F—$SO_2$—$CH_2$-Ph-$SO_2$—F, sufficient to react with the remaining amount of the second monomer to form a second polymer chain segment (e.g., —($SO_2$—$CH_2$-Ph-$SO_2$—O-Ph-$CMe_2$-Ph-O-)f), resulting in a block copolymer having block segments in an approximate molar proportion of a:b (i.e., about 9:1 in this example). As will be understood by those of ordinary skill in the polymer art, the second monomer also or alternatively can comprise multiple compounds having different Z groups, to produce polymers having multiple combinations of repeating units, for example, a polymer of the general formula -$(X^1-Z^1)\alpha$-$(X^1-Z^2)\beta$-$(X^2-Z^1)\gamma$-$(X^2-Z^2)\delta$ . . . -$(X'-Z')\omega$-, in which $\alpha$, $\beta$, $\gamma$, $\delta$, and $\omega$ are proportional to the relative amounts of each different first and second monomer present in the polymerization reaction mixture.

In some embodiments, at least a portion of the first monomer includes a branching monomer of the formula F-X-F, in which X includes an additional F substituent on an activating group selected from $SO_2$, $C(=O)$, and Het as defined elsewhere herein, such that the additional F substituent also reacts with a silyl substituent of the second monomer to form a silyl fluoride, and the additional activating group condenses with an L group of the second monomer to introduce at least one branch point in the polymer. For example, the first monomer can comprise or consist of a branching monomer having an organic core group, such as a phenyl group, substituted by three activated fluoro substituents, such as 1,3,5-tris-fluorosulfonylbenzene, or 2,4,6-trifluoro-1,3,5-triazine, in which the triazine is both the activating group (Het) and the organic core group. Additionally, or alternatively, the second monomer can include a branching monomer with an additional silyl substituent attached to an oxygen, sulfur or nitrogen atom. Reaction of the branching second monomer also results in the introduction of at least one branch point into the polymer, by condensation of the oxygen, sulfur or nitrogen atom with a sulfonyl, carbonyl or heteroaryl activating group of the first monomer, and concomitant reaction of the fluoro and silyl substituents to form a silyl fluoride, as described herein.

In any of the polymerization method embodiments described herein, the organic moieties, e.g., $R^2$, $R^3$, $R^4$, $R^5$ and $R^8$, can be selected from the group consisting of a hydrocarbon, a heterocycle, a carbohydrate, an amino acid, a polypeptide, a peptide analog, and a combination of two or more thereof. In some embodiments, $R^1$, $R^2$, $R^3$, $R^4$, and $R^5$, can include one of more substituent, e.g., hydroxyl, halogen, nitro, $—C(O)R^6$, $—C(O)OR^6$, $—C(O)N(R^6)_2$, $—CN$, $—SO_vR^6$, $—SO_vN(R^6)_2$, $R^6SO_vN(R^6)—$, $—N(R^6)SO_vR^6$, $—SO_3R^6$, $—N(R^6)_2$, $—N(R^6)OR^6$, $—N(R^6)C(O)R^6$, $—N(R^6)C(O)OR^6$, $—N(R^6)C(O)N(R^6)_2$, $—OC(O)N(R^6)_2$, $—OC(O)OR^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, a polypeptide; wherein each $R^6$ independently is H, alkyl, or aryl, and v is 0, 1, or 2.

Fluoro-substituted end groups of the polymer products, when present, can be used to functionally modify the ends of the polymer chain, e.g., by nucleophilic displacement of the F substituent by an oxygen, nitrogen, or sulfur-based nucleophile. This end group modification can be performed in the polymerization mixture at the end of the polymerization process (e.g., when the polymerization is performed in solution), or the resulting fluoro-capped polymer can be reacted with a nucleophile in a separate reaction after the initially formed polymer has been isolated. Non-limiting examples of suitable nucleophiles for displacement of the F substituent include hydroxy-substituted materials (e.g., alcohols and phenolic compounds), amines, azide, thiols, and the like.

In some embodiment, the polymers prepared by the methods described herein comprise a polymeric chain having a formula selected from the group consisting of:

(-A(-R²-A)n-L-R³-L)x-;  Formula (I):

(-A-R²-A-L-R³-L)y-;  Formula (II):

(-A-L¹-R⁵-L¹-A-L-R³-L)z-;  Formula (III):

(-A-L¹-R⁵-A-L-R³-L)m-;  Formula (IV):

(-A-L-R³-L)p-; and  Formula (V):

(-A-R²-A-L-R³-L)a-(-A-L¹-R⁵-L¹-A-L-R³-L)b-(A-L¹-R⁵-A-L-R³-L)c-(-A-L-R³-L)d-,  Formula (VI):

In the forgoing Formulas (I), (II), (III), (IV), (V), and (VI), each A independently is $SO_2$, $C(=O)$, or Het, preferably $SO_2$; each $R^2$ and $R^5$ independently comprises a first organic moiety; each Het independently is an aromatic heterocycle comprising at least two carbon atoms and one to four nitrogen atoms in a heteroaromatic ring thereof, in which each L is attached to a carbon atom of the heteroaromatic ring; each L independently is O, S, or $N(R^4)$, preferably O; each $R^3$ independently comprises a second organic moiety; and each $R^4$ independently is H or a third organic moiety. In Formulas (I), (II), (III), (IV), and (V) each of x, y, z, m, and p is the average number of repeating units in the polymer and has a value of at least 10 (e.g., 10 up to about 100, 200, 300, 400, 500, 1,000, 10,000, 100,000 or more). In Formula (VI) each of a, b, c, and d is the average number of respective repeating units and independently can be 0 or greater, provided the sum of a, b, c, and d is at least 10 (e.g., 10 up to about 100, 200, 300, 400, 500, 1,000, 10,000, 100,000 or more). The polymer chains in Formulas (I), (II), (III), (IV), and (V) includes at least one end group, an preferably two end groups, which are derived from the first monomer, i.e., an end group including the moiety E-A-, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety as described herein for $R^1$, $R^2$, $R^3$, $R^4$, and $R^5$.

An example of one class of polymers that can be produced by the methods described herein is a poly(organosulfate), such as a poly(bisphenol sulfate), as described in detail in the Examples herein. In one embodiment, the poly(bisphenol sulfate) is represented by Formula (IV) wherein each A is $SO_2$, and each L is O and each $R^3$ is a compound of formula: $-Ph-C(R^7)_2-Ph-$, in which each Ph is a 1,4-phenylene group, and each $R^7$ is H, $(C_1-C_4)$ alkyl (e.g., methyl, ethyl, and propyl), or a halogenated $(C_1-C_4)$ alkyl (e.g., trifluoromethyl).

In any of the polymers described herein the organic moieties, e.g., $R^2$, $R^3$, $R^5$, and $R^8$, can be selected from the group consisting of consisting of a hydrocarbon, a heterocycle, a carbohydrate, an amino acid, a polypeptide, and a combination of two or more thereof. Additionally, $R^2$, $R^3$, $R^4$, and $R^5$ can be substituted with at least one functional group. Non-limiting examples of such functional groups include e.g., hydroxyl, halogen, nitro, $—C(O)R^6$, $—C(O)OR^6$, $—C(O)N(R^6)_2$, $—CN$, $—SO_vR^6$, $—SO_vN(R^6)_2$, $R^6SO_vN(R^6)—$, $—N(R^6)SO_vR^6$, $—SO_3R^6$, $—N(R^6)_2$, $—N(R^6)OR^6$, $—N(R^6)C(O)R^6$, $—N(R^6)C(O)OR^6$, $—N(R^6)C(O)N(R^6)_2$, $—OC(O)N(R^6)_2$, $—OC(O)OR^6$, azido, alkyl, cycloalkyl, alkenylalkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each $R^6$ independently is H, alkyl, or aryl, and v is 0, 1, or 2.

In a preferred embodiment, the first and second monomers can comprise a bisphenol-type compound in which two phenolic groups (capped with either a fluorosulfonyl or silyl group) are tethered together by a linking bond or linking group (e.g., oxygen, sulfur, nitrogen, carbonyl, or a saturated or unsaturated alkylene group, which can be substituted or unsubstituted), e.g., a first monomer of Formula VII and a second monomer of Formula VIII:

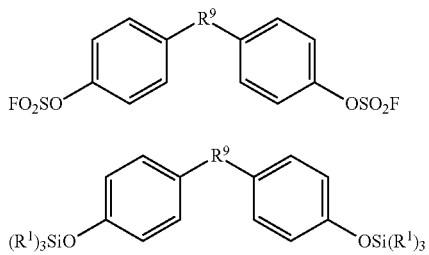

wherein each $R^1$ independently is a hydrocarbyl group, and R independently is a covalent bond, $C(CH_3)$, $C(CF_3)$, or $SO_2$.

A preferred polymer is a compound of Formula IX:

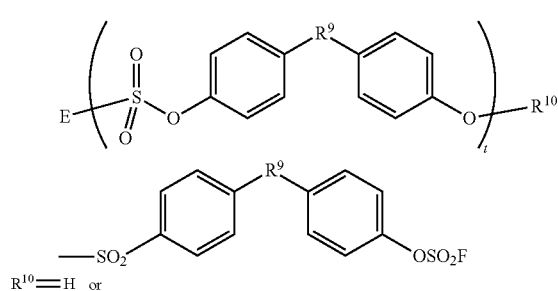

$R^{10}$=H or wherein t is the average number of monomer units and is at least 10 (e.g., 10 up to about 100, 200, 300, 400, 500, 1,000, 10,000, 100,000 or more), and E is F or is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)$, azido, CN, or $SR^8$, and each $R^8$ independently is an organic moiety as described herein for $R^1$, $R^2$, $R^3$, $R^4$, and $R^5$.

Certain aspects and features of the methods and polymers described herein are further illustrated in the following, non-limiting examples.

General Information:

$^1$H, $^{19}$F and $^{13}$C NMR spectra were recorded on Bruker AV-400 at room temperature unless otherwise noted. Chemical shifts (δ) are expressed in parts per million (ppm). Proton magnetic resonance ($^1$H NMR) spectra were recorded at 400 MHz. Fluorine magnetic resonance ($^{19}$F NMR) spectra were recorded at 376 MHz. Carbon magnetic resonance ($^{13}$C NMR) spectra were recorded at 100 MHz. Molecular weight and PDI (polydispersity index) were determined by GPC on a Waters 1515 system (MZ-GEL SDPLUS column, 500 Å, 1,000 Å, 10,000 Å; RI 2414 refractive index detector) calibrated with polystyrene standards, eluting with HPLC grade DMF with 0.05% by weight (wt %) of LiBr as a modifier (flow rate: 0.8 mL/min).

Example 1. Catalyst Preparation

1A. Onium Bifluoride Catalysts

Onium bifluorides can be obtained via anion exchange reaction of corresponding onium halide salts (Cl or Br salts) with silver(I) bifluoride ($AgHF_2$) (see, Vergote et al., *Chem. Eur. J.* 2012, 18, p. 793-798). Alternatively onium bifluoride catalysts, especially the ammonium bifluoride and imidazolium bifluoride salts, can be prepared via the reaction of corresponding onium halide salts with anhydrous HF (see, (1) Matsumoto et al., *Solid State Sci.* 2002, 4, p. 23-26; (2) Hagiwara et al., *J. Fluorine Chem.* 1999, p. 1-3).

1A(i). Tris(dialkylamino)sulfonium Bifluoride

Tris(dialkylamino)sulfonium bifluoride salts can be made by via Farnham's procedure (see, Farnham et al., U.S. Pat. No. 4,598,161).

For example, tris(dimethylamino)sulfonium bifluoride has been prepared as follows:

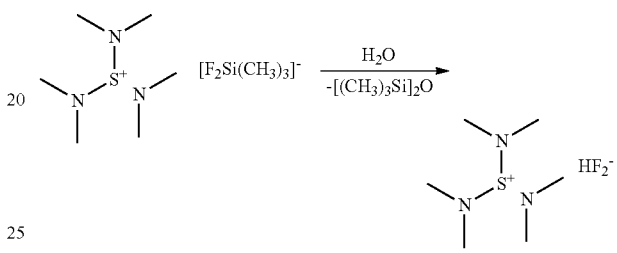

Tris(dimethylamino)sulfonium Bifluoride (TASHF$_2$)

In a 10 mL plastic bottle (PP, polypropylene) equipped with a TEFLON-coated stirring bar, about 1.122 g (4.07 mmol) of tris(dimethylamino)sulfonium difluorotrimethyl silicate (TASF, Middleton et al., U.S. Pat. No. 3,940,402) was dissolved in 1.0 ml of distilled acetonitrile under nitrogen at ambient temperature. About 0.06 mL (3.3 mmol) of distilled water was added while stirring, whereupon rapid formation of an oily material was observed. The acetonitrile was evaporated and the resulting solid product was stirred overnight in about 10 mL of anhydrous tetrahydrofuran (THF). The THF solvent was later removed via syringe and the crude product was rewashed with another 10 mL THF, twice. Solid TASHF$_2$ was obtained by drying the crude product at ambient temperature under vacuum for about 3 days, to afford about 793 mg of TASHF$_2$ (96.0% yield). $^{19}$F NMR (376 MHz, Acetonitrile-d$_3$) δ −149.81 (m). $^1$H NMR (400 MHz, Acetonitrile-d$_3$) δ 2.88 (s).

1A(ii). Tetraalkylphosfonium Bifluorides

Tetrabutylphosphonium bifluoride has been prepared as follows:

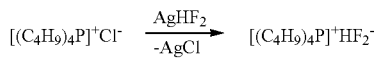

Tetrabutylphosphonium Bifluoride

In a 10 mL plastic bottle (PP, polypropylene) equipped with a TEFLON-coated stirring bar, about 147.4 mg (0.5 mmol) of tetrabutylphosphonium chloride was dissolved in 5.0 mL of distilled acetonitrile under nitrogen. Silver bifluoride (73.4 mg, 0.5 mmol) was then quickly added to the stirring solution. The reaction was maintained at room temperature (25° C.) for 30 minutes with stirring. Solid silver chloride completely precipitated on the bottom of the bottle after the stirring was discontinued, and the upper layer acetonitrile solution of tetrabutylphosphonium bifluoride (0.1M) can be used directly in the polymerization reactions described herein without further purification. $^1$H NMR (400 MHz, Acetonitrile-d$_3$) δ 2.15-2.06 (m, 8H), 1.58-1.42 (m, 16H), 0.96 (t, J=7.1 Hz, 12H); $^{19}$F NMR (376 MHz, Acetonitrile-d$_3$) δ −156.51 (m, 2F); $^{13}$C NMR (101 MHz, Acetonitrile-d$_3$) δ 23.54 (d, J=15.7 Hz), 22.90 (d, J=4.7 Hz), 17.91 (d, J=48.1 Hz), 12.59.

The Preparation of (Ph$_3$P=N—PPh$_3$)$^+$ HF$_2$$^-$ (0.2 M Stock Solution)

To a well stirred solution (suspension) of AgHF$_2$ (10 mmol) in CH$_3$CN (45 mL) in a 100 mL plastic bottle (the bottle was covered by aluminum foil to avoid light) sealed with a rubber septum was added a solution of (Ph$_3$P=N—PPh$_3$)$^+$Cl$^-$ (10 mmol) in CH$_3$CN (5 mL) over about 5 minutes by syringe under argon atmosphere. The mixture was allowed to stir at room temperature for 30 minutes, and then sonicated at room temperature for another 30 minutes. The sonicated solution was then centrifuged (2000 rpm), and the supernatant containing the desired catalyst as a 0.2 M stock catalyst solution was transferred under argon by syringe into a plastic bottle containing microwave oven activated molecular sieves to keep the solution dry.

1B. Onium polyHF Fluoride Catalysts

Onium polyHF fluoride catalysts (i.e., R$^+$F(HF)$_w$$^-$, w>1) can be obtained via the reaction of corresponding onium halide salts (e.g. Cl or Br salts) with anhydrous HF (e.g., see, (1) Momota et al., *Electrochim Acta.* 1993, 38, p. 619-624; (2) Rozhkov et al. *Tetrahedron* 1975, 31, p. 977-981; (3) Ballinger et al., *Electrochim Acta.* 1985, 30, p. 1075-1077; and references therein).

1C. Polymer-Supported F(HF)$_n$$^-$

Polymer-supported F(HF)$_w$$^-$, can be prepared e.g., as described in Cousseau et al., *B. Soc. Chim. Fr.* 1986, p. 910-915.

Example 2. Polymerization Procedures

2A. Exemplary Poly(Bisphenol A Sulfate) Preparation

2A(i). Preparation of propane-2,2-diylbis(4,1-phenylene) difluorosulfonate (BPA-OSO$_2$F) from WO 2014/089078 to Dong et al.

A 2-liter single-neck round-bottom flask was charged with bisphenol A (114.9 g, 0.5 mol), CH$_2$Cl$_2$ (DCM; 1 L) and triethylamine (Et$_3$N; 174 mL, 1.25 mol, 2.5 equivalents). The mixture was stirred at room temperature for 10 minutes (min). The reaction flask was then sealed with a septum, the atmosphere above the solution was removed with gentle vacuum, and SO$_2$F$_2$ gas (sulfuryl fluoride, VIKANE) was introduced by needle from a balloon filled with the gas. For large scale reactions such as this, depletion of the sulfuryl fluoride from the balloon is easily observed, and more reagent is introduced with a fresh balloon when required. For small scale reactions, SO$_2$F$_2$ is used in excess. These reactions can be easily followed by thin layer chromatography (TLC).

The reaction mixture was vigorously stirred at room temperature for about 2 to 4 hours, monitoring by GC-MS and TLC. After completion, the solvent was removed by rotary evaporation, the residue was dissolved in ethyl acetate (EtOAc; 1 L), and the solution was washed with 1N HCl (2×500 mL) and brine (2×500 mL). The organic phase was dried over anhydrous Na$_2$SO$_4$ and concentrated. The resulting solid was dried under high vacuum at about 60° C. overnight to afford BPA-OSO$_2$F as a white crystalline solid in quantitative yield (typically about 197 g, 100% yield). Melting point (MP) 48-49° C. $^1$H NMR (400 MHz, CDCl$_3$) δ 7.34-7.32 (m, 2H), 7.28-7.26 (m, 2H), 1.72 (s, 3H); $^{13}$C NMR (101 MHz, CDCl$_3$) δ 150.4, 148.2, 128.7, 120.5, 42.9, 28.4, 30.7; $^{19}$F NMR (376 MHz, CDCl$_3$) δ +37.0; GC-MS (t$_R$): 7.2 min; EI-MS (m/z): 392 [M]$^+$.

2A(ii). Preparation of (propane-2,2-diylbis(4,1-phenylene))bis(oxy))bis(tert-butyldimethylsilane (BPA-OTBS) from WO 2014/089078 to Dong et al.

In a 2 L flask, 88.4 grams (2.6 eq., 1.3 mol) of imidazole was added to a solution of bisphenol A (114.2 gram, 0.5 mol) in DCM (1000 mL), this solution was stirred at room temperature for about 10 min. Next, 181 gram of t-butyldimethylsilyl chloride (TBSCl; 2.4 equivalents, 1.2 mol) was dissolved into 200 mL of DCM, and the resulting TBSCl solution was added to the bisphenol A over about 30 minutes by an addition funnel. The reaction was stirred at room temperature for about 24 hours, and the reaction was monitored by TLC or GCMS. Then the DCM solvent was removed by rotary evaporation, 1000 mL of EtOAc was added to re-dissolve the residue, the EtOAc solution was washed twice with 500 mL saturated sodium bicarbonate solution, twice with 500 mL brine, and then the organic phase was dried over anhydrous Na$_2$SO$_4$. The solvents were removed by rotary evaporation. The resulting product was dried under high vacuum at about 70° C. for about 24 hours. The pure bis-TBS bisphenol A compound, BPA-OTBS, was obtained as a white solid (about 225 grams, 98.5% yield) without need for further purification before polymerization reaction. MP 78-80° C.; $^1$HNMR: (400 MHz, CDCl$_3$, 23° C.): δ 7.10-7.07 (m, 4H), 6.76-6.73 (m, 4H), 1.65 (s, 6H), 1.01 (s, 18H), 0.22 (s, 12H). $^{13}$CNMR: (100 MHz, CDCl$_3$, 23° C.): δ 153.2, 143.7, 127.7, 119.2, 41.7, 31.1, 25.7, 18.2, −4.39. GCMS: 8.38 min, MS m/z 456.3 (M+).

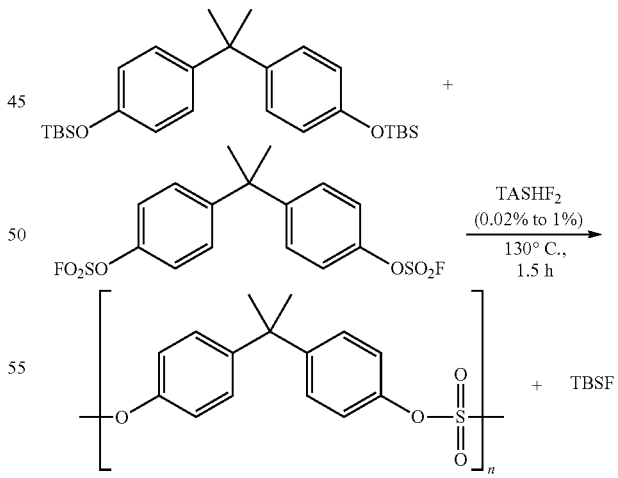

To a 15 mL dry glass bottle equipped with TEFLON-coated stirring bar, was added 913.6 mg (2.0 mmol) of monomer A-A (O,O'-bis-(tert-butyldimethylsilyl)bisphenolA) and 784.8 mg (2.0 mol) of the other monomer B-B (O,O'-bis-(fluorosulfonyl)bisphenolA). The bottle was screw sealed with a PTFE/Silicone septum-containing cap and the atmosphere on the bottle was replaced with nitrogen by evacuation and re-pressurization with nitrogen. The sealed bottle was then placed in a 130° C. oil bath whereupon both monomers melted under stirring. About 12 µL of acetonitrile solution of tris(dimethylamino)sulfonium bifluoride (TASHF$_2$, 0.1M, 0.0012 mmol, 0.03 mol % loading based on reaction sites) was injected via syringe to initiate the polymerization. Heating was continued for 1.5 hours, and then about 4 mL of DMF was added. The solution was then slowly poured into about 120 mL of vigorously stirring methanol (room temperature). A white fibrous powder formed immediately as the DMF solution contacted the methanol. The powder was collected via filtration and was further dried under vacuum before analysis.

In one polymerization run, 0.4 mL (0.04 mmol, 1 mole percent (mol %) based on total moles of monomers) of the TASHF$_2$ solution was utilized, which is a similar molar concentration to the lowest effective amount (about 1 mol %) of BEMP basic catalyst, which can suitably polymerize the monomers according to the method of WO 2014/089078 to Doug et al. Surprisingly, the monomer mixture immediately polymerized and solidified upon addition of the catalyst solution.

In another run, 0.04 mL (0.004 mmol, 0.1 mol % based on total moles of monomers) of the TASHF$_2$ solution was utilized, which is 10 times less than the lowest effective BEMP concentration. In this case, the monomer mixture polymerized and solidified in about one minute. TBSF byproduct begin to reflux in about the first second, whereas 1 mol % BEMP requires about 5 minutes or more to initiate refluxing of the TBSF, which indicates that 0.1 mol % of TASHF$_2$ catalyst (on a total monomer basis), surprisingly provides a reaction rate that is at least about 40 times greater than the rate achieved BEMP at 1 mol %.

In a third run, the catalyst loading was dropped to 0.03 mol % (about 12 µL of the 0.1M TASHF$_2$) at the same monomer concentration, in which case the monomers polymerized and solidified in about 7 to about 8 minutes.

A proton NMR spectrum of the bisphenol A polysulfate product obtained from the 0.1 mol % TASHF$_2$ run was consistent with the proton NMR of the polymer produced from the same monomers using 1 mol % BEMP on a 100 gram scale, which is reported in WO 2014/089078 to Dong et al.

Selected polymers prepared following procedures described above include:

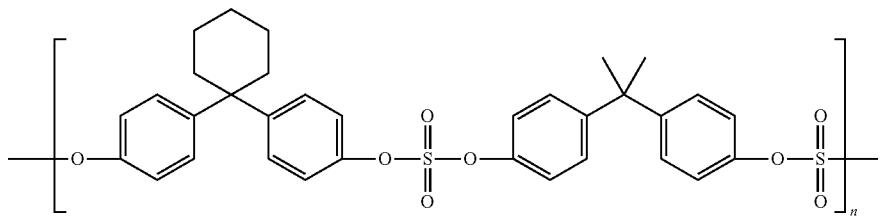

$^1$H NMR (500 MHz, Methylene Chloride-d$_2$) δ 7.45-7.41 (m, 4H) 7.39-7.29 (m, 12H), 2.40-2.34 (m, 4H), 1.77 (s, 6H), 1.68-1.57 (m, 6H); $^{13}$C NMR (126 MHz, Methylene Chloride-d$_2$) δ 150.08, 148.87, 148.62, 148.13, 129.18, 128.82, 121.17, 120.97, 46.28, 43.08, 37.42, 30.87, 26.44, 23.11; Mn=93 KDa; PDI=1.7; T$_g$ (DSC)=108.4° C.; T$_i$ (TGA)=365.7° C.

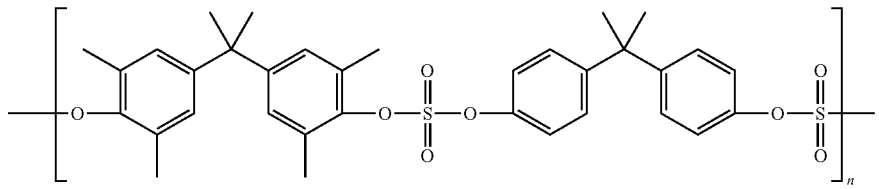

$^1$H NMR (500 MHz, Methylene Chloride-d$_2$) δ 7.41-7.34 (m, 8H), 7.11-7.08 (m, 4H), 2.45-2.40 (m, 12H), 1.81 (s, 6H), 1.74 (s, 6H); $^{13}$C NMR (126 MHz, Methylene Chloride-d$_2$) δ 150.15, 149.71, 148.95, 146.99, 131.45, 128.76, 128.30, 121.33, 43.13, 30.91, 30.86; Mn=57 KDa; PDI=1.7; T$_g$ (DSC)=116.1° C.; T$_i$ (TGA)=319.8° C.

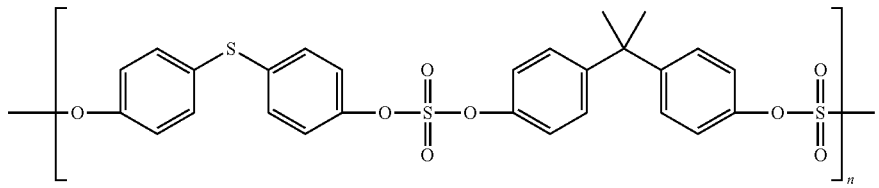

$^1$H NMR (500 MHz, Methylene Chloride-$d_2$) δ 7.53-7.49 (m, 4H), 7.41-7.33 (m, 12H), 1.79 (m, 6H); $^{13}$C NMR (126 MHz, Methylene Chloride-$d_2$) δ 150.23, 150.04, 148.81, 135.35, 133.06, 128.91, 122.46, 120.98, 43.14, 30.89; Mn=18 KDa; PDI=1.3; $T_g$ (DSC)=66.0° C.; $T_i$ (TGA)=353.5° C.

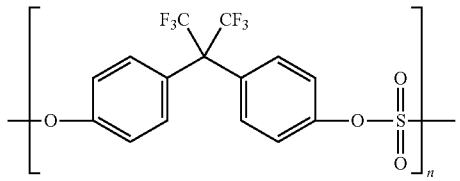

$^1$H NMR (500 MHz, DMF-$d_7$) δ 7.85-7.80 (m, 4H), 7.76-7.72 (m, 4H); $^{19}$F NMR (376 MHz, DMF-$d_7$) δ −63.85; $^{13}$C NMR (126 MHz, DMF-$d_7$) δ 151.31, 132.93, 132.64, 124.47 (q, J=285.4 Hz), 122.16; Mn=84 KDa; PDI=1.6; $T_g$ (DSC)=106.8° C.; $T_i$ (TGA)=397.7° C.

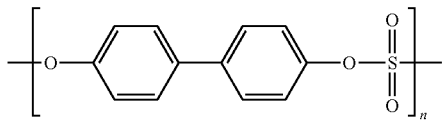

$^1$H NMR (500 MHz, DMF-$d_7$) δ 8.12-8.01 (m, 4H), 7.76 (p, J=6.5, 5.4 Hz, 4H); $^{13}$C NMR (126 MHz, DMF-$d_7$) δ 150.68, 139.47, 129.64, 122.25; Mn=79 KDa; PDI=1.7; $T_g$ (DSC)=120.4° C.; $T_i$ (TGA)=350.9° C.

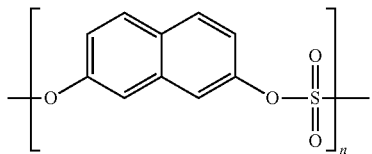

$^1$H NMR (500 MHz, DMF-$d_7$) δ 8.53 (d, J=2.5 Hz, 2H), 8.38 (d, J=9.0 Hz, 2H), 7.88 (dd, J=9.0, 2.5 Hz, 2H); $^{13}$C NMR (126 MHz, DMF-$d_7$) δ 149.50, 134.61, 131.60, 131.51, 121.56, 119.73; Mn=64 KDa; PDI=1.7; $T_g$(DSC)=100.2° C.; $T_i$ (TGA)=356.5° C.

2B. Procedure for Synthesizing Poly-2,2-Bis(4-hydroxyphenyl)propane-2',2'-(phenylazanediyl)bis(ethane-1-sulfonate)

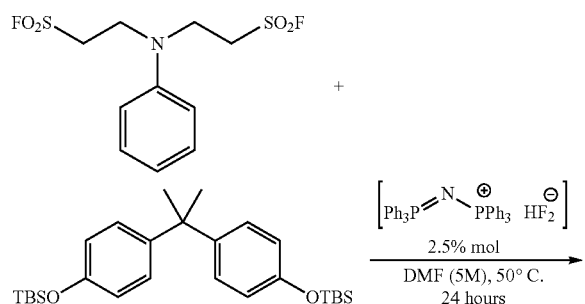

-continued

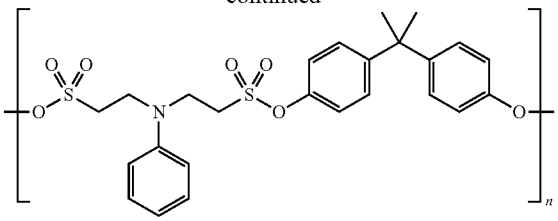

To an oven dried test tube with stir bar was added 2,2'-(phenylazanediyl)bis(ethane-1-sulfonyl fluoride) (0.5 mmol) and TBS-bisphenol A (0.5 mmol). The tube was purged three times with argon and then charged with DMF (0.1 mL) and (Ph$_3$P=N—PPh$_3$)$^+$HF$_2^-$ (0.2 M, 62.5 μL, 2.5 mol % in acetonitrile). The mixture was heated at 50° C. with stirring for 24 hours under argon atmosphere, and then an additional 1 mL of DMF was then added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 230 mg of white solid (yield: 92%). $^1$H NMR (300 MHz, Chloroform-d) δ 7.29 (m, 2H), 7.20 (d, J=8.8 Hz, 4H), 7.11 (d, J=8.8 Hz, 4H), 6.87 (m, 1H), 6.75 (m, 2H), 4.02 (t, J=6.8 Hz, 4H) 3.52 (t, J=6.8 Hz, 4H), 1.64 (s, 6H). GPC (Mn: 24829; Mw: 33436; PDI: 1.35).

2B(i). Alternate Procedure for Synthesizing Poly-2,2-Bis(4-hydroxyphenyl)propane-2',2'-(phenylazanediyl)bis(ethane-1-sulfonate)

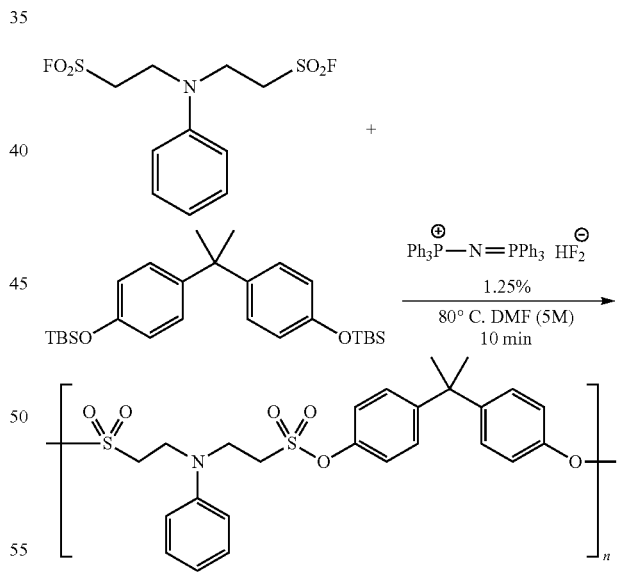

To an oven dried test tube with stir bar was added 2,2'-(phenylazanediyl)bis(ethane-1-sulfonyl fluoride) (0.5 mmol) and TBS-bisphenol A (0.5 mmol). The tube was purged three times with argon and then charged with DMF (0.1 mL) and (Ph$_3$P=N—PPh$_3$)$^+$HF$_2^-$ (0.2 M, 65 μL, 1.25 mol % in acetonitrile). The mixture was heated to 80° C. with stirring for 10 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 247 mg white solid (yield: 99%6). ¹H NMR (600 MHz, Methylene Chloride-d₂) δ 7.31-7.24 (m, 2H), 7.22 (d, J=8.8 Hz, 4H), 7.10 (d, J=8.8 Hz, 4H), 6.89-6.79 (m, 1H), 6.77-6.70 (m, 2H), 3.99 (t, J=6.9 Hz, 4H), 3.51 (t, J=6.8 Hz, 4H), 1.64 (s, 6H); ¹³C NMR (151 MHz, Methylene Chloride-d₂) δ 150.0, 147.5, 145.5, 130.5, 129.0, 122.1, 119.4, 113.7, 48.1, 46.9, 43.2, 31.1; GPC (Mn: 34K; PDI: 1.6).

2C. Procedure of Synthesizing Poly-2,2-Bis(4-hydroxyphenyl)propane-2,2'-prop-2-yn-1-ylazanediyl) bis (ethane-1-sulfonate)

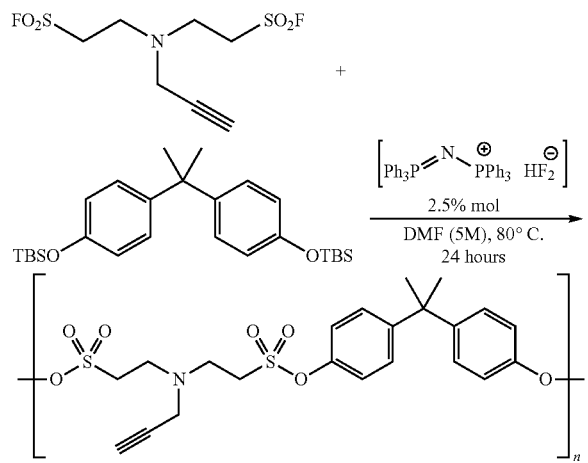

To an oven dried tube with stir bar was added 2,2'-(prop-2-yn-1-ylazanediyl)bis(ethane-1-sulfonyl fluoride) (0.5 mmol) and TBS-bisphenol A (0.5 mmol. The tube was purged three times with argon and then charged with DMF (0.1 mL) and (Ph₃P=N—PPh₃)⁺HF₂⁻ (0.2 M, 62.5 μL, 2.5 mol % in acetonitrile). The mixture was heated at 80° C. with stirring for 24 hours under argon atmosphere, and then an additional 1 mL of DMF was added to the reaction solution. Afterwards, the solution was slowly added by pipette into a flask containing methanol (50 mL) with vigorously stirring to precipitate the desired polymer. The precipitate was then isolated by filtration, washed with MeOH (20 mL), and dried under high vacuum pump at 60° C. to afford 201 mg of a pale yellow solid (yield: 87%). ¹H NMR (300 MHz, Chloroform-d) δ 7.25 (d, J=8.8 Hz, 4H), 7.18 (d, J=8.8 Hz, 4H), 3.50 (m, 6H), 3.24 (m, 4H), 2.34 (t, J=2.4 Hz, 1H), 1.67 (s, 6H). GPC (Mn: 26829; Mw: 40259; PDI: 1.50).

2C(i). Alternate Procedure of Synthesizing Poly-2,2-Bis(4-hydroxyphenyl)propane-2',2'-(prop-2-yn-1-ylazanediyl)bis(ethane-1-sulfonate)

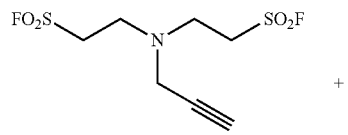

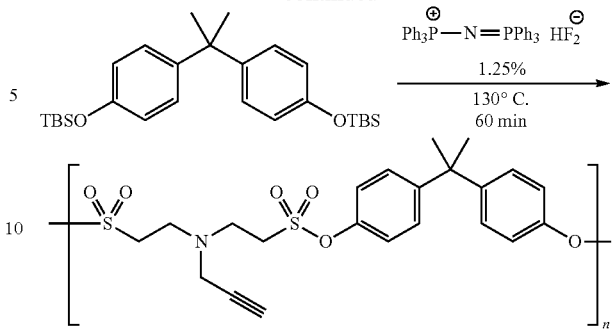

To an oven dried test tube with stir bar was added 2,2'-(prop-2-yn-1-ylazanediyl)bis(ethane-1-sulfonyl fluoride) (0.5 mmol) and TBS-bisphenol A (0.5 mmol). The tube was purged three times with argon and then charged with (Ph₃P=N—PPh₃)⁺HF₂⁻ (0.2 M, 65 μL, 1.25 mol % in acetonitrile). The mixture was heated to 130° C. with stirring for 60 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 204 mg of a pale yellow solid (yield: 88%). ¹H NMR (600 MHz, Chloroform-d) δ 7.23 (d, J=8.3 Hz, 4H), 7.16 (d, J=8.4 Hz, 4H), 3.47 (s, 2H), 3.44 (t, J=7.2 Hz, 4H), 3.18 (t, J=7.2 Hz, 4H), 2.29 (s, 1H), 1.65 (s, 6H); ¹³C NMR (151 MHz, Chloroform-d) δ 149.4, 147.1, 128.5, 121.8, 77.2, 74.9, 48.6, 47.8, 42.8, 42.4, 30.9; GPC (Mn: 16K; PDI: 1.2).

2D. Procedure for Synthesizing Poly-2,2-bis(4-hydoxy)phenyl)methanone-2',2'-(phenylazanediyl)bis (ethane-1-sulfonate)

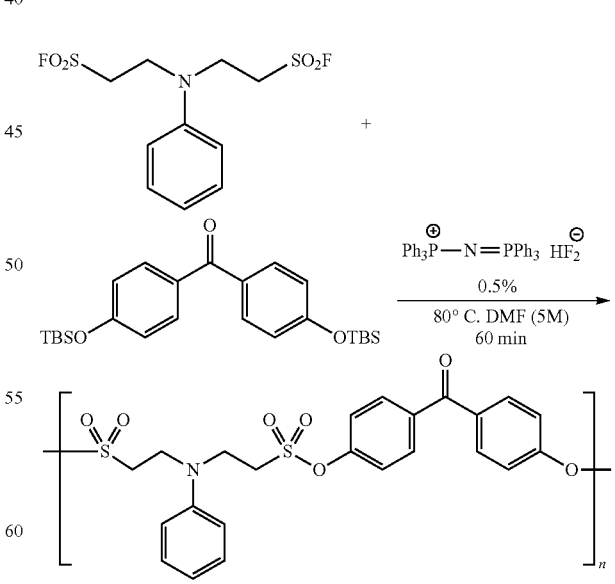

To an oven dried test tube with stir bar was added 2,2'-(phenylazanediyl)bis(ethane-1-sulfonyl fluoride) (0.5 mmol) and bis(4-((tert-butyldimethylsilyl)oxy)phenyl) methanone (0.5 mmol). The tube was purged three times with argon and then charged with DMF (0.1 mL) and (Ph₃P=N—PPh₃)⁺HF₂⁻ (0.2 M, 26 μL, 0.5 mol % in acetonitrile). The mixture was heated to 80° C. with stirring for 60 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 236 mg white solid (yield: 97%). ¹H NMR (600 MHz, DMSO-d₆) δ 7.82 (d, J=8.7 Hz, 4H), 7.49 (d, J=8.9 Hz, 4H), 7.24 (dd, J=8.8, 7.2 Hz, 2H), 6.77-6.73 (m, 3H), 3.99 (t, J=6.8 Hz, 4H), 3.92 (t, J=6.8 Hz, 4H); ¹³C NMR (151 MHz, DMSO-d₆) 193.30, 151.62, 145.32, 135.43, 131.82, 129.63, 122.24, 117.59, 112.35, 47.60, 44.97; GPC (Mn: 27K; PDI: 1.4).

2E. Procedure for Synthesizing Poly-(1,4-dihydoxy)benzene-2',2'-(phenylazanediyl)bis(ethane-1-sulfonate)

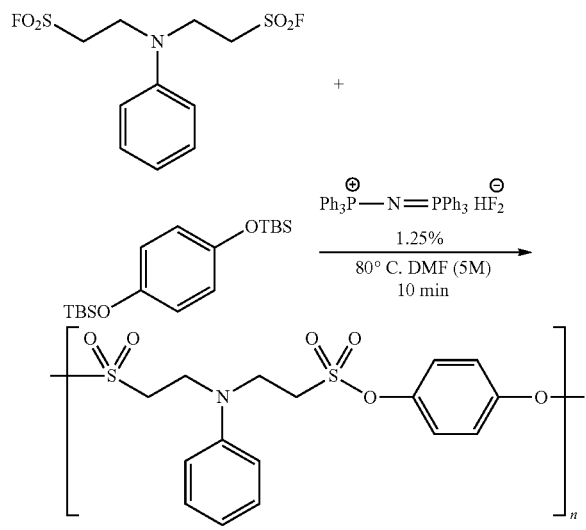

To an oven dried test tube with stir bar was added 2,2'-(phenylazanediyl)bis(ethane-1-sulfonyl fluoride) (0.5 mmol) and 1,4-bis((tert-butyldimethylsilyl)oxy)benzene (0.5 mmol). The tube was purged three times with argon and then charged with DMF (0.1 mL) and (Ph₃P=N—PPh₃)⁺HF₂⁻ (0.2 M, 65 μL, 1.25 mol % in acetonitrile). The mixture was heated to 80° C. with stirring for 10 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 176 mg white solid (yield: 92%). ¹H NMR (400 MHz, DMSO-d₆) δ 7.41 (s, 4H), 7.24 (dd, J=8.8, 7.2 Hz, 2H), 6.76-6.74 (m, 3H), 3.97 (t, J=6.7 Hz, 4H), 3.86 (t, J=6.9 Hz, 4H). ¹³C NMR (151 MHz, DMSO-d₆) δ 146.98, 145.2, 129.63, 123.93, 117.56, 112.30, 47.29, 44.91; GPC (Mn: 28K; PDI: 1.2).

2F. Procedure for Synthesizing Poly-2,2-bis(4-hydroxy)-1,1-biphenyl-2',2'-(phenylazanediyl)bis(ethane-1-sulfonate)

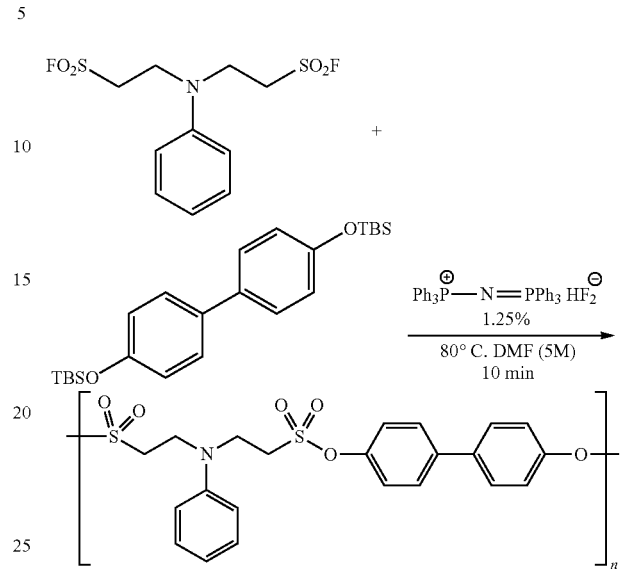

To an oven dried test tube with stir bar was added 2,2'-(phenylazanediyl)bis(ethane-1-sulfonyl fluoride) (0.5 mmol) and 4,4-bis((tert-butyldimethylsilyl)oxy)-1,1'-biphenyl (0.5 mmol). The tube was purged three times with argon and then charged with DMF (0.1 mL) and (Ph₃P=N—PPh₃)⁺HF₂⁻ (0.2 M, 65 μL, 1.25 mol % in acetonitrile). The mixture was heated to 80° C. with stirring for 10 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 227 mg white solid (yield: 99%). ¹H NMR (400 MHz, DMSO-d₆) δ 7.74 (d, J=8.3 Hz, 4H), 7.41 (d, J=8.2 Hz, 4H), 7.24 (t, J=7.8 Hz, 2H), 6.77-6.72 (m, 3H), 3.99 (t, J=6.9 Hz, 4H), 3.87 (t, J=6.8 Hz, 4H); ¹³C NMR (151 MHz, DMSO-d₆) 148.38, 145.35, 137.98, 129.63, 128.53, 122.65, 117.52, 112.28, 47.27, 45.01; GPC (Mn: 36K; PDI: 1.5).

2G. Procedure for Synthesizing Poly-2,2-bis(4-hydroxylphenyl)sulfane-2',2'-(phenylazanediyl)bis(ethane-1-sulfonate)

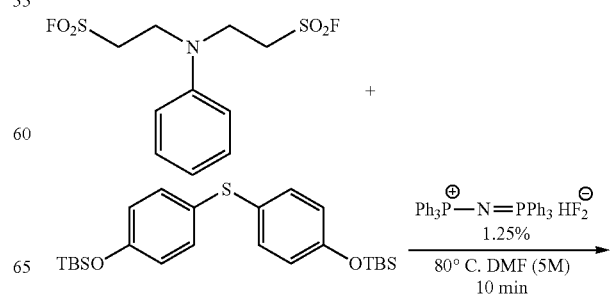

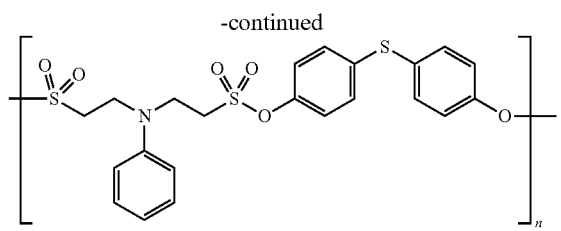

To an oven dried test tube with stir bar was added 2,2'-(phenylazanediyl)bis(ethane-1-sulfonyl fluoride) (0.5 mmol) and bis(4-((tert-butyldimethylsilyl)oxy)phenyl)sulfane (0.5 mmol). The tube was purged three times with argon and then charged with DMF (0.1 mL) and $(Ph_3P=N-PPh_3)^+HF_2^-$ (0.2 M, 65 µL, 1.25 mol % in acetonitrile). The mixture was heated to 80° C. with stirring for 10 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 243 mg white solid (yield: 99%). $^1$H NMR (600 MHz, DMSO-$d_6$) δ 7.40 (d, J=8.7 Hz, 4H), 7.32 (d, J=8.8 Hz, 4H), 7.21 (dd, J=8.8, 7.2 Hz, 2H), 6.85-6.56 (m, 3H), 3.94 (t, J=6.9 Hz, 4H), 3.83 (t, J=6.9 Hz, 4H); $^{13}$C NMR (151 MHz, DMSO-$d_6$) δ 148.00, 145.29, 133.52, 132.44, 129.60, 123.41, 117.53, 112.28, 47.26, 44.94; GPC (Mn: 29K; PDI: 1.5).

2H. Procedure for Synthesizing Poly-2,2-bis(4-hydroxylphenyl)oxy-2',2'-(phenylazanediyl)bis(ethane-1-sulfonate)

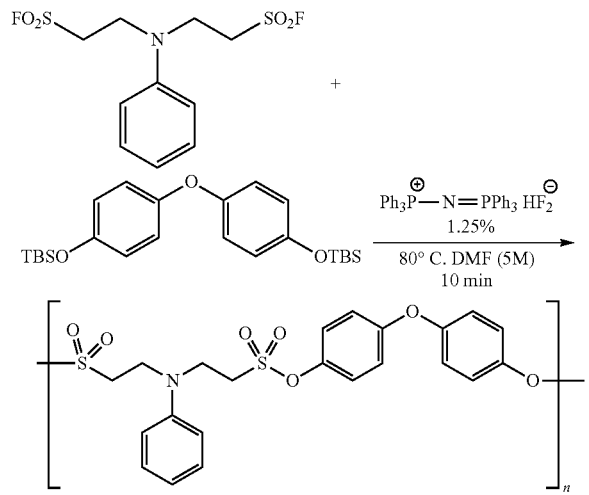

To an oven dried test tube with stir bar was added 2,2'-(phenylazanediyl)bis(ethane-1-sulfonyl fluoride) (0.5 mmol) and ((oxybis(4,1-phenylene))bis(oxy))bis(tert-butyldimethylsilane) (0.5 mmol). The tube was purged three times with argon and then charged with DMF (0.1 mL) and $(Ph_3P=N-PPh_3)^+HF_2^-$ (0.2 M, 65 µL, 1.25 mol % in acetonitrile). The mixture was heated to 80° C. with stirring for 10 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 235 mg white solid (yield: 99%). $^1$H NMR (600 MHz, DMSO-$d_6$) δ 7.35 (d, J=9.0 Hz, 4H), 7.24 (dd, J=8.8, 7.2 Hz, 2H), 7.10 (d, J=9.1 Hz, 4H), 6.88-6.63 (m, 3H), 3.96 (t, J=6.9 Hz, 4H), 3.83 (t, J=6.9 Hz, 4H). $^{13}$C NMR (151 MHz, DMSO-$d_6$) δ 155.08, 145.33, 129.62, 123.93, 120.00, 117.52, 112.28, 47.03, 44.98; GPC (Mn: 38K; PDI: 1.7).

2I. Procedure for Synthesizing Poly-2,2-(3,3-bis(4-hydroxy)phenyl)isobenzofuran-1(3H)-one)-2',2'-(phenylazanediyl)bis(ethane-1-sulfonate)

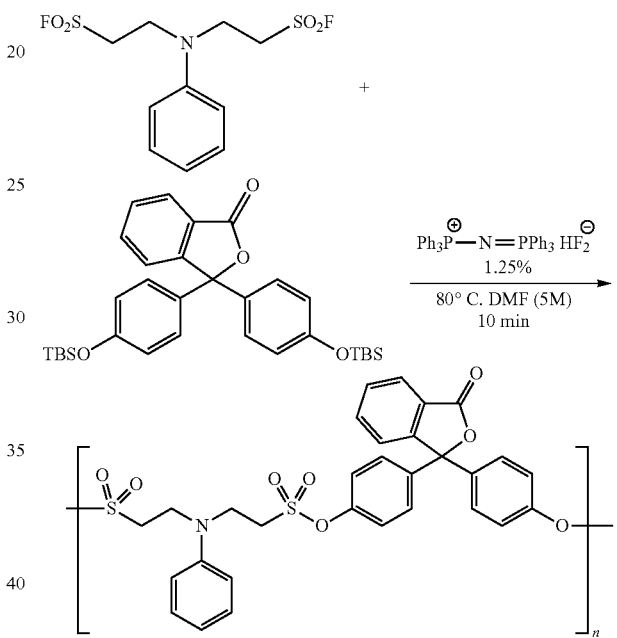

To an oven dried test tube with stir bar was added 2,2'-(phenylazanediyl)bis(ethane-1-sulfonyl fluoride) (0.5 mmol) 3,3-bis(4-((tert-butyldimethylsilyl)oxy)phenyl) isobenzofuran-1(3H)-one (0.5 mmol). The tube was purged three times with argon and then charged with DMF (0.1 mL) and $(Ph_3P=N-PPh_3)^+HF_2^-$ (0.2 M, 65 µL, 1.25 mol % in acetonitrile). The mixture was heated to 80° C. with stirring for 10 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 292 mg white solid (yield: 99%). $^1$H NMR (600 MHz, DMSO-$d_6$) δ 7.95 (d, J=7.6 Hz, 2H), 7.85 (t, J=7.4 Hz, 1H), 7.69 (t, J=7.4 Hz, 1H), 7.41 (d, J=8.9 Hz, 4H), 7.33 (d, J=8.9 Hz, 4H), 7.15 (d, J=7.3 Hz, 2H), 6.84-6.61 (m, 3H), 3.90 (t, J=6.9 Hz, 4H), 3.80 (t, J=6.7 Hz, 4H). $^{13}$C NMR (151 MHz, DMSO-$d_6$) δ 168.33, 150.65, 148.65, 145.23, 139.34, 135.37, 130.34, 129.55, 128.53, 125.84, 124.59, 124.17, 122.49, 117.48, 112.24, 89.65, 47.24, 44.92, 40.06; GPC (Mn: 33K; PDI: 1.5).

2J. Procedure for Synthesizing Poly-2,2-Bis(4-hydroxyphenyl)perfluoropropane-2',2'-(phenylazanediyl)bis(ethane-1-sulfonate)

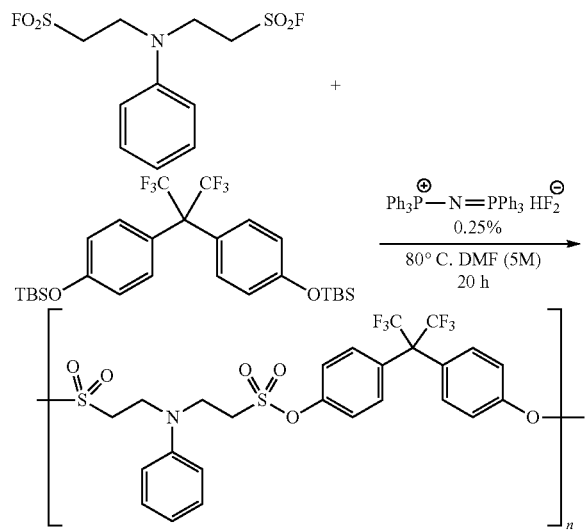

To an oven dried test tube with stir bar was added 2,2'-(phenylazanediyl)bis(ethane-1-sulfonyl fluoride) (0.5 mmol) and (((perfluoropropane-2,2-diyl)bis(4,1-phenylene))bis(oxy))bis(tert-butyldimethylsilane) (0.5 mmol). The tube was purged three times with argon and then charged with DMF (0.1 mL) and $(Ph_3P=N-PPh_3)^+HF_2^-$ (0.2 M, 15 μL, 0.25 mol % in acetonitrile). The mixture was heated to 80° C. with stirring for 10 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 298 mg white solid (yield: 98%). $^1$H NMR (600 MHz, DMSO-$d_6$) δ 7.45 (d, J=9.1 Hz, 4H), 7.41 (d, J=9.5 Hz, 4H), 7.21 (dd, J=8.4, 7.0 Hz, 2H), 6.82-6.69 (m, 3H), 3.97 (t, J=6.8 Hz, 4H), 3.90 (t, J=6.4 Hz, 4H). $^{13}$C NMR (151 MHz, DMSO-$d_6$) 149.19, 145.30, 131.62, 130.78, 129.57, 122.48, 117.55, 112.34, 48.60, 47.53, 45.01, 30.68; GPC (Mn: 36K; PDI: 1.5).

2K. Procedure for Synthesizing Poly-2,2-Bis(4-hydroxyphenyl)propane-2',2'-(3'-ethynylphenylazanediyl)bis(ethane-1-sulfonate)

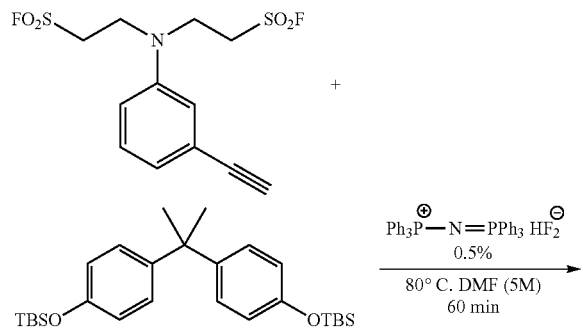

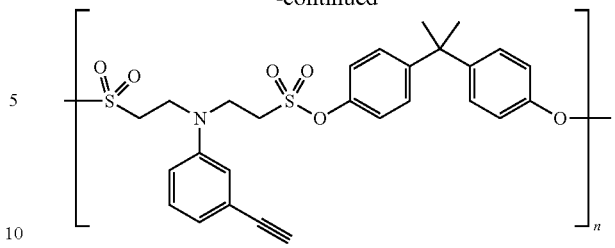

To an oven dried test tube with stir bar was added 2,2'-((3-ethynylphenyl)azanediyl)bis(ethane-1-sulfonyl fluoride) (0.5 mmol) and TBS-bisphenol A (0.5 mmol). The tube was purged three times with argon and then charged with DMF (0.1 mL) and $(Ph_3P=N-PPh_3)^+HF_2^-$ (0.2 M, 26 μL, 0.5 mol % in acetonitrile). The mixture was heated to 80° C. with stirring for 10 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 244 mg white solid (yield: 93%). $^1$H NMR (600 MHz, DMSO-$d_6$) δ 7.28 (d, J=9.0 Hz, 4H), 7.25-7.19 (m, 5H), 6.89-6.81 (m, 2H), 6.77 (dd, J=8.7, 2.7 Hz, 1H), 4.07 (s, 1H), 3.94 (t, J=6.8 Hz, 4H), 3.80 (1, J=6.7 Hz, 4H), 1.62 (s, 6H). $^{13}$C NMR (151 MHz, DMSO-$d_6$) δ 148.88, 146.54, 145.45, 129.85, 128.17, 122.91, 121.70, 120.84, 115.03, 113.08, 84.09, 80.10, 47.08, 44.92, 42.18, 30.27. GPC (Mn: 21K; PDI: 1.3).

2L. Procedure for Synthesizing Poly-2,2-Bis(4-hydroxyphenyl)propane-2',2'-(4'-methoxylphenylazanediyl)bis(ethane-1-sulfonate)

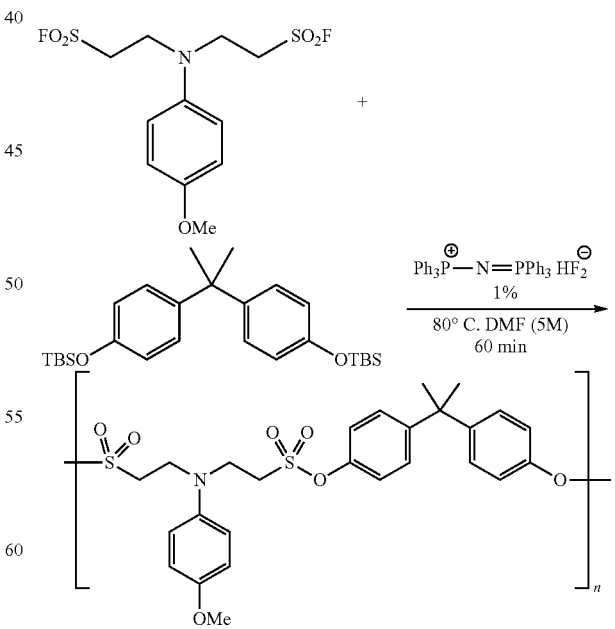

To an oven dried test tube with stir bar was added 2,2'-((4-methoxylphenyl)azanediyl)bis(ethane-1-sulfonyl fluoride) (0.5 mmol) and TBS-bisphenol A (0.5 mmol). The tube was purged three times with argon and then charged with DMF (0.1 mL) and (Ph$_3$P=N—PPh$_3$)$^+$HF$_2^-$ (0.2 M, 50 µL, 1.0 mol % in acetonitrile). The mixture was heated to 80° C. with stirring for 10 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 241 mg white solid (yield: 91%). $^1$H NMR (600 MHz, Methylene Chloride-d$_2$) δ 7.22 (d, J=8.8 Hz, 4H), 7.09 (d, J=8.7 Hz, 4H), 6.86 (d, J=9.1 Hz, 2H), 6.80 (d, J=9.1 Hz, 2H), 3.85 (t, J=7.0 Hz, 4H), 3.73 (s, 3H), 3.45 (t, J=7.0 Hz, 4H), 1.65 (s, 6H). $^{13}$C NMR (151 MHz, Methylene Chloride-d$_2$) δ 154.73, 149.98, 147.50, 139.85, 128.93, 122.10, 118.20, 115.79, 56.10, 48.40, 48.09, 43.17, 31.05. GPC (Mn: 35K; PDI: 1.3).

2M. Procedure for Synthesizing Poly-2,2-Bis(4-hydroxyphenyl)propane-2',2'-(benzo[d][1,3]dioxol-5-ylazanediyl)bis(ethane-1-sulfonate)

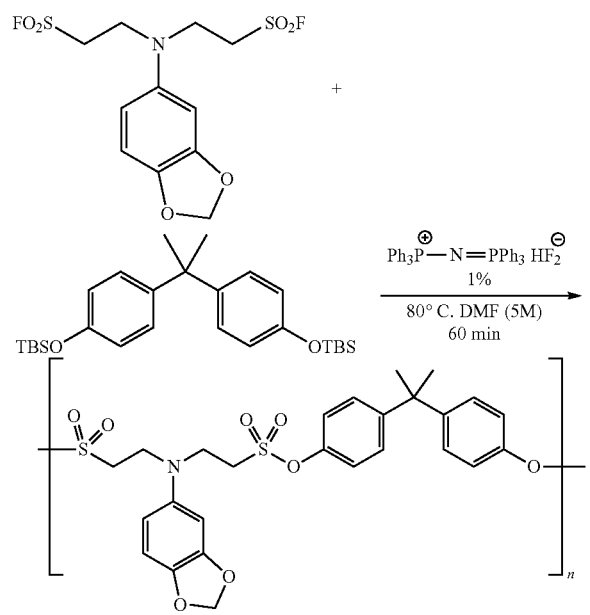

To an oven dried test tube with stir bar was added 2,2'-(benzo[d]i[1,3]dioxol-5-ylazanediyl)bis(ethane-1-sulfonyl fluoride) (0.5 mmol) and TBS-bisphenol A (0.5 mmol). The tube was purged three times with argon and then charged with DMF (0.1 mL) and (Ph$_3$P=N—PPh$_3$)$^+$HF$_2^-$ (0.2 M, 50 µL, 1.0 mol % in acetonitrile). The mixture was heated to 80° C. with stirring for 10 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 237 mg white solid (yield: 87%). $^1$H NMR (600 MHz, Methylene Chloride-d$_2$) δ 7.23 (d, J=8.8 Hz, 4H), 7.10 (d, J=8.8 Hz, 4H), 6.72 (d, J=8.4 Hz, 1H), 6.45 (d, J=2.5 Hz, 1H), 6.24 (dd, J=8.4, 2.5 Hz, 1H), 5.87 (s, 2H), 3.83 (t, J=6.9 Hz, 4H), 3.45 (t, J=6.9 Hz, 4H), 1.65 (s, 6H). $^{13}$C NMR (151 MHz, Methylene Chloride-d$_2$) δ 149.99, 149.67, 147.50, 142.48, 141.45, 128.96, 122.09, 109.36, 101.94, 99.35, 48.36, 48.25, 43.18, 31.05. GPC (Mn: 28K PDI: 1.3).

2N. Procedure for Synthesizing Poly-2,2-Bis(4-hydroxyphenyl)propane-2',2'-(piperazine-1,4-diyl)bis(ethane-1-sulfonate)

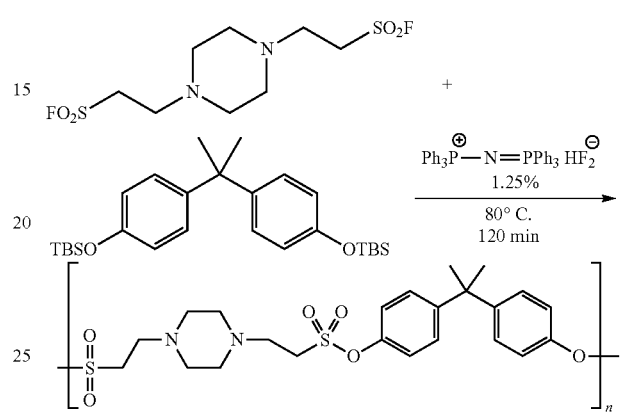

To an oven dried test tube with stir bar was added 2,2'-(piperazine-1,4-diyl)bis(ethane-1-sulfonyl fluoride) (0.5 mmol) and TBS-bisphenol A (0.5 mmol). The tube was purged three times with argon and then charged with DMF (0.1 mL) and (Ph$_3$P=N—PPh$_3$)$^+$HF$_2^-$ (0.2 M, 65 µL, 1.25 mol % in acetonitrile). The mixture was heated to 80° C. with stirring for 10 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pinup at 60° C. to provide 202 mg white solid (yield: 82%). $^1$H NMR (600 MHz, Chloroform-d) δ 7.23 (d, J=8.5 Hz, 4H), 7.16 (d, J=8.5 Hz, 4H), 3.42 (t, J=7.5 Hz, 4H), 2.97 (t, J=7.5 Hz, 4H), 2.56 (m, 8H), 1.66 (s, 6H). $^{13}$C NMR (151 MHz, Chloroform-d) δ 149.34, 147.05, 128.45, 121.71, 77.37, 52.71, 51.64, 48.04, 45.52, 42.76, 30.89. GPC (Mn: 12K; PDI: 1.2).

2O. Procedure for Synthesizing Poly-2,2-Bis(4-hydroxyphenyl)propane-2',2'-((thiophen-2-ylmethyl)azanediyl)bis(ethane-1-sulfonate)

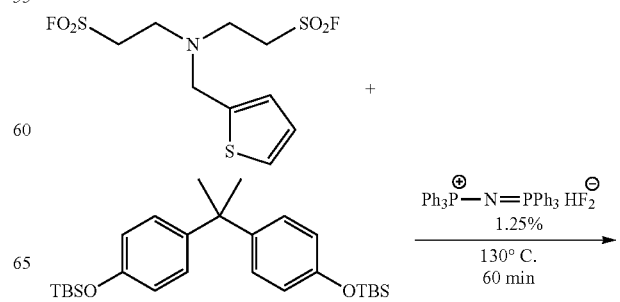

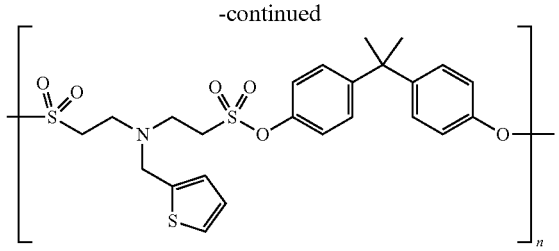

To an oven dried test tube with stir bar was added 2,2'-((thiophen-2-ylmethyl)azanediyl)bis(ethane-1-sulfonyl fluoride) (0.5 mmol) and TBS-bisphenol A (0.5 mmol). The tube was purged three times with argon and then charged with (Ph$_3$P=N—PPh$_3$)$^+$HF$_2^-$ (0.2 M, 65 μL, 1.25 mol % in acetonitrile). The mixture was heated to 130° C. with stirring for 60 minutes under argon atmosphere, and then an additional 1 mL of DMF was added to the reaction solution, which was then added slowly by pipette into a flask containing methanol (50 mL) with vigorously stirring to precipitate the desired polymer. The precipitate was then isolated by filtration, washed with MeOH (20 mL), and dried under high vacuum pump at 60° C. to provide 224 mg of a pale yellow solid (yield: 86%). $^1$H NMR (600 MHz, Chloroform-d) δ 7.23-7.18 (m, 5H), 7.14-7.05 (m, 4H), 6.9-6.89 (m, 2H), 3.91 (s, 2H), 3.40 (t, J=7.2 Hz, 4H), 3.17 (t, J=7.2 Hz, 4H), 1.64 (s, 6H). $^{13}$C NMR (151 MHz, Chloroform-d) δ 149.40, 147.06, 140.16, 128.53, 127.07, 126.98, 126.00, 121.71, 52.97, 48.66, 47.94, 42.80, 30.93; GPC (Mn: 12K; PDI: 1.2).

2P. Procedure for Synthesizing Poly-2,2-Bis(t-hydroxyphenyl)propane-2',2' (butylazanediyl)bis(ethane-1-sulfonate)

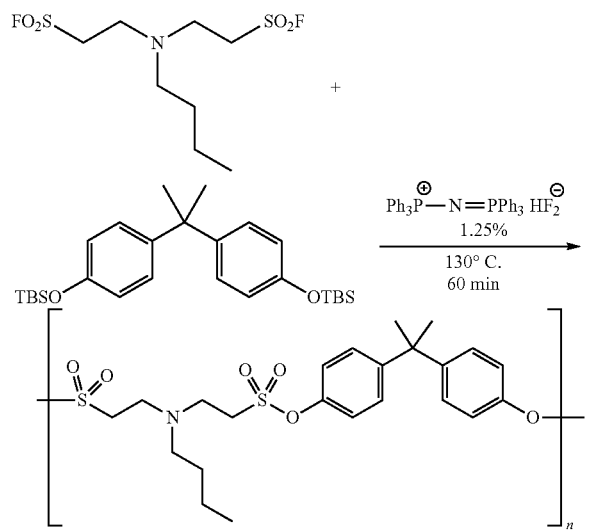

To an oven dried test tube with stir bar was added 2,2'-(butylazanediyl)bis(ethane-1-sulfonyl fluoride) (0.5 mmol) and TBS-bisphenol A (0.5 mmol). The tube was purged three times with argon and then charged with (Ph$_3$P=N—PPh$_3$)$^+$HF$_2^-$ (0.2 M, 65 μL, 1.25 mol % in acetonitrile). The mixture was heated to 130° C. with stirring for 60 minutes under argon atmosphere, and then an additional 1 mL of DMF was added to the reaction solution, which was then added slowly by pipette into a flask containing methanol (50 mL) with vigorous stirring to precipitate the desired polymer. The precipitate was then isolated by filtration, washed with MeOH (20 mL), and dried under high vacuum pump at 60° C. to provide 197 mg of a pale yellow solid (yield: 82%). $^1$H NMR (600 MHz, Chloroform-d) δ 7.23 (d, J=8.8 Hz, 4H), 7.15 (d, J=8.8 Hz, 4H), 3.40 (t, J=7.0 Hz, 4H), 3.11 (t, J=7.0 Hz, 4H), 2.57-2.45 (m, 2H), 1.65 (s, 6H), 1.47-1.42 (m, 2H), 1.36-1.25 (m, 2H), 0.89 (t, J=7.4 Hz, 3H). $^{13}$C NMR (151 MHz, Chloroform-d) δ 149.40, 147.05, 128.53, 121.74, 53.78, 48.55, 48.01, 42.82, 30.94, 20.45, 29.26, 14.08; GPC (Mn: 20K; PDI: 1.3).

2Q. Procedure for Synthesizing Poly-2,2-Bis(4-hydroxyphenyl)propane-2',2'-(furan-2-ylmethyl)azanediyl)bis(ethane-1-sulfonate)

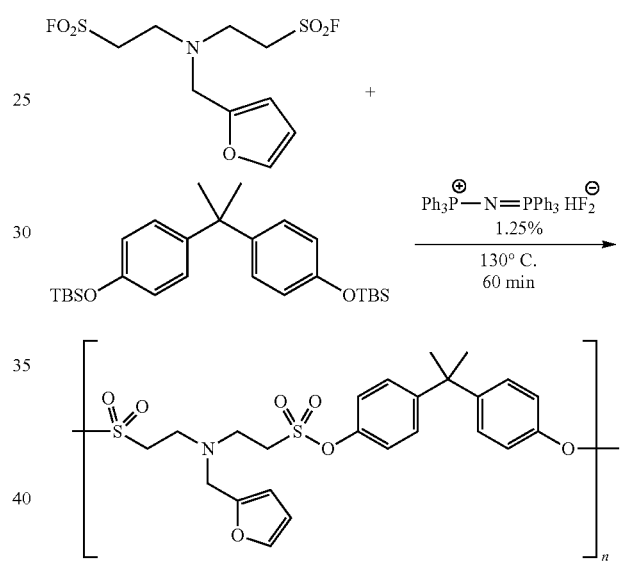

To an oven dried test tube with stir bar was added 2,2'-((furan-2-ylmethyl)azanediyl)bis(ethane-1-sulfonyl fluoride) (0.5 mmol) and TBS-bisphenol A (0.5 mmol). The tube was purged three times with argon and then charged with (Ph$_3$P=N—PPh$_3$)$^+$HF$_2^-$ (0.2 μM, 65 μL, 1.25 mol % in acetonitrile). The mixture was heated to 130° C. with stirring for 60 minutes under argon atmosphere, and then an additional 1 mL of DMF was added to the reaction solution, which was then added slowly by pipette into a flask containing methanol (50 mL) with vigorous stirring to precipitate the desired polymer. The precipitate was then isolated by filtration, washed with MeOH (20 mL), and dried under high vacuum pump at 60° C. to provide 209 mg of a pale yellow solid (yield: 83%). $^1$H NMR (600 MHz, Chloroform-d) δ 7.34 (d, J=2.0 Hz, 1H), 7.22 (d, J=8.8 Hz, 4H), 7.14 (d, J=8.7 Hz, 4H), 6.31 (dd, J=3.2, 1.9 Hz, 1H), 6.23 (d, J=3.2 Hz, 1H), 3.76 (s, 2H), 3.39 (t, J=7.0 Hz, 4H), 3.15 (t, J=7.0 Hz, 4H), 1.65 (s, 6H). $^{13}$C NMR (151 MHz, Chloroform-d) δ 150.58, 149.37, 147.10, 142.82, 128.50, 121.74, 110.64, 109.77, 49.95, 48.71, 48.00, 42.79, 30.91; GPC (Mn: 20K; PDI: 1.3).

2R. Procedure for Synthesizing Poly-2,2-Bis(4-hydroxyphenyl)propane-2',2'-((2-(1H-indol-3-yl)ethyl)azanediyl)bis(ethane-1-sulfonate)

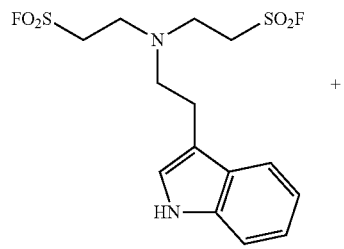

+

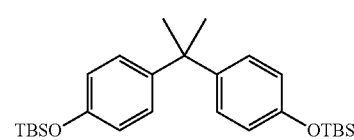

$$\xrightarrow[\text{60 min}]{\substack{Ph_3\overset{\oplus}{P}=N=PPh_3\ HF_2^{\ominus}\\ 1.25\%\\ 130^\circ C.}}$$

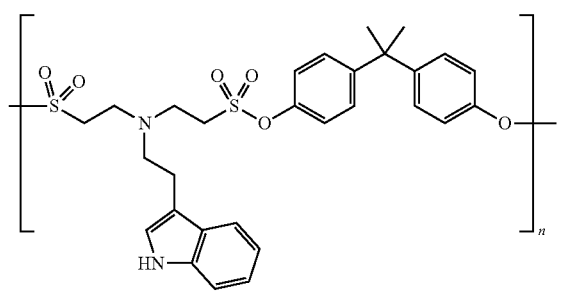

To an oven dried test tube with stir bar was added 2,2'-((2-(1H-indol-3-yl)ethyl) azanediyl)bis(ethane-1-sulfonyl fluoride) (0.5 mmol) and TBS-bisphenol A (0.5 mmol). The tube was purged three times with argon and then charged with $(Ph_3P=N-PPh_3)^+HF_2^-$ (0.2 M, 65 μL, 1.25 mol % in acetonitrile). The mixture was heated to 130° C. with stirring for 60 minutes under argon atmosphere, and then an additional 1 mL of DMF was added to the reaction solution, which was then added slowly by pipette into a flask containing methanol (50 mL) with vigorous stirring to precipitate the desired polymer. The precipitate was then isolated by filtration, washed with MeOH (20 mL), and dried under high vacuum pump at 60° C. to provide 241 mg of a pale yellow solid (yield: 85%). $^1$H NMR (600 MHz, DMSO-d$_6$) δ 10.77 (s, 1H), 7.48 (d, J=7.9 Hz, 1H), 7.30 (d, J=8.1 Hz, 1H), 7.24 (d, J=8.5 Hz, 4H), 7.20 (d, J=8.9 Hz, 4H), 7.15 (d, J=2.4 Hz, 1H), 7.02 (t, J=7.4 Hz, 1H), 6.90 (t, J=7.3 Hz, 1H), 3.68 (t, J=7.2 Hz, 4H), 3.13 (t, J=7.2 Hz, 4H), 2.81 (s, 4H), 1.58 (s, 6H). $^{13}$C NMR (151 MHz, DMSO-d$_6$) δ 148.77, 146.70, 136.13, 128.13, 127.15, 122.72, 121.72, 120.82, 118.23, 118.13, 111.98, 111.31, 53.35, 47.69, 46.96, 42.14, 40.06, 30.26; GPC (Mn: 31K; PDI: 1.5).

2S. Procedure for Synthesizing Poly-2,2-Bis(4-hydroxyphenyl)propane-2',2'-((3,4-dimethoxyphenethyl)azanediyl)bis(ethane-1-sulfonate)

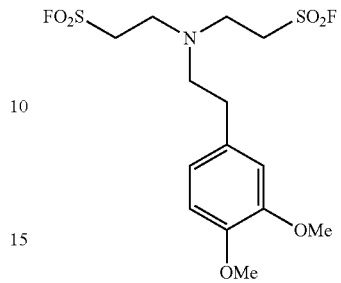

+

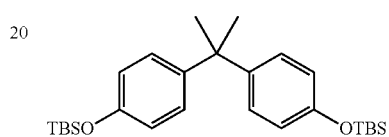

$$\xrightarrow[\text{60 min}]{\substack{Ph_3\overset{\oplus}{P}=N=PPh_3\ HF_2^{\ominus}\\ 1.25\%\\ 130^\circ C.}}$$

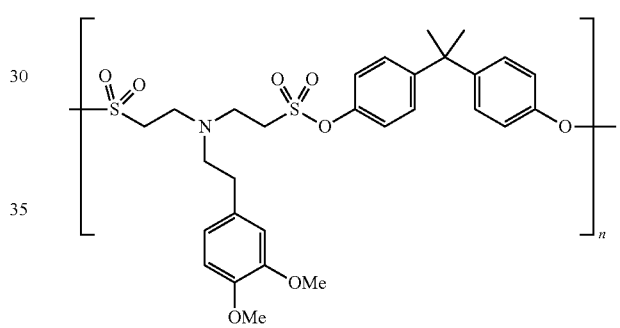

To an oven dried test tube with stir bar was added 2,2'-((3,4-dimethoxyphenethyl)azanediyl)bis(ethane-1-sulfonyl fluoride) (0.5 mmol) and TBS-bisphenol A (0.5 mmol). The tube was purged three times with argon and then charged with $(Ph_3P=N-PPh_3)^+HF_2^-$ (0.2 M, 65 μL, 1.25 mol % in acetonitrile). The mixture was heated to 130° C. with stirring for 60 minutes under argon atmosphere, and then an additional 1 mL of DMF was added to the reaction solution, which was then added slowly by pipette into a flask containing methanol (50 mL) with vigorous stirring to precipitate the desired polymer. The precipitate was then isolated by filtration, washed with MeOH (20 mL), and dried under high vacuum pump at 60° C. to provide 235 mg of a pale yellow solid (yield: 80%). $^1$H NMR (600 MHz, Methylene Chloride-d$_2$) δ 7.27 (d, J=8.5 Hz, 4H), 7.16 (d, J=8.9 Hz, 4H), 6.77-6.70 (m, 3H), 3.78 (s, 6H), 3.41 (t, J=7.0 Hz, 4H), 3.17 (t, J=7.0 Hz, 4H), 2.80-2.77 (m, 2H), 2.75-2.64 (m, 2H), 1.67 (s, 6H). $^{13}$C NMR (151 MHz, Methylene Chloride-d$_2$) δ 149.94, 149.66, 148.28, 147.51, 132.69, 128.91, 122.13, 121.11, 112.97, 112.19, 56.34, 56.30, 49.02, 48.38, 43.16, 33.85, 31.03; GPC (Mn: 11K; PDI: 1.2).

2T. Procedure for Further Modification of Poly-2,2-Bis(4-hydroxyphenyl)propane-2',2'-(3'-ethynylphenylazanediyl)bis(ethane-1-sulfonate) by CuAAC Reaction

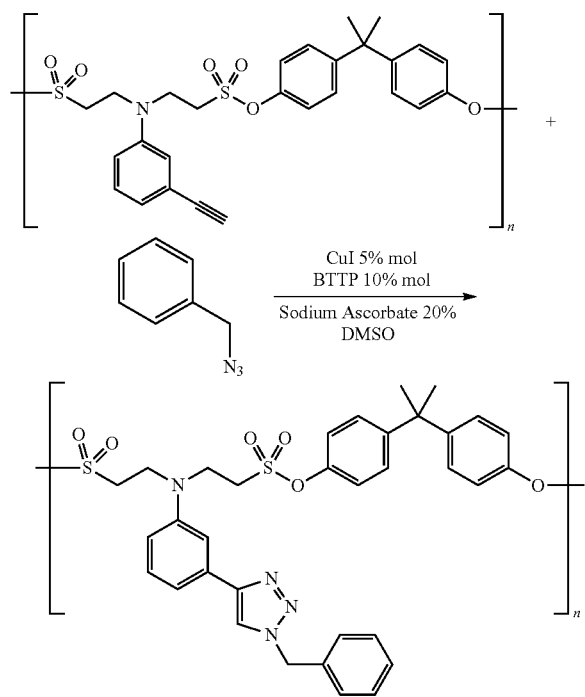

To an oven dried test tube with stir bar was added Poly-2,2-Bis(4-hydroxyphenyl)propane-2',2'-(3'-ethynylphenylazanediyl)bis(ethane-1-sulfonate) (0.5 mmol) and Benzylazide (0.55 mmol). The tube was purged three times with argon and then charged with DMSO (5 mL) CuI (0.025 mmol), BTTP (0.05 mmol), and sodium ascorbate (0.1 mmol). The mixture was heated to 50° C. with stirring for 12 hours under argon atmosphere, and then added slowly by pipette into a flask containing methanol (50 mL) with vigorous stirring to precipitate the desired polymer. The precipitate was then isolated by filtration, washed with MeOH (20 mL), and dried under high vacuum pump at 60° C. to provide 263 mg of a pale yellow solid (yield: 80%). $^1$H NMR (600 MHz, Methylene Chloride-$d_2$) δ 7.77 (s, 1H), 7.54-6.87 (m, 16H), 6.67 (d, J=8.1 Hz, 1H), 5.49 (s, 2H), 4.03 (t, J=6.6 Hz, 4H), 3.54 (t, J=6.6 Hz, 4H), 1.59 (s, 6H). $^{13}$C NMR (151 MHz, Methylene Chloride-$d_2$) δ 149.98, 148.29, 147.46, 146.00, 135.60, 132.95, 131.01, 129.58, 129.16, 128.95, 128.56, 122.07, 120.77, 116.64, 113.33, 110.54, 54.65, 48.18, 46.87, 43.13, 31.01; GPC (Mn: 22K; PDI: 1.3).

Example 3. Catalyst Evaluations

3A. Catalyst Evaluation (Solvent-Free Condition, Table 1)

In Table 1, the performance of different bifluoride-type catalysts are demonstrated for catalyzing the BPA-based polymerization reactions. All the reactions were performed under the general solvent-free condition described above (2.0 mmol scale, 130° C., 1.5 h, $N_2$ atmosphere), and all the catalysts used were dissolved in acetonitrile with the same concentration (0.1 M). The "-onium" cation played a crucial rule on adjusting the reactivity of corresponding bifluoride catalysts. TASHF$_2$ provided the lowest catalyst loading of 0.02 mol % without significant loss of molecular weight, and therefore can serve as a leave-in catalyst to avoid the need for further purification after the polymerization process. Imidazolium catalysts such as 1,3-bis(2,6-diisopropylphenyl)imidazolium bifluoride also exhibited excellent reactivity with a 0.1 mol % catalyst loading, but further reducing the catalyst loading caused a significant decrease on the molecular weight of the resulting polymer. Among the phosphonium bifluorides evaluated, tetrabutylphosphonium bifluoride afforded the highest catalytic efficiency with a 0.5 mol % loading, but still underperformed TASHF$_2$ and its imidazolium analogue. Tetraethylammonium bifluoride was ineffective at catalyst loadings of less than 1 mol % at which point it provided BPA-polysulfate with a M$_n$ of 63817 g/mol. Other bifluoride sources, including NH$_4^+$HF$_2^-$, AgHF$_2$ and the KHF$_2$ plus 18-crown-6, provided oligomers under reaction conditions used for the evaluations.

TABLE 1

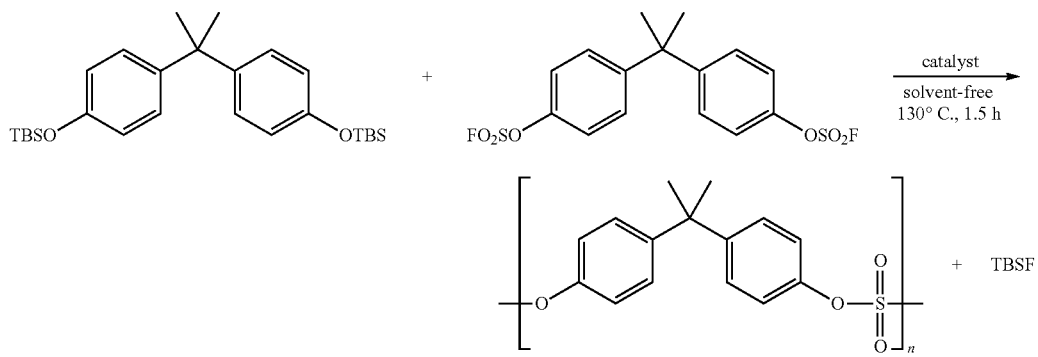

| Entry | Catalyst | Catalyst loading | M$_n$ | PDI |
|---|---|---|---|---|
| 1 | (TASHF$_2$ structure) | 0.5 mol % | 85046 | 1.87 |

TABLE 1-continued
Catalyst Evaluation (Solvent-free Condition).
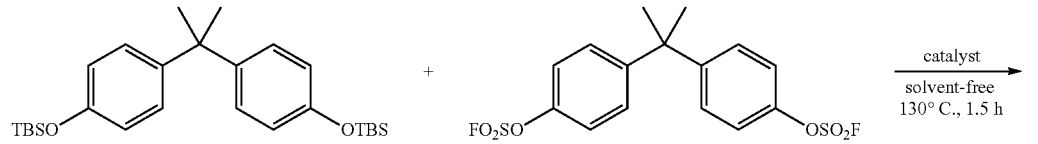
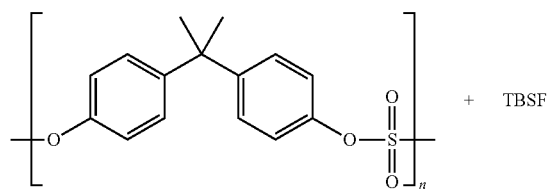
| Entry | Catalyst | Catalyst loading | $M_n$ | PDI |
|---|---|---|---|---|
| 2 | Me₂N-S⁺(NMe₂)-NMe₂ HF₂⁻ | 0.03 mol % | 73836 | 2.05 |
| 3 | Me₂N-S⁺(NMe₂)-NMe₂ HF₂⁻ | 0.02 mol % | 70268 | 2.43 |
| 4 | i-Pr-N(imidazolium)N⁺-Pr-i HF₂⁻ | 1.0 mol % | 77327 | 1.67 |
| 5 | i-Pr-N(imidazolium)N⁺-Pr-i HF₂⁻ | 0.1 mol % | 73227 | 1.86 |
| 6 | (Ph₃P=N-P⁺Ph₃) HF₂⁻ | 1.0 mol % | 64477 | 1.73 |
| 7 | (Ph₃P=N-P⁺Ph₃) HF₂⁻ | 0.1 mol % | 8085 | 1.38 |
| 8 | Bu₄P⁺ HF₂⁻ | 0.5 mol % | 47135 | 2.11 |

TABLE 1-continued

Catalyst Evaluation (Solvent-free Condition).

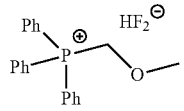

| Entry | Catalyst | Catalyst loading | $M_n$ | PDI |
|---|---|---|---|---|
| 9 | Ph$_3$P$^+$CH$_2$OMe HF$_2^-$ | 0.5 mol % | 15902 | 1.39 |
| 10 | Et$_4$NHF$_2$ | 1.0 mol % | 63817 | 1.56 |
| 11 | NH$_4$HF$_2$ | 1.0 mol % | Oligomer | |
| 12 | KHF$_2$ + 18-crown-6-ether | 1.0 mol % | Oligomer | |
| 13 | AgHF$_2$ | 1.0 mol % | Oligomer | |

3B. Catalyst Evaluation (FIG. 5 and Table 2)

In FIG. 5 and Table 2, the performance of different bifluoride and polyHF fluoride-type catalysts are demonstrated, for catalyzing the BPA-based polymerization reactions. All the reactions were conducted in dry solvent N-Methyl-2-pyrrolidone (NMP, [C]=2.0 M, 2.0 mmol scale, 130° C., 1 h, reaction protected under N$_2$ atmosphere). All catalysts explored were dissolved in dry acetonitrile with the same concentration (0.1 M). The "-onium" cation played a crucial rule in adjusting the reactivity of corresponding bifluoride. TASHF$_2$ provided the lowest catalyst loading of 0.05 mol % (0.02 wt %) without significant loss of molecular weight, and therefore can serve as a leave-in catalyst that avoids further purification after the polymerization. Imidazolium catalysts such as 1,3-bis(2,6-diisopropylphenyl)imidazolium bifluoride also exhibited excellent reactivity with a 0.1 mol % catalyst loading. As depicted in Table 2, polyHF fluoride catalyst also exhibited excellent catalytic efficiency in promoting the polymerization.

TABLE 2

Poly-HF Fluoride Catalysts Evaluation.

| Catalyst | Condition | Catalyst Loading (mol %) | Mn (Da) | PDI |
|---|---|---|---|---|
| Ph$_3$P=N$^+$PPh$_3$ H$_2$F$_3^-$ | A | 0.25% | 127714 | 1.8 |

TABLE 2-continued

Poly-HF Fluoride Catalysts Evaluation.

| Catalyst | Condition | Catalyst Loading (mol %) | Mn (Da) | PDI |
|---|---|---|---|---|
| Ph₃P=N⁺ PPh₃  H₂F₄⁻ | A | 0.50% | 80983 | 1.6 |
| n-Bu₄P⁺ H₂F₃⁻ | A | 0.25% | 54837 | 1.7 |
| (diisopropyl imidazolium H₂F₃⁻) | A | 0.25% | 31286 | 1.5 |
| (benzyl dimethyl ammonium PEG octylphenyl H₂F₃⁻) | A | 0.25% | 70993 | 1.6 |
| n-Bu₄N⁺ H₂F₃⁻ | A | 0.50% | 57987 | 1.6 |
| n-Bu₄N⁺ H₃F₄⁻ | A | 0.50% | 68437 | 1.5 |

Condition A: NMP (2.0M), 130° C., 1 hour;
Condition B: Solvent-free, 130° C., 1 hour;

3C. The Impact of Water on BPA-Polysulfate Polymerization

In the studies summarized in Table 3, exogenous water was introduced to the acetonitrile solution of TASHF₂ before it was employed to initiate the polymerization of BPA-based monomers. All the reactions were performed under the standard 2.0 mmol scale reaction condition except that TASHF₂ was employed with 0.5 mol % catalyst loading. The ratio of TASHF₂/H₂O varied from 1:5 to 1:20 so as to evaluate the potential impact of water on the polymerization reactions. A notable slow-down of the initialization rate was observed, which has a positive correlation relationship with the amount of water introduced. In addition, as more water was added, molecular weight of corresponding polymer decreased.

TABLE 3

The Impact of Water on BPA-Polysulfate Polymerization.

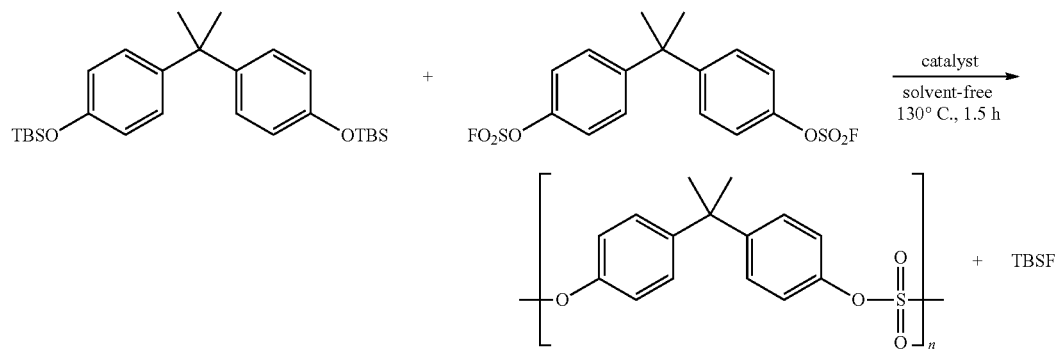

| Entry | Catalyst | Catalyst loading | $M_n$ | PDI |
|---|---|---|---|---|
| 1 | (TASHF₂) | 0.5 mol % | 85046 | 1.87 |
| 2 | (TASHF₂) (+H₂O) | 0.5 mol % (TASHF₂/H₂O = 1:5) | 46150 | 1.90 |
| 3 | (TASHF₂) (+H₂O) | 0.5 mol % (TASHF₂/H₂O = 1:11) | 26454 | 1.55 |
| 4 | (TASHF₂) (+H₂O) | 0.5 mol % (TASHF₂/H₂O = 1:20) | Oligomer | |

Example 4. Effects of the End-Capping

To assess the effects of adding an end capping reagent, which also simulates the potential effects of including an excess of one monomer relative to the other monomer, either monomer A-A or monomer B-B was partially replaced by double amounts of a third reactant which has an identical (but only one) functional group A or B. Once the third reactant (the end-capping reagent) forms a sulfate bond with its counterpart, the chain growth ceases on that side of the growing polymer chain. All the reactions were performed on the standard 2.0 mmol scale reaction condition with 0.02 mol % of TASHF₂ loading.

In Table 4, the silyl ether-functional BPA monomer (as the limiting monomer) varied from 95 mol % to 99.75 mol % with reference to the moles of fluorosulfate-functional BPA monomer. Accordingly, the end-capping reagent, tert-butyldimethyl(4-(2-phenylpropan-2-yl)phenoxy)silane, varied from 10 mol % to 0.5 mol %.

In Table 5, the fluorosulfate-functional BPA monomer was varied from 95 mol % to 99.75 mol % with reference to the moles of silyl ether-functional BPA monomer. The end-capping reagent, 4-(2-phenylpropan-2-yl)phenyl sulfurofluoridate, varied from 10 mol % to 0.5 mol % instead.

Figure 3:
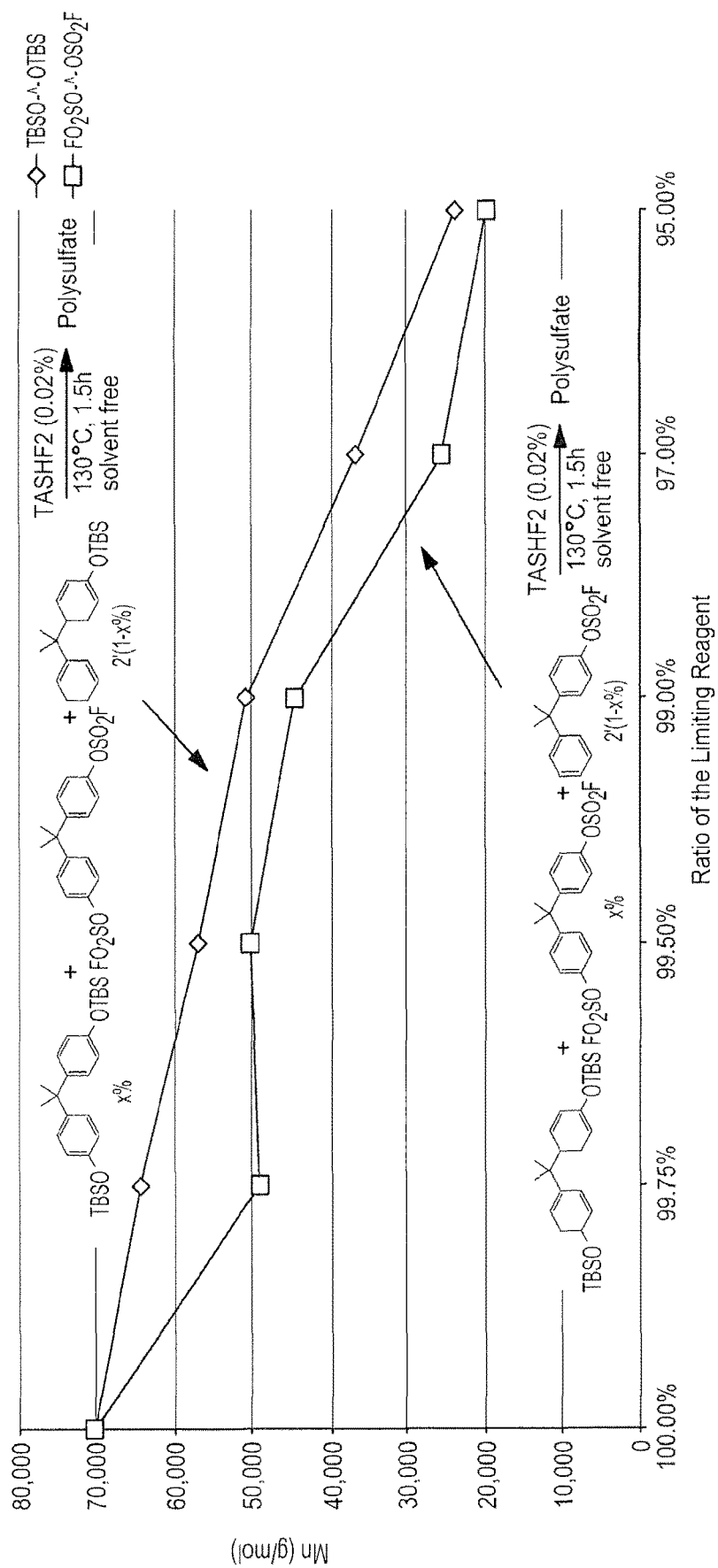
FIG. 3 illustrates the effects of end-capping in the polymerization methods described herein.

Each experiment was run twice ("1st try" and "2nd try"), an average $M_n$ was thereafter obtained and its correlation relationship with the ratio of limiting monomer was established in FIG. 3. In both cases, the $M_n$ of BPA-polysulfate decreased as the ratio of the limiting monomer was reduced (the ratio of corresponding end-capping reagents was increased correspondingly). In each case, however, the $M_n$ was higher when silyl ether-functional BPA was in excess. These results demonstrate that the $M_n$ of sulfate polymer was adjustable simply by adding an end-capping reagent.

TABLE 4

TBSO-C(CH3)2-C6H4-C6H4-OTBS (GA00501) + FO2SO-C6H4-C(CH3)2-C6H4-OSO2F (GA00402) + Ph-C(CH3)2-C6H4-OTBS (GA00601)

$\xrightarrow[\text{solvent free}]{\text{catalyst} \atop 130° \text{C., 1.5 h}}$ Polysulfate

| Entry | GA00501 | GA00402 (2.0 mmol) | GA00601 | TASHF$_2$ (0.1M in CH$_3$CN) (loading based on reaction sides) | Repeats | Mn/Dispersity | Mn (average) |
|---|---|---|---|---|---|---|---|
| 1 | 95.0% | 1.0 | 10.0% | 0.02% (8 ul) | 1st try | 24914/1.42 | 23843 |
|   | 95.0% | 1 0 | 10.0% | 0.02% (8 ul) | 2nd try | 22771/1.43 |  |
| 2 | 97.0% | 1.0 | 6.0% | 0.02% (8 ul) | 1st try | 39470/2.69 | 36676 |
|   | 97.0% | 1.0 | 6.0% | 0.02% (8 ul) | 2nd try | 33882/1.54 |  |
| 3 | 99.0% | 1.0 | 2.0% | 0.02% (8 ul) | 1st try | 53305/1.74 | 50889 |
|   | 99.0% | 1.0 | 2.0% | 0.02% (8 ul) | 2nd try | 48472/2.26 |  |
| 4 | 99.5% | 1.0 | 1.0% | 0.02% (8 ul) | 1st try | 64094/1.83 | 57162 |
|   | 99.5% | 1.0 | 1.0% | 0.02% (8 ul) | 2nd try | 50229/2.37 |  |
| 5 | 99.75% | 1.0 | 0.5% | 0.02% (8 ul) | 1st try | 64484/2.26 | 64484[a] |
|   | 99.75% | 1.0 | 0.5% | 0.02% (8 ul) | 2nd try | 95090/2.00 |  |
| 6 | 1.0 | 1.0 | 0 | 0.02% (8 ul) |  | 70268/2.43 | 70268 |

[a]For this entry, the Mn obtained from "the 1st try" was used for comparison instead of the average Mn

TABLE 5

TBSO-C6H4-C(CH3)2-C6H4-OTBS (GA00501) + FO2SO-C6H4-C(CH3)2-C6H4-OSO2F (GA00402) + Ph-C(CH3)2-C6H4-OSO2F (GA00701)

$\xrightarrow[\text{solvent free}]{\text{catalyst} \atop 130° \text{C., 1.5 h}}$ Polysulfate

| Entry | GA00501 (2.0 mmol) | GA00402 | GA00701 | TASHF$_2$ (0.1M in CH$_3$CN) (loading based on reaction sides) | Repeats | Mn/Dispersity | Mn (average) |
|---|---|---|---|---|---|---|---|
| 1 | 1.0 | 95.0% | 10.0% | 0.02% (8 ul) | 1st try | 25604/1.43 | 22631 |
|   | 1.0 | 95.0% | 10.0% | 0.02% (8 ul) | 2nd try | 19657/1.51 |  |
| 2 | 1.0 | 97.0% | 6.0% | 0.02% (8 ul) | 1st try | 26778/1.54 | 25420 |
|   | 1.0 | 97.0% | 6.0% | 0.02% (8 ul) | 2nd try | 24061/1.49 |  |
| 3 | 1.0 | 99.0% | 2.0% | 0.02% (8 ul) | 1st try | 41958/1.80 | 44462 |
|   | 1.0 | 99.0% | 2.0% | 0.02% (8 ul) | 2nd try | 46966/1.73 |  |
| 4 | 1.0 | 99.5% | 1.0% | 0.02% (8 ul) | 1st try | 48918/1.95 | 50227 |
|   | 1.0 | 99.5% | 1.0% | 0.02% (8 ul) | 2nd try | 51536/1.81 |  |
| 5 | 1.0 | 99.75% | 0.5% | 0.02% (8 ul) | 1st try | 49122/1.88 | 46282 |
|   | 1.0 | 99.75% | 0.5% | 0.02% (8 ul) | 2nd try | 43442/1.97 |  |
| 6 | 1.0 | 1.0 | 0 | 0.02% (8 ul) |  | 70268/2.43 | 70268 |

In Tables 4 and 5, "ul" stands for microliter (μL).

4A. End-Capping Reagents

The end-capping reagents "GA00601" and "GA00701" were prepared via the reported procedure in Dong, J. J.; Sharpless, K. B. et al., *Angew Chem. Int. Ed.* 2014, 53, 9466-9470; and WO 2014/089078 to Dong et al.

4A(i). tert-Butyldimethyl(4-(2-phenylpropan-2-yl)phenoxy)silane (GA00601). 4-(2-phenylpropan-2-yl)phenol (21.2 g, 0.1 mol) and imidazole (8.85 g, 0.13 mol) were dissolved in 100 mL of $CH_2Cl_2$ in a 1 L round-bottomed flask equipped with a stirring bar. tert-Butyldimethylsilyl chloride (18.1 g, 0.12 mol, dissolved in 50 mL of DCM) was added portion-wise to the reaction, which quickly resulted in the generation of a white precipitate. The reaction mixture was stirred for 3 h, filtered to remove all solids (imidazole-HCl) and concentrated in vacuo. The resulting oil was dissolved in 200 mL of EtOAc and briefly washed with saturated aqueous $NaHCO_3$ (100 mL, twice), saturated aqueous NaCl (100 mL, twice), and was then dried over $Na_2SO_4$. Filtration and removal of the volatiles under vacuum provided final product as a colorless oil (29.7 g, 91%). $^1H$ NMR (400 MHz, Chloroform-d) δ 7.35-7.23 (m, 4H), 7.21 (td, J=6.5, 2.0 Hz, 1H), 7.17-7.08 (m, 2H), 6.81-6.76 (m, 2H), 1.71 (s, 6H), 1.03 (s, 9H), 0.24 (s, 6H); $^{13}C$ NMR (101 MHz, Chloroform-d) δ 153.37, 151.04, 143.34, 127.93, 127.75, 126.77, 125.50, 119.28, 42.36, 30.94, 25.72, 18.20, 4.35; GC-MS (EI) m/z=326.1 $[M]^+$

4A(ii). 4-(2-phenylpropan-2-yl)phenyl sulfurofluoridate (GA00701). 4-(2-phenylpropan-2-yl)phenol (21.2 g, 0.1 mol) and triethylamine (15.2 g, 0.15 mol) were dissolved in $CH_2Cl_2$ (200 mL) in a 500 mL round-bottomed flask equipped with a stirring bar. The headspace of the reaction vessel was evacuated and filled with sulfuryl fluoride gas introduced via a needle attached to a balloon. The reaction was allowed to stir at room temperature for 4 h, at which time GC-MS analysis indicated complete conversion. The reaction mixture was then concentrated in vacuo, re-dissolved in 200 mL of EtOAc and washed sequentially with 0.6M HCl (100 mL, three times), 100 mL sat. $NaHCO_3$ (twice), 100 mL sat. NaCl (twice), and dried over $Na_2SO_4$. Filtration and removal of the volatiles provided the product as a colorless oil (27.9 g, 95%). $^1H$ NMR (400 MHz, Chloroform-d) δ 7.38-7.31 (m, 4H), 7.28-7.22 (m, 5H), 1.73 (s, 6H); 19F NMR (376 MHz, Chloroform-d) δ 37.12 (s, 1F); $^{13}C$ NMR (101 MHz, Chloroform-d) δ 151.67, 149.49, 148.00, 128.81, 128.27, 126.70, 126.09, 120.25 (d, J=1.1 Hz), 42.96, 30.74; GC-MS (EI) m/z=294.1 $[M]^+$.

Example 5. Exemplary Polymerization Reactions

Figure 4A:
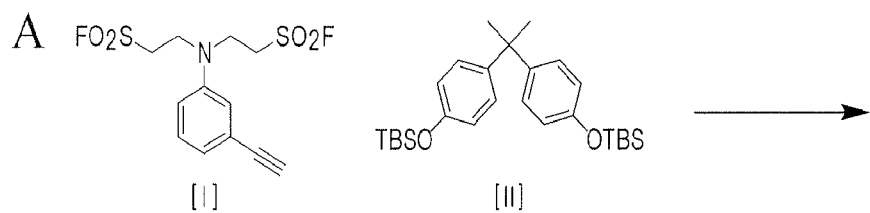
FIG. 4A illustrates additional polymers prepared according to the HF-fluoride catalyzed polymerization methods described herein.
Figure 4A:
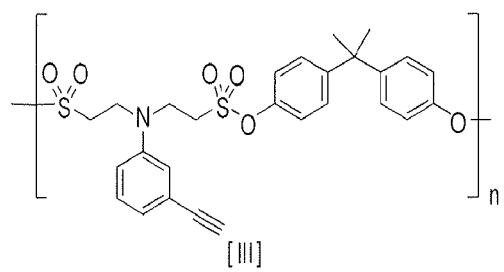
Figure 4A:
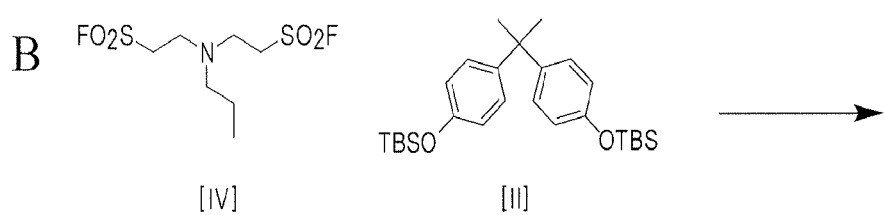
Figure 4A:
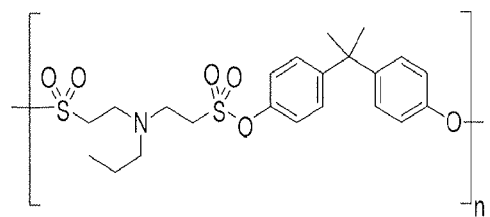
Figure 4A:
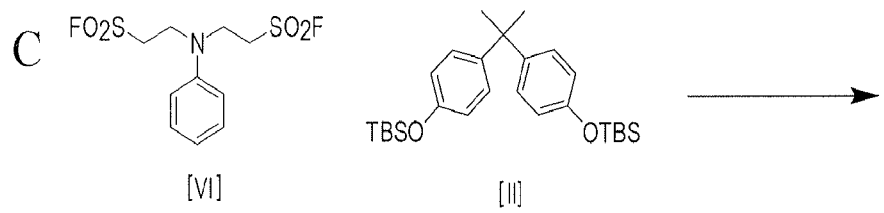
Figure 4A:
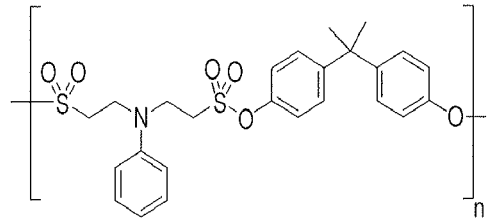
Figure 4B:
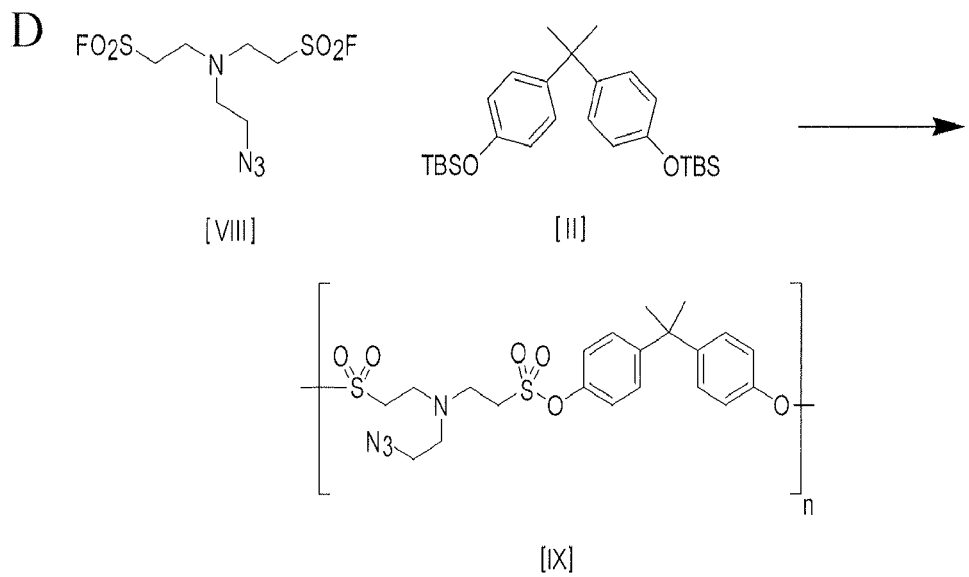
FIG. 4B illustrates additional polymers prepared according to the HF-fluoride catalyzed polymerization methods described herein.
Figure 4B:
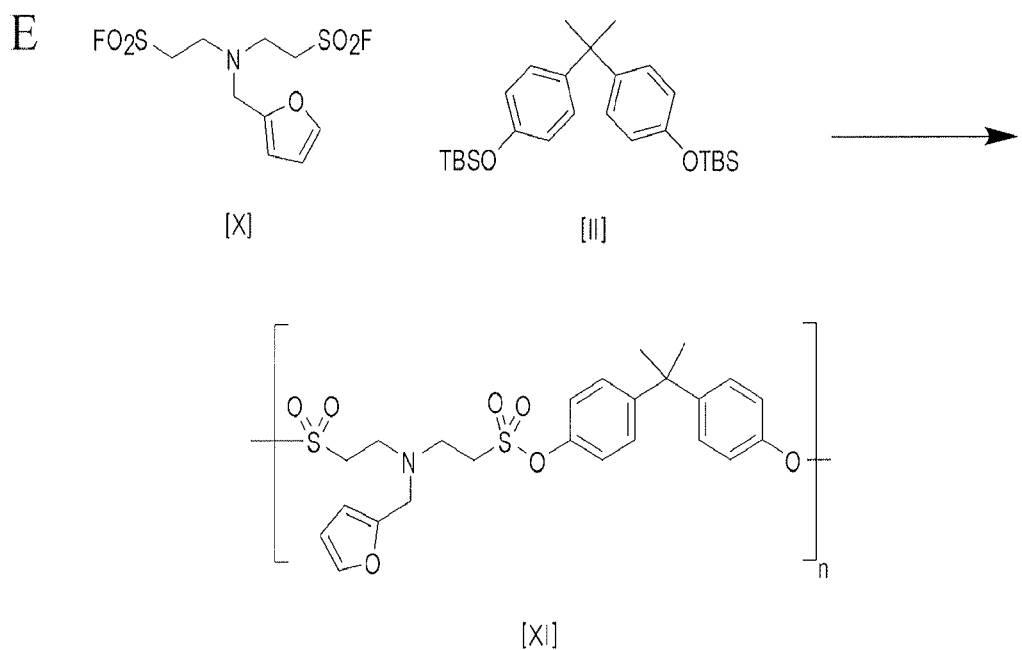

Additional polymerization reactions were carried out according to the methods described herein following the reactions schematically illustrated in FIG. 4A (Reactions A, B, C) and FIG. 4B (Reactions D and E). The reaction conditions and GPC molecular weight data on the resulting polymers ($M_w$, $M_n$, PDI) are shown in Table 6. In Table 6 the catalysts utilized in the polymerization reactions are:

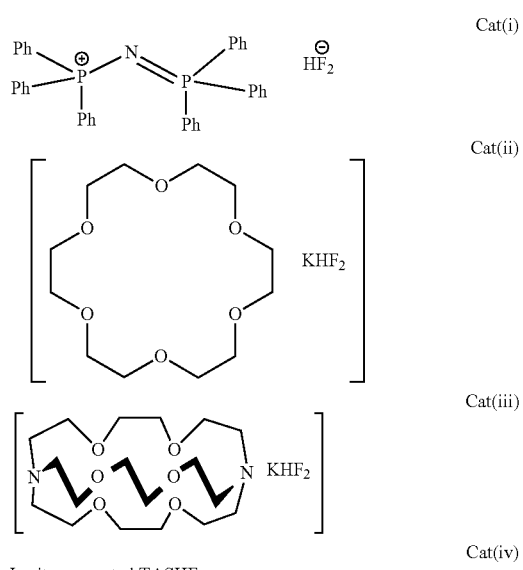

In situ generated $TASHF_2$ from TASF and trace water in reaction solvent

TABLE 6

Additional Polymerization Results

| Ex. No. | Reaction | Conditions | $M_n/M_w$ | PDI |
|---|---|---|---|---|
| 5(a) | A | 10 mol % Cat(i), neat monomers, 120° C., 30 min | 26223/41868 | 1.597 |
| 5(b) | A | 10 mol % Cat(i), 1M DMF solution, rt, overnight | 29858/59380 | 1.989 |
| 5(c) | A | 10 mol % Cat(ii), 1M DMF solution, rt, 12 hrs | 23834/41588 | 1.745 |
| 5(d) | A | 10 mol % Cat(iii), 1M DMF solution, rt, 12 hrs | 28326/56493 | 1.994 |
| 5(e) | B | 10 mol % Cat(iv), 2M DMF solution, rt, 24 hrs | 24601/48471 | 1.970 |
| 5(f) | C | 10 mol % Cat(iv), 2M DMF solution, rt, 24 hrs | 23948/38737 | 1.618 |
| 5(g) | D | 10 mol % Cat(iv), 2M DMF solution, rt, 24 hrs | 28448/45625 | 1.604 |
| 5(h) | E | 10 mol % Cat(iv), 2M DMF solution, rt, 24 hrs | 25619/43350 | 1.692 |

As can be seen from the data and information in FIG. 4A, FIG. 4B, and Table 6, the polymerizations all provided polymers with PDI of about 1.6 to about 2, with $M_n$ values in the range of about 24,000 to 30,000 g/mol and $M_w$ values of about 39,000 to 60,000 g/mol, from five different monomer pairs. Reactions B, C, D, and E demonstrate that $TASHF_2$ generated in situ from TASF and trace water in the reaction solvent also surprisingly efficiently catalyzes the polymerization reaction.

Example 6. Additional Exemplary Polymerization Reactions

Figure 6:
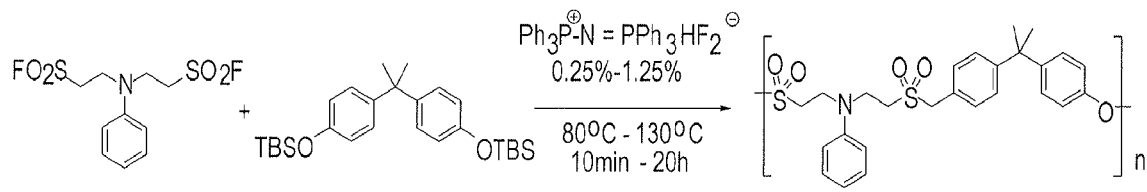
FIG. 6 illustrates additional exemplary polymerization reactions carried out according to the methods described herein using sulfonylfluoride and silylated monomers.
Figure 7:
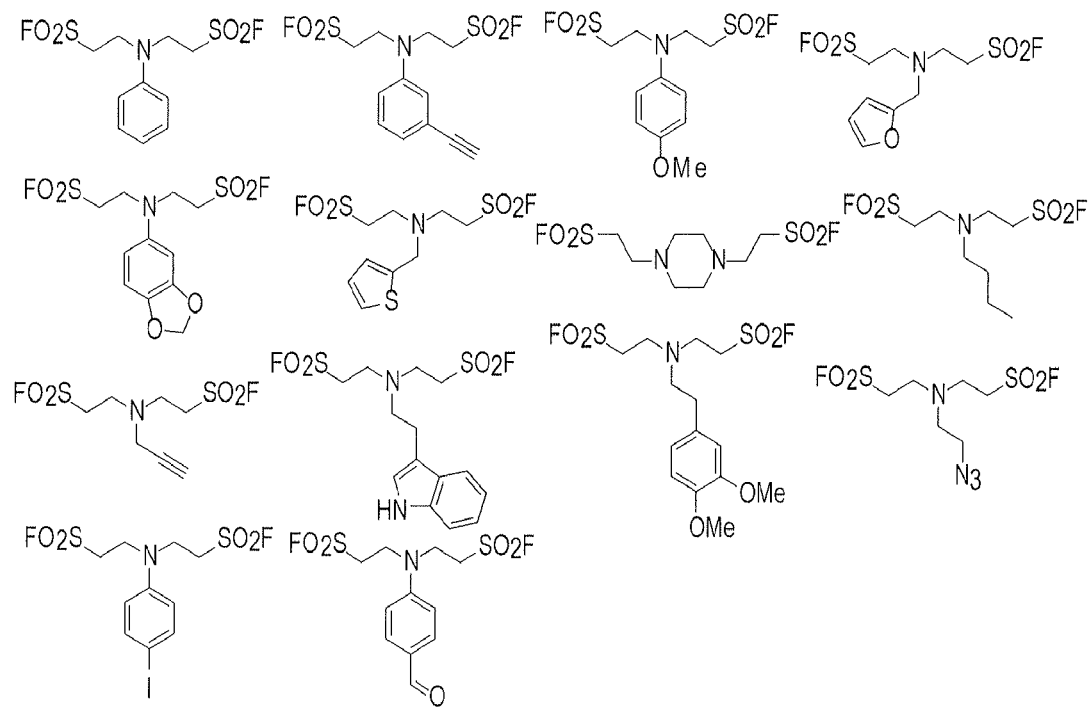
FIG. 7 illustrates non-limiting examples of sulfonylfluoride and silylated monomers, which can be utilized in the polymerization methods described herein.
Figure 7:
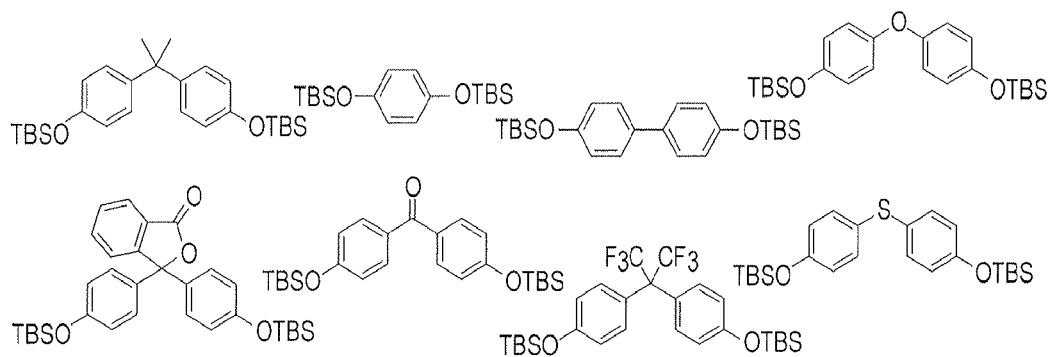
Figure 8:
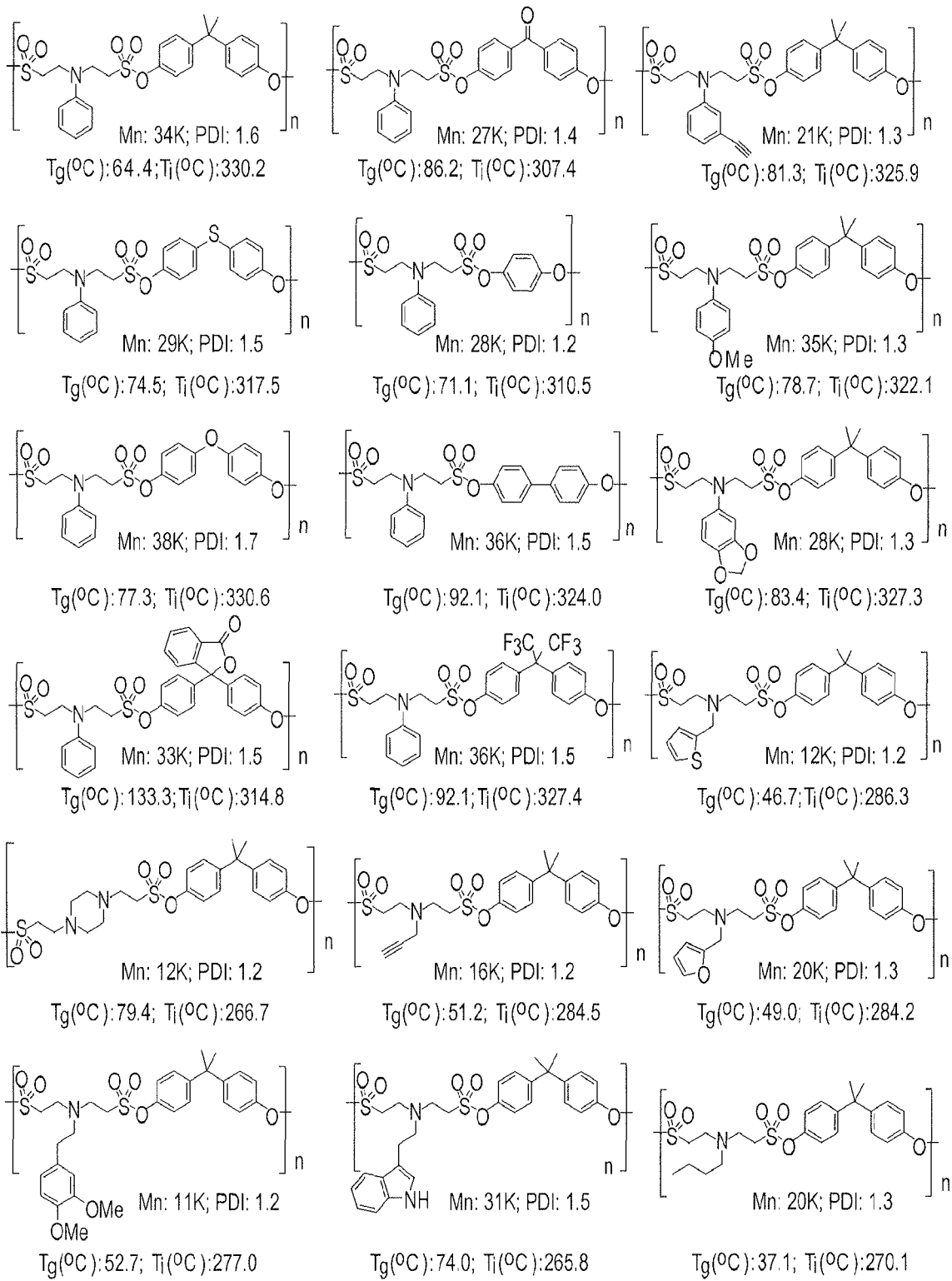
FIG. 8 illustrates the reaction conditions and the GPC molecular weight data on the resulting polymers ($M_n$, PDI) from the polymerization reactions carried out using sulfonylfluoride and silylated monomers in the polymerization methods described herein.

Additional polymerization reaction were carried out according to the methods described herein following the reactions schematically illustrated in FIG. 6 and the monomers were described but not limited in FIG. 7. The reactions conditions and GPC molecular weight data on the resulting polymers ($M_n$, PDI) are shown in FIG. 8. The results shown in FIGS. 6-8 were obtained by using $(Ph_3P=N—PPh_3)^+$ $HF_2^-$ (0.25 mol % to 1.25 mol %) as catalyst.

As can be seen from the data and information in FIG. 6, FIG. 7, and FIG. 8, the polymerizations all provided polymers with PDI of about 1.2 to 1.7, with $M_n$ values in the range of 12,000 to 38,000 g/mol.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A polymerization method comprising the step of combining a liquid monomer composition and a catalyst comprising a salt of formula $(R^+)(F(HF)_w^-)$, wherein $R^+$ is an organic cation or a chelated metal cation, and w is 1 or greater to form a polymer therefrom;
   wherein the monomer composition comprises at least one compound of formula F-X-F and at least one compound of formula $(R^1)_3Si-Z-Si(R^1)_3$;
   each $R^1$ independently is a hydrocarbyl group;
   X has the formula $-A(-R^2-A)n-$;
   each A independently is $SO_2$, $C(=O)$, or Het;
   $R^2$ comprises a first organic moiety;
   n is 0 or 1;
   Het is an aromatic heterocycle comprising at least two carbon atoms and at least one nitrogen atom in a heteroaromatic ring thereof, and when A is Het, the F substituent is attached to a carbon atom of the heteroaromatic ring thereof;
   Z has the formula $-L-R^3-L-$;
   each L independently is O, S, or $N(R^4)$;
   $R^3$ comprises a second organic moiety;
   each $R^4$ independently is H or a third organic moiety; and
   wherein the F and $(R^1)_3Si$ substituents form a silyl fluoride byproduct of formula $(R^1)_3Si-F$ as the respective A and L groups of the monomers condense to form an X-Z polymer chain.

2. The method of claim 1, wherein $R^+$ is selected from an organosulfonium ion, an organophosphonium ion, a quaternary ammonium ion, a quaternized nitrogen heteroaromatic ion, a cationic polymer, and a chelated metal ion.

3. The method of claim 1, wherein $R^+$ comprises an organophosphonium ion.

4. The method of claim 1, wherein $R^+$ comprises a quaternary ammonium ion.

5. The method of claim 1, wherein $R^+$ comprises a quaternized heteroaromatic ion.

6. The method of claim 1, wherein $R^+$ comprises an organosulfonium ion.

7. The method of claim 1, wherein:
   each $R^1$ independently is an alkyl or aryl group;
   X has the formula $-A(-R^2-A)n-$;
   each A is $SO_2$;
   $R^2$ comprises a first organic moiety;
   n is 0 or 1;
   Z has the formula $-L-R^3-L-$;
   each L independently is O; and
   $R^3$ comprises a second organic moiety comprising at least one aryl or heteroaryl group directly bonded to each L.

8. The method of claim 1, wherein the n is 0.

9. The method of claim 1, wherein Het is a 1,3,5-triazine.

10. The method of claim 1, wherein the monomer composition includes a compound in which X includes an additional F substituent on a sulfonyl, carbonyl, or heteroaryl activating group, A, such that the additional F substituent also reacts with a $(R^1)_3Si$ substituent on an oxygen, sulfur or nitrogen atom linking group, L, to form a silyl fluoride, and the activating group condenses with the linking group to introduce a branch point in the polymer.

11. The method of claim 1, wherein the monomer composition includes a compound in which Z includes an additional silyl substituent, $(R^1)_3Si$, on an oxygen, sulfur or nitrogen atom linking group, L, such that the additional silyl substituent also reacts with a F substituent on a sulfonyl, carbonyl, or heteroaryl activating group, A, to form a silyl fluoride and the linking group condenses with the activating group to introduce a branch point in the polymer.

12. The method of claim 1, wherein n is 1; $R^2$ is $-L^1-R^5-L^1-$; each $L^1$ independently is selected from the group consisting of O, S, and $N(R^4)$; and each $R^4$ independently is H or the third organic moiety, and $R^5$ comprises an organic moiety.

13. The method of claim 1, wherein n is 1; $R^2$ is $-L-R^5-$; $L^1$ is selected from the group consisting of O, S, and $N(R^4)$; $R^4$ s H or the third organic moiety; and $R^5$ is an organic moiety.

14. The method of claim 1, wherein the catalyst comprises tris(dimethylamino)sulfonium bifluoride.

15. The method of claim 1, wherein each A is $SO_2$.

16. The method of claim 1, wherein each $R^2$ comprises an aryl or heteroaryl moiety either directly bonded to an A group or bonded to A via an oxygen atom attached to the aryl or heteroaryl moiety.

17. The method of claim 1, wherein the X-Z polymer chain is represented by a formula selected from the group consisting of:

| | |
|---|---|
| $(-A(-R^2-A)n-L-R^3-L)x-$; | Formula (I): |
| $(-A-R^2-A-L-R^3-L)y-$; | Formula (II): |
| $(-A-L^1-R^5-L^1-A-L-R^3-L)z-$; | Formula (III): |
| $(-A-L^1-R^5-A-L-R^3-L)m-$; | Formula (IV): |
| $(-A-L-R^3-L)p-$; and | Formula (V): |
| $(-A-R^2-A-L-R^3-L)a-(-A-L^1-R^5-L^1-A-L-R^3-L)b-(A-L^1-R^5-A-L-R^3-L)c-(-A-L-R^3-L)d-$, | Formula (VI): | wherein:
each A independently is $SO_2$, $C(=O)$, or Het;
each L and $L^1$ independently is O, S, or $N(R^4)$;
each $R^2$ and $R^5$ independently comprises a first organic moiety;
each $R^3$ comprises a second organic moiety;
each $R^4$ independently is H or a third organic moiety;
each n independently is 0 or 1;
each Het independently is an aromatic heterocycle comprising at least two carbon atoms and at least one nitrogen atom in a heteroaromatic ring thereof, and when A is Het, the F substituent is attached to a carbon atom of the heteroaromatic ring thereof;

each of x, y, z, m, and p is the average number of repeating units in the polymer and has a value of at least 10; and each of a, b, c, and d is the average number of respective repeating units, and independently can be 0 or greater, provided the sum of a, b, c, and d is at least 10.

18. The method of claim 12, wherein one or more of $R^1$ the $R^2$, $R^3$, $R^4$, and $R^5$ comprises a moiety selected from the group consisting of a hydrocarbon, a heterocycle, a carbohydrate, an amino acid, a polypeptide, a peptide analog, and a combination of two or more thereof.

19. The method of claim 18, any one of claims 1 to 18, wherein one or more of $R^1$, $R^2$, $R^3$, $R^4$, and $R^5$ is substituted by at least one substituent selected from the group consisting of hydroxyl, halogen, nitro, —C(O)$R^6$, —C(O)O$R^6$, —C(O)N($R^6$)$_2$, —CN, —SO$_v$$R^6$, SO$_v$N($R^6$)$_2$, $R^6$SO$_v$N($R^6$)—, —N($R^6$)SO$_v$$R^6$, —SO$_3$$R^6$, —N($R^6$)$_2$, —N($R^6$)O$R^6$, —N($R^6$)C(O)$R^6$, —N($R^6$)C(O)O$R^6$, —N($R^6$)C(O)N($R^6$)$_2$, —OC(O)N($R^6$)$_2$, —OC(O)O$R^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each $R^6$ independently is H, alkyl, or aryl, and v is 0, 1, or 2.

20. The method of claim 1, wherein the monomer composition comprises (a) two or more different compounds of formula F-X-F, (b) two or more different compounds of formula ($R^1$)$_3$Si—Z—Si($R^1$)$_3$, or (c) c combination of both (a) and (b).

21. The method of claim 20, wherein the two or more different compounds of formula ($R^1$)$_3$Si—Z—Si($R^1$)$_3$ differ by the selection of $R^1$, Z, or both $R^1$ and Z.

22. The method of claim 1, wherein the monomer composition comprises at least one compound of Formula VII and at least one compound of Formula VIII:

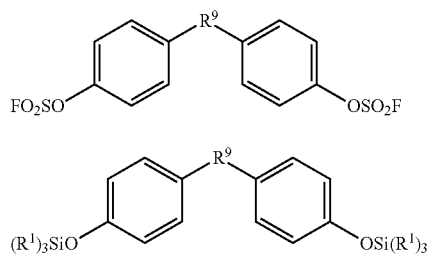

VII

VIII wherein each $R^1$ independently is an alkyl or aryl group, and each $R^9$ independently is a covalent bond, C(CH$_3$)$_2$, C(CF$_3$)$_2$, or SO$_2$.

23. The method of claim 1, wherein the liquid monomer mixture comprises a melted mixture of the monomers.

24. The method of claim 1, wherein the liquid monomer mixture comprises a solution of the monomers in a solvent.

25. The method of claim 24, wherein the solvent is a polar aprotic solvent.

26. The method of claim 1, wherein the F-X-F monomer comprises sulfuryl fluoride (FSO$_2$F).

27. The method of claim 1, wherein the F-X-F monomer comprises a bisfluorosulfonyl monomer of formula F—SO$_2$—CH$_2$CH$_2$—N($R^{11}$)—CH$_2$CH$_2$—SO$_2$—F, wherein $R^{11}$ comprises an organic moiety.

28. The method of claim 27, wherein $R^{11}$ comprises a moiety selected from the group consisting of a hydrocarbon, a heterocycle, a carbohydrate, an amino acid, a polypeptide, a peptide analog, and a combination of two or more thereof.

29. The method of claim 27, wherein $R^{11}$ is substituted by at least one substituent selected from the group consisting of hydroxyl, halogen, nitro, —C(O)$R^6$, —C(O)O$R^6$, —C(O)N($R^6$)$_2$, —CN, —SO$_v$$R^6$, —SO$_v$N($R^6$)$_2$, $R^6$ SO$_v$N($R^6$)—, —N($R^6$)SO$_v$$R^6$, —SO$_3$$R_6$, —N($R^6$)$_2$, —N($R_6$)O$R^6$, N($R^6$)C(O)$R^6$, —N($R^6$)C(O)O$R^6$, —N($R^6$)C(O)N($R^6$)$_2$, —OC(O)N($R^6$)$_2$, —OC(O)O$R^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each $R^6$ independently is H, alkyl, or aryl, and v is 0, 1, or 2.

30. The method of claim 1, wherein the polymer product is isolated without purification such that the catalyst remains in the polymer.

31. The method of claim 1, wherein the catalyst is included at a concentration in the range of about 0.001 mol % to about 1 mol % based on the total moles of monomers.

32. The method of claim 1, wherein an end-capping monosilyloxy compound or monofluorosulfonyloxy compound is included in the monomer mixture to limit or control the molecular weight of the resulting polymer by stopping chain growth at the fluoro or silyl end, respectively, of a polymer chain.

33. The method of claim 1, wherein the catalyst is generated in situ from a precursor compound.

34. The method of claim 1, wherein the method is performed at a temperature in the range of about 20 to about 250° C.

35. The method of claim 1, wherein one or more of $R^1$, $R^2$, $R^3$ and $R^4$ comprises a moiety selected from the group consisting of a hydrocarbon, a heterocycle, a carbohydrate, an amino acid, a polypeptide, a peptide analog, and a combination of two or more thereof.

36. The method of claim 35, wherein one or more of $R^1$, $R^2$, $R^3$ and $R^4$ is substituted by at least one substituent selected from the group consisting of hydroxyl, halogen, nitro, —C(O)$R^6$, —C(O)O$R^6$, —C(O)N($R^6$)$_2$, —CN, —SO$_v$$R^6$, —SO$_v$N($R^6$)$_2$, $R^6$SO$_v$N($R^6$)—, —N($R^6$)SO$_v$$R^6$, —SO$_3$$R^6$, —N($R^6$)$_2$, —N($R^6$)O$R^6$, —N($R^6$)C(O)$R^6$, —N($R^6$)C(O)O$R^6$, —N($R^6$)C(O)N($R^6$)$_2$, —OC(O)N($R^6$)$_2$, —OC(O)O$R^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each $R^6$ independently is H, alkyl, or aryl, and v is 0, 1, or 2.

* * * * *